(12) United States Patent
Muthiah et al.

(10) Patent No.: US 10,846,136 B2
(45) Date of Patent: *Nov. 24, 2020

(54) SYSTEMS AND METHODS FOR MANAGING SPILLOVER LIMITS IN A MULTI-CORE SYSTEM

(71) Applicant: Citrix Systems, Inc., Fort Lauderdale, FL (US)

(72) Inventors: Manikam Muthiah, Bangalore (IN); Josephine Suganthi, Sunnyvale, CA (US); Sandeep Kamath, Santa Clara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 350 days.

This patent is subject to a terminal disclaimer.

(21) Appl. No.: 14/813,567

(22) Filed: Jul. 30, 2015

(65) Prior Publication Data

US 2015/0339164 A1   Nov. 26, 2015

Related U.S. Application Data

(63) Continuation of application No. 12/976,697, filed on Dec. 22, 2010, now Pat. No. 9,098,335.

(Continued)

(51) Int. Cl.
*G06F 9/50* (2006.01)
*H04L 12/801* (2013.01)
*H04L 29/08* (2006.01)

(52) U.S. Cl.
CPC ............ *G06F 9/5011* (2013.01); *H04L 47/19* (2013.01); *H04L 67/1002* (2013.01);
(Continued)

(58) Field of Classification Search
CPC ....... G06F 2209/5011; G06F 2209/504; G06F 9/5011; H04L 47/19; H04L 67/1002; H04L 67/1025; Y02B 60/142
See application file for complete search history.

(56) References Cited

U.S. PATENT DOCUMENTS 5,928,339 A    7/1999  Nishikawa
5,931,924 A *  8/1999  Arimilli ................ G06F 13/364
                                                          710/116

(Continued)

FOREIGN PATENT DOCUMENTS

EP   0 605 339 A2   7/1994
EP   1 441 487      7/2004

OTHER PUBLICATIONS

Chinese First Office Action for CN Application No. 2010800640830 dated Jul. 1, 2014.

(Continued)

*Primary Examiner* — Jorge A Chu Joy-Davila
(74) *Attorney, Agent, or Firm* — Foley & Lardner LLP

(57) ABSTRACT

Disclosed embodiments describe a system for managing spillover via a plurality of cores of a multi-core device intermediary to a plurality of clients and one or more services. The system may include a spillover limit of a resource. and a plurality of packet engines operating on a corresponding core of a plurality of cores of the device. The system may include a pool manager allocating to each of the plurality of packet engines a number of resource uses from an exclusive quota pool and shared quota pool based on the spillover limit of a resource. The device determines that the number of resources used by a packet engine has reached the allocated number of resource uses of the packet engine, and responsive to the determination, forwards to a backup virtual server a request of a client received by the device for the virtual server.

20 Claims, 29 Drawing Sheets

Related U.S. Application Data

(60) Provisional application No. 61/289,536, filed on Dec. 23, 2009.

(52) U.S. Cl.
CPC .... *H04L 67/1025* (2013.01); *G06F 2209/504* (2013.01); *G06F 2209/5011* (2013.01); *Y02D 10/22* (2018.01)

(56) References Cited

U.S. PATENT DOCUMENTS

| | | | |
|---|---|---|---|
| 6,157,928 A | 12/2000 | Sprenger et al. | |
| 6,421,711 B1 | 7/2002 | Blumenau et al. | |
| 6,449,251 B1 | 9/2002 | Awadallah et al. | |
| 7,069,271 B1 | 6/2006 | Fadel et al. | |
| 7,243,161 B1 | 7/2007 | Tappan et al. | |
| 7,274,706 B1 | 9/2007 | Nguyen et al. | |
| 7,305,429 B2 | 12/2007 | Borella | |
| 7,310,667 B2 | 12/2007 | Banerjee et al. | |
| 7,346,909 B1 | 3/2008 | Eldar et al. | |
| 7,386,881 B2 | 6/2008 | Swander et al. | |
| 7,472,201 B1 | 12/2008 | Aitken | |
| 7,493,371 B1 | 2/2009 | Bali et al. | |
| 7,526,562 B1 | 4/2009 | Samprathi et al. | |
| 7,554,992 B2 | 6/2009 | Kimura et al. | |
| 7,630,385 B2 | 12/2009 | Oyadomari et al. | |
| 7,640,023 B2 | 12/2009 | Ma et al. | |
| 7,743,155 B2 | 6/2010 | Pisharody et al. | |
| 7,783,666 B1* | 8/2010 | Zhuge | G06F 17/30082 707/783 |
| 7,965,630 B1 | 6/2011 | Floyd et al. | |
| 7,986,629 B1 | 7/2011 | Ferguson et al. | |
| 8,166,175 B2 | 4/2012 | Schmieder et al. | |
| 8,180,921 B2 | 5/2012 | Maynard | |
| 8,243,589 B1 | 8/2012 | Trost et al. | |
| 8,255,528 B2 | 8/2012 | Raja et al. | |
| 8,260,986 B2 | 9/2012 | Arakawa et al. | |
| 8,327,017 B1 | 12/2012 | Trost et al. | |
| 8,495,245 B2 | 7/2013 | Busschbach | |
| 2002/0053011 A1* | 5/2002 | Aiken | G06F 9/5016 711/170 |
| 2002/0083178 A1* | 6/2002 | Brothers | G06F 21/10 709/226 |
| 2002/0103846 A1 | 8/2002 | Zisapel et al. | |
| 2002/0112076 A1 | 8/2002 | Rueda et al. | |
| 2003/0009559 A1 | 1/2003 | Ikeda | |
| 2003/0028653 A1* | 2/2003 | New, Jr. | H04L 63/04 709/229 |
| 2003/0097405 A1 | 5/2003 | Laux et al. | |
| 2003/0154306 A1 | 8/2003 | Perry | |
| 2003/0229697 A1 | 12/2003 | Borella | |
| 2004/0018595 A1 | 1/2004 | Rudolph et al. | |
| 2004/0053693 A1 | 3/2004 | An | |
| 2004/0073730 A1* | 4/2004 | Horii | G06F 13/1663 710/113 |
| 2004/0120501 A1 | 6/2004 | Celt et al. | |
| 2004/0152439 A1 | 8/2004 | Kimura et al. | |
| 2004/0165602 A1 | 8/2004 | Park et al. | |
| 2004/0181595 A1 | 9/2004 | Banerjee et al. | |
| 2004/0233916 A1 | 11/2004 | Takeuchi et al. | |
| 2005/0005169 A1 | 1/2005 | Kelekar | |
| 2005/0047423 A1 | 3/2005 | Kaul et al. | |
| 2005/0165987 A1* | 7/2005 | Asano | G06F 13/3625 710/113 |
| 2005/0223383 A1* | 10/2005 | Tetrick | G06F 9/5011 718/104 |
| 2006/0026692 A1* | 2/2006 | Lakhani | G06F 21/31 726/28 |
| 2006/0075505 A1* | 4/2006 | Murthy | G06F 21/10 726/26 |
| 2006/0098795 A1* | 5/2006 | Choti | H04L 63/10 379/114.14 |
| 2006/0195611 A1 | 8/2006 | Howe | |
| 2006/0248168 A1* | 11/2006 | Nishimura | H04L 29/06027 709/219 |
| 2007/0050613 A1 | 3/2007 | Islam et al. | |
| 2007/0180314 A1 | 8/2007 | Kawashima et al. | |
| 2007/0239886 A1 | 10/2007 | Montemayor et al. | |
| 2007/0258465 A1 | 11/2007 | Ma et al. | |
| 2007/0294699 A1* | 12/2007 | Bahl | G06F 9/5027 718/104 |
| 2008/0028410 A1* | 1/2008 | Cherkasova | G06F 9/5061 718/104 |
| 2008/0034120 A1 | 2/2008 | Oyadomari et al. | |
| 2008/0077792 A1 | 3/2008 | Mann | |
| 2008/0123525 A1 | 5/2008 | Miyoshi et al. | |
| 2008/0137121 A1* | 6/2008 | Chrisop | G06F 21/608 358/1.13 |
| 2008/0168181 A1 | 7/2008 | Berkvens et al. | |
| 2008/0181173 A1* | 7/2008 | Wei | H04L 47/14 370/329 |
| 2008/0181213 A1 | 7/2008 | Ovsiannikov et al. | |
| 2008/0225718 A1 | 9/2008 | Raja et al. | |
| 2008/0250116 A1 | 10/2008 | Brown | |
| 2008/0263209 A1 | 10/2008 | Pisharody et al. | |
| 2009/0049189 A1 | 2/2009 | Zhu et al. | |
| 2009/0049537 A1 | 2/2009 | Chen et al. | |
| 2009/0182846 A1 | 7/2009 | Bowler | |
| 2009/0240821 A1 | 9/2009 | Juncker et al. | |
| 2009/0271515 A1 | 10/2009 | Iyengar et al. | |
| 2009/0271792 A1 | 10/2009 | Mills | |
| 2009/0271798 A1 | 10/2009 | Iyengar et al. | |
| 2009/0287846 A1 | 11/2009 | Iyengar et al. | |
| 2010/0100877 A1 | 4/2010 | Greene et al. | |
| 2010/0118869 A1 | 5/2010 | Li et al. | |
| 2010/0131660 A1 | 5/2010 | Dec et al. | |
| 2010/0138534 A1 | 6/2010 | Mutnuru et al. | |
| 2010/0290473 A1 | 11/2010 | Enduri et al. | |
| 2011/0119390 A1 | 5/2011 | Leech et al. | |
| 2011/0161506 A1 | 6/2011 | Dickerson | |
| 2011/0225594 A1 | 9/2011 | Iyengar et al. | |
| 2011/0276695 A1 | 11/2011 | Maldaner | |
| 2012/0254384 A1 | 10/2012 | Tremblay | |
| 2015/0193600 A1* | 7/2015 | Matsuda | H04L 63/0823 726/9 |

OTHER PUBLICATIONS

Chinese Office Action on 201080064083.0 dated Jun. 11, 2015.
EP Examination Report for EP Application No. 10840110.0 dated Jul. 9, 2014.
European Search Report dated Mar. 19, 2013 in European Patent Application No. 10840110.0.
Extended European Search Report dated Jan. 22, 2014 in European Patent Application No. 10840119.1 (6 pages).
First Office Action issued in Chinese Patent Application No. 201080064445.6 dated Jun. 13, 2014.
International Preliminary Report on Patentability on PCT/US2010/061755 dated Jul. 5, 2012.
International Preliminary Report on Patentability on PCT/US2010/061794 dated Jul. 5, 2012.
International Search Report on PCT/US2010/061755 dated Sep. 20, 2011.
International Search Report on PCT/US2010/061794 dated Sep. 23, 2011.
Magnus Westerlund Ericsson Thomas Zeng Packetvideo Network Solutions: "How to Enable Real-Time Streaming Protocol (RTSP) Traverse Network Address Translators (NAT) and Interact with Firewalls.; draft-ietf-mmusic-rtsp-nat-04.txt", Oct. 24, 2005, vol. mmusic, No. 4, Oct. 24, 2005 (Oct. 24, 2005), XP015042543, ISSN:0000-0004.
Notice of Allowance on U.S. Appl. No. 12/976,697 dated Mar. 30, 2015.
Second Chinese Office Action for Application No. 201080064083.0 dated Dec. 5, 2014.
U.S. Notice of Allowance on U.S. Appl. No. 12/976,706 dated Sep. 12, 2013.

(56) References Cited

OTHER PUBLICATIONS

U.S. Notice of Allowance on U.S. Appl. No. 12/976,710 dated Apr. 24, 2014.
U.S. Office Action for U.S. Appl. No. 12/976,697 dated Dec. 4, 2014.
U.S. Office Action on U.S. Appl. No. 12/976,697 dated Oct. 19, 2012.
U.S. Office Action on U.S. Appl. No. 12/976,697 dated May 19, 2014.
U.S. Office Action on U.S. Appl. No. 12/976,697 dated May 23, 2013.
U.S. Office Action on U.S. Appl. No. 12/976,706 dated Mar. 4, 2013.
U.S. Office Action on U.S. Appl. No. 12/976,710 dated Mar. 1, 2013.
U.S. Office Action on U.S. Appl. No. 12/976,710 dated Sep. 23, 2013.
Westerland, Magnus, et al. "How to Enable Real-Time Streaming Protocol (RTSP) Traverse Network Address Translators (NAT) and Interact with Firewalls." PacketVideo Network Solutions, Oct. 24, 2005.
Written Opinion on PCT/US2010/061755 dated Sep. 20, 2011.
Written Opinion on PCT/US2010/061794 dated Sep. 23, 2011.
U.S. Notice of Allowance on U.S. Appl. No. 14/143,613 dated Apr. 8, 2016.
English Translation of 4th Chinese Office Action dated Oct. 12, 2015 in Chinese Patent Application No. 201080064083.0.
European Communication Pursuant to Article 94(3) EPC on EP Application No. 10840110 dated Sep. 2, 2015.
First Examination Report for IN Appl. No. 5850/CHENP/2012, dated Mar. 11, 2019.

* cited by examiner

SYSTEMS AND METHODS FOR MANAGING SPILLOVER LIMITS IN A MULTI-CORE SYSTEM

RELATED APPLICATIONS

This application is a continuation of, and claims the benefit of and priority to, U.S. Non-provisional application Ser. No. 12/976,697, titled "Systems and Methods For Managing Spillover Limits In A Multi-Core System" and filed on Dec. 22, 2010 and issued as U.S. Pat. No. 9,098,335 on Aug. 4, 2015, which in turn claims the benefit of and priority to U.S. Provisional Application No. 61/289,536, titled "Systems and Methods For Managing Spillover Limits In A Multi-Core System" and filed on Dec. 23, 2009, both of which are incorporated herein by reference in their entirety.

FIELD OF THE INVENTION

The present application generally relates to data communication networks. In particular, the present application relates to systems and methods for handling spillover in conjunction with limit parameters across cores in a multi-core system.

BACKGROUND OF THE INVENTION

As any resource possesses finite capacity, use of a resource over a network will be subject to inherent or imposed limits. In a single processor system, the processor may field all of these requests to use a resource. The processor may process multiple uses of the resource in parallel according to the processor's own capacity. In a multi-core system, requests to use the resource may be handled by different cores at different times. Each of the cores may be running at different capacity. It is challenging to manage the use of the resource across the different cores.

BRIEF SUMMARY OF THE INVENTION

The present application is directed towards handling limit parameters for spillover conditions of virtual servers across multiple cores in a multi-core system. In general overview, a limit parameter for a resource may indicate the maximum number of uses for the resource. A pool manager may manage this number of uses for the resource. The pool manager may determine an exclusive quota pool and a shared quota pool from the limit. The pool manager may allocate to each packet processing engine operating on a core of the multi-core system an exclusive number of uses from the exclusive quota pool. Each packet processing engine may use the resource up to the exclusive number of uses, without further restrictions. If a packet processing engine wishes to use the resource beyond its exclusive number, the packet processing engine may borrow uses from the shared quota pool. When the packet processing engine completes uses of the resource, the packet processing engine may return uses to the shared quota pool. However, if the packet processing engine may not borrow uses from the shared quota pool, the engine may spillover into another engine that is not using all of its exclusive uses.

In some aspects, the present disclosure is related to a method of managing spillover via a plurality of cores of a multi-core device intermediary to a plurality of clients and one or more services. The method includes identifying, for a device intermediary to a plurality of clients and one or more services, a spillover limit of a resource. The device may includes a plurality of virtual servers operating on a corresponding core of a plurality of cores of the device. The method further includes allocating, by a pool manager of the device, to each of the plurality of virtual servers, a number of resource uses from an exclusive quota pool and shared quota pool based on the spillover limit. The device may determine that the number of resources used by a virtual server of the plurality of virtual servers has reached the allocated number of resource uses of the virtual server, and responsive to the determination, forwarding of a backup virtual server a request of a client of the plurality of clients received by the device for the virtual server.

In some embodiments, the method includes identifying for the device the spillover limit as a maximum number of connections to a service of the one or more services. In the embodiments, the method includes identifying for the device the spillover limit as a dynamic connection threshold, the dynamic connection threshold determined from a sum of a connection capacity of each of the plurality of virtual servers. In some embodiments, the method includes identifying for the device the spillover limit as a bandwidth threshold.

In some embodiments, the method includes allocating, by the pool manager, the number of resource uses comprising a number of exclusive uses from the exclusive quota pool and a number of non-exclusive uses from the shared quota pool. In some embodiments, the method includes requesting, by the virtual server, a resource use from the pool manager upon reaching the virtual server's allocation of resource uses. In some embodiments, the method includes determining, by the device, that the number of resource uses available from the pool manager for the virtual server has been exhausted. In some embodiments, the method includes changing the spillover limit to a lower number of resource uses and responsive to the change the one or more of the plurality of virtual servers returning a portion of the allocated number of resource uses to the pool manager. In some embodiments, the method includes changing the spillover limit to a higher number of resource uses and responsive to the change, one or more the plurality of virtual servers requesting from the pool manager an additional the number of resource uses. In some embodiments, the method includes designating a first core of the plurality of cores as spillover master for monitoring the service and changing the spillover limit based on monitoring.

In some aspects, the present disclosure is directed to a system for managing spillover via a plurality of cores of a multi-core device intermediary to a plurality of clients and one or more services. The system may include a device intermediary to a plurality of clients and one or more services. The system may include a spillover limit of a resource. The device may also include a plurality of packet engines operating on a corresponding core of a plurality of cores of the device. The system may include a pool manager allocating to each of the plurality of packet engines a number of resource uses from an exclusive quota pool and shared quota pool based on the spillover limit. The device may also include a virtual server of a packet engine of the plurality of packet engines. The virtual server manages client requests to one or more services. The device determines that the number of resources used by a packet engine of the plurality of packet engine has reached the allocated number of resource uses of the packet engine, and responsive to the determination, forwards to a backup virtual server a request of a client of the plurality of clients received by the device for the virtual server.

In some embodiments, the device identifies the spillover limit as a maximum number of connections to a service of the one or more services. In some embodiments, the device identifies the spillover limit as a dynamic connection threshold, the dynamic connection threshold determined from a sum of a connection capacity of each of the plurality of virtual servers. In some embodiments, the device identifies the spillover limit as a bandwidth threshold.

In some embodiments, the pool manager allocates the number of resource uses comprising a number of exclusive uses from the exclusive quota pool and a number of non-exclusive uses from the shared quota pool. In some embodiments, the packet engine requests a resource use from the pool manager upon reaching the packet engine's allocation of resource uses. In some embodiments, the device determines that the number of resource uses available from the pool manager has been exhausted. In some embodiments, the device changes the spillover limit to a lower number of resource uses and responsive to the change, one or more of the plurality of packet engines returning a portion of the allocated number of resource uses to the pool manager. In some embodiments, the device changes the spillover limit to a higher number of resource uses and responsive to the change, one or more the plurality of packet engines requesting from the pool manager an additional the number of resource uses. In some embodiments, the device designates a first packet engine of the plurality of packet engines as spillover master for monitoring the service and changing the spillover limit based on monitoring.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which.

Figure 1A:
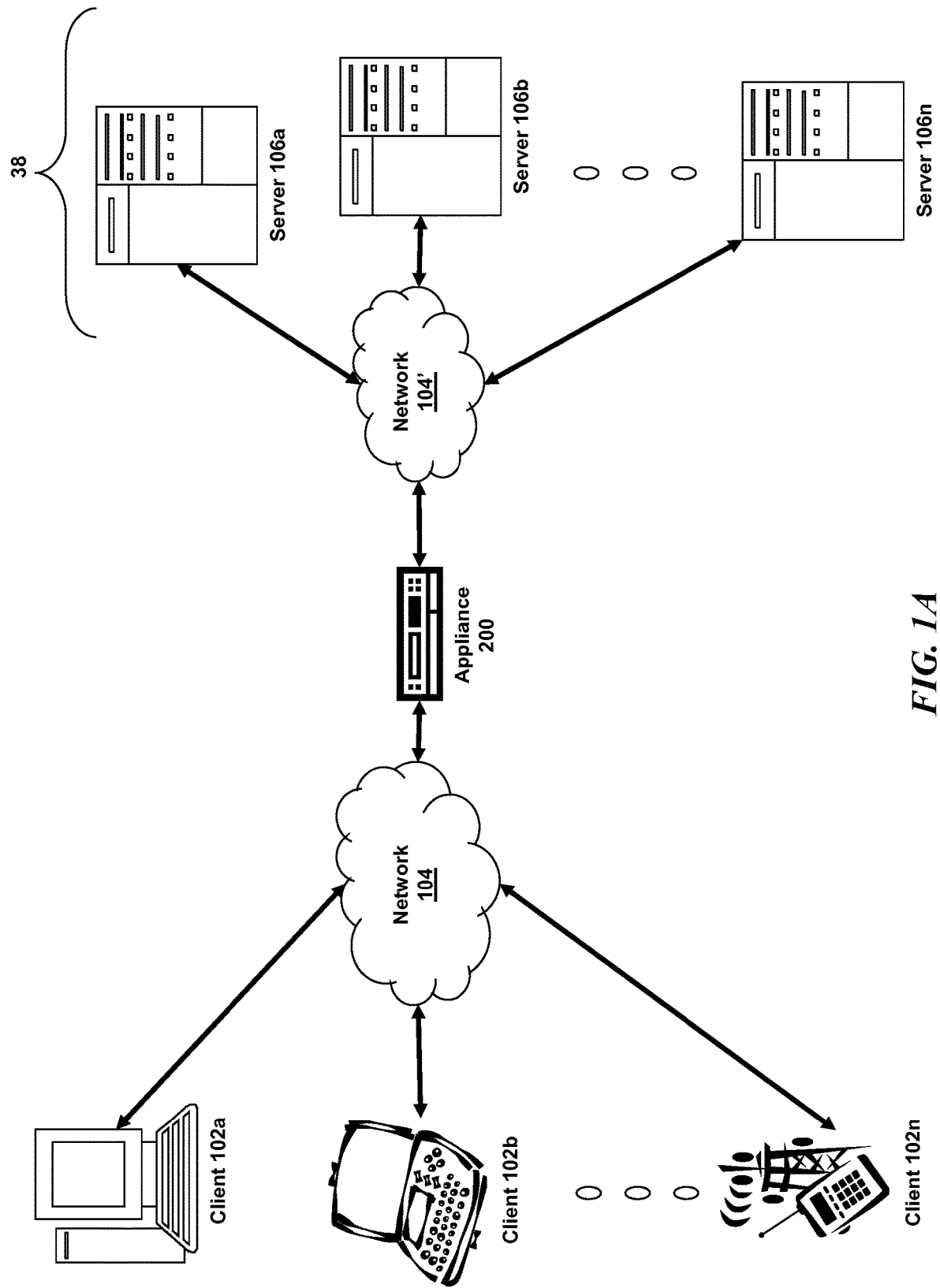
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for accelerating communications between a client and a server;

Section D describes embodiments of systems and methods for virtualizing an application delivery controller;

Section E describes embodiments of systems and methods for providing a multi-core architecture and environment;

Section E describes embodiments of systems and methods for dynamic connection spillover among virtual servers;

Section F describes embodiments of systems and methods for dynamic spillover of virtual servers based on bandwidth;

Section G describes embodiments of systems and methods for health based spillover among virtual servers; and Section H describes embodiments of systems and methods for handling spillover in conjunction with limit parameters for multi-core systems.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
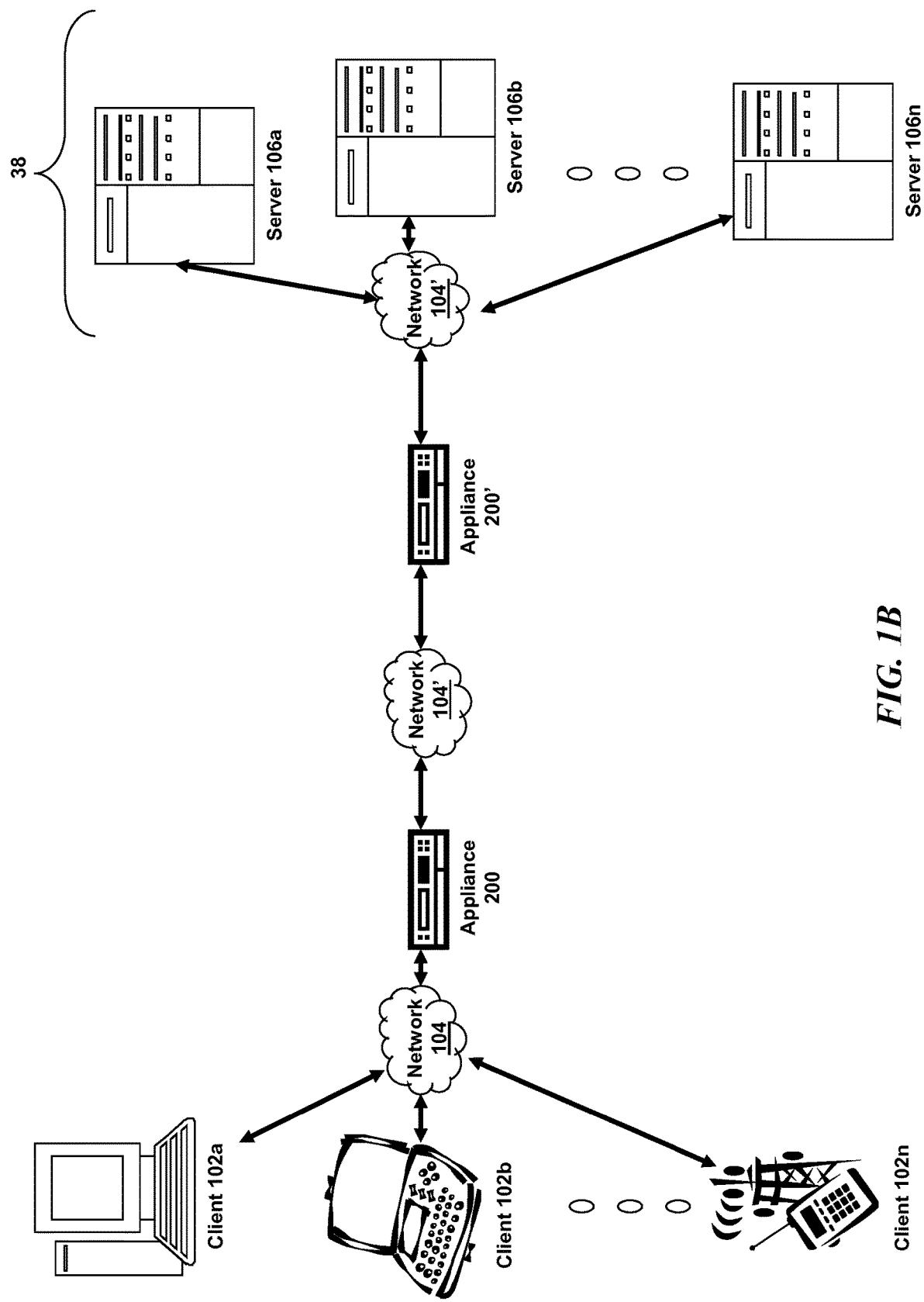
FIG. 1B is a block diagram of an embodiment of an environment for delivering a computing environment from a server to a client via an appliance.
Figure 1C:
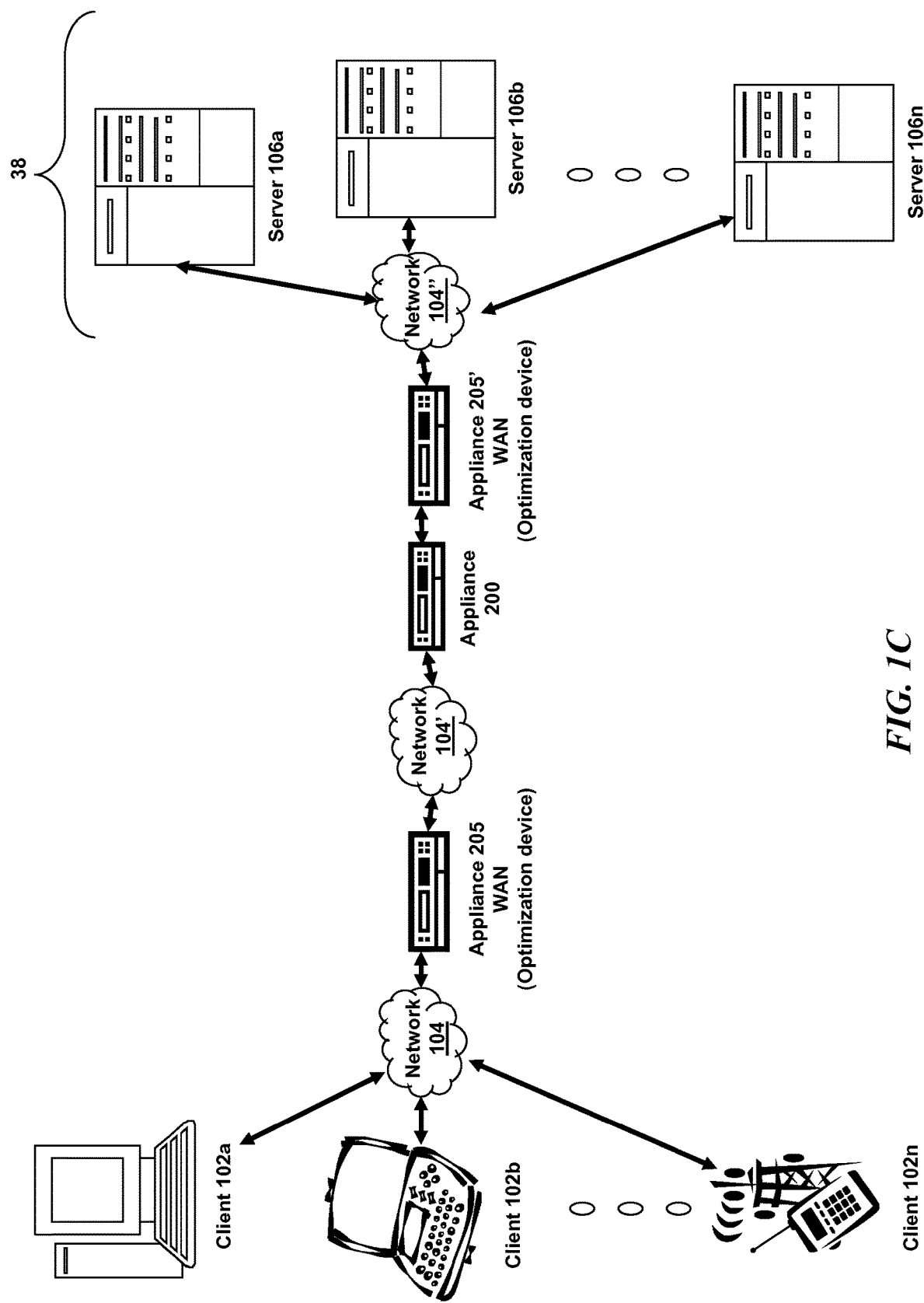
FIG. 1C is a block diagram of another embodiment of an environment for delivering a computing environment from a server to a client via an appliance.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and s second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
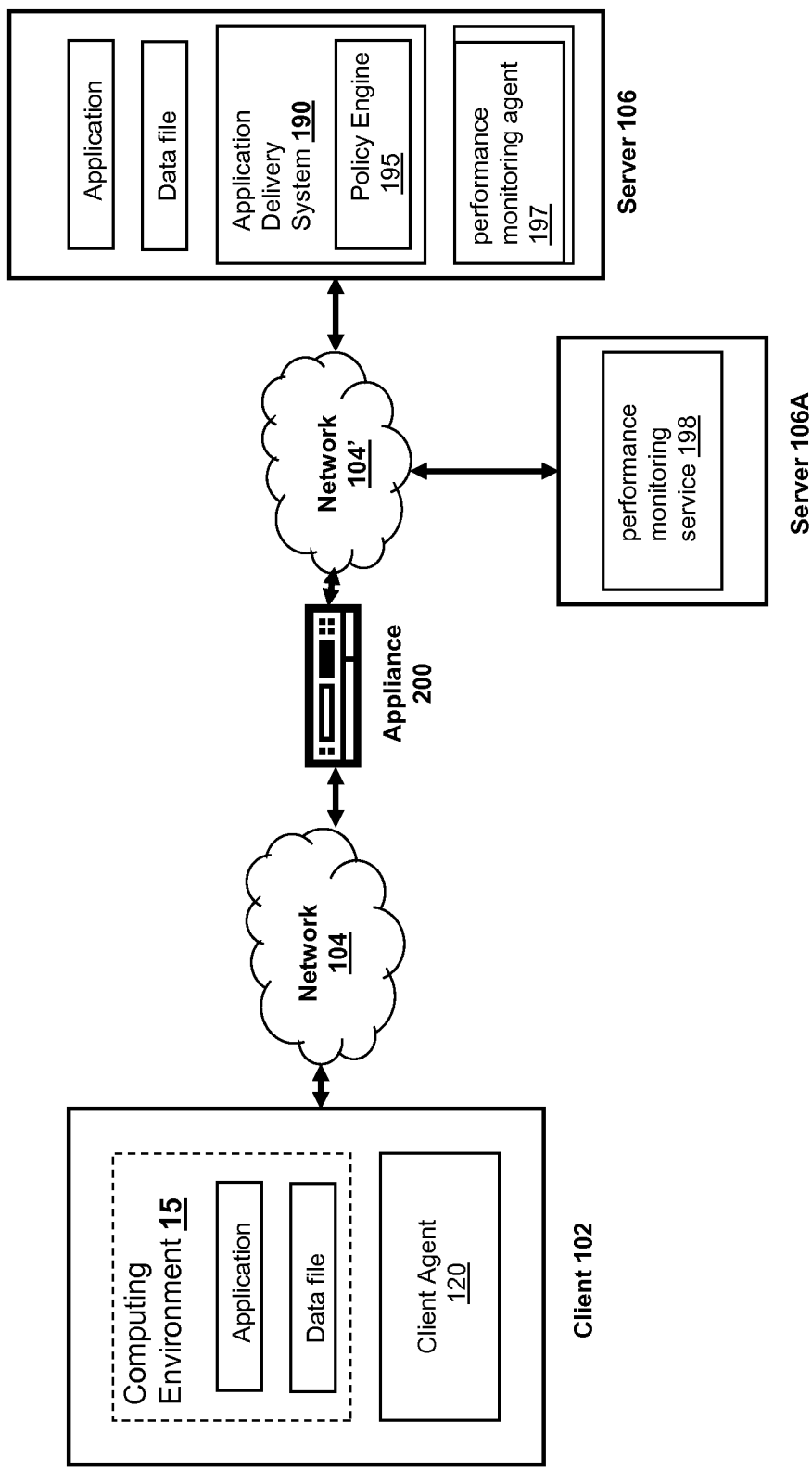
FIG. 1D is a block diagram of another embodiment of an environment for delivering a computing environment from a server to a client via an appliance.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
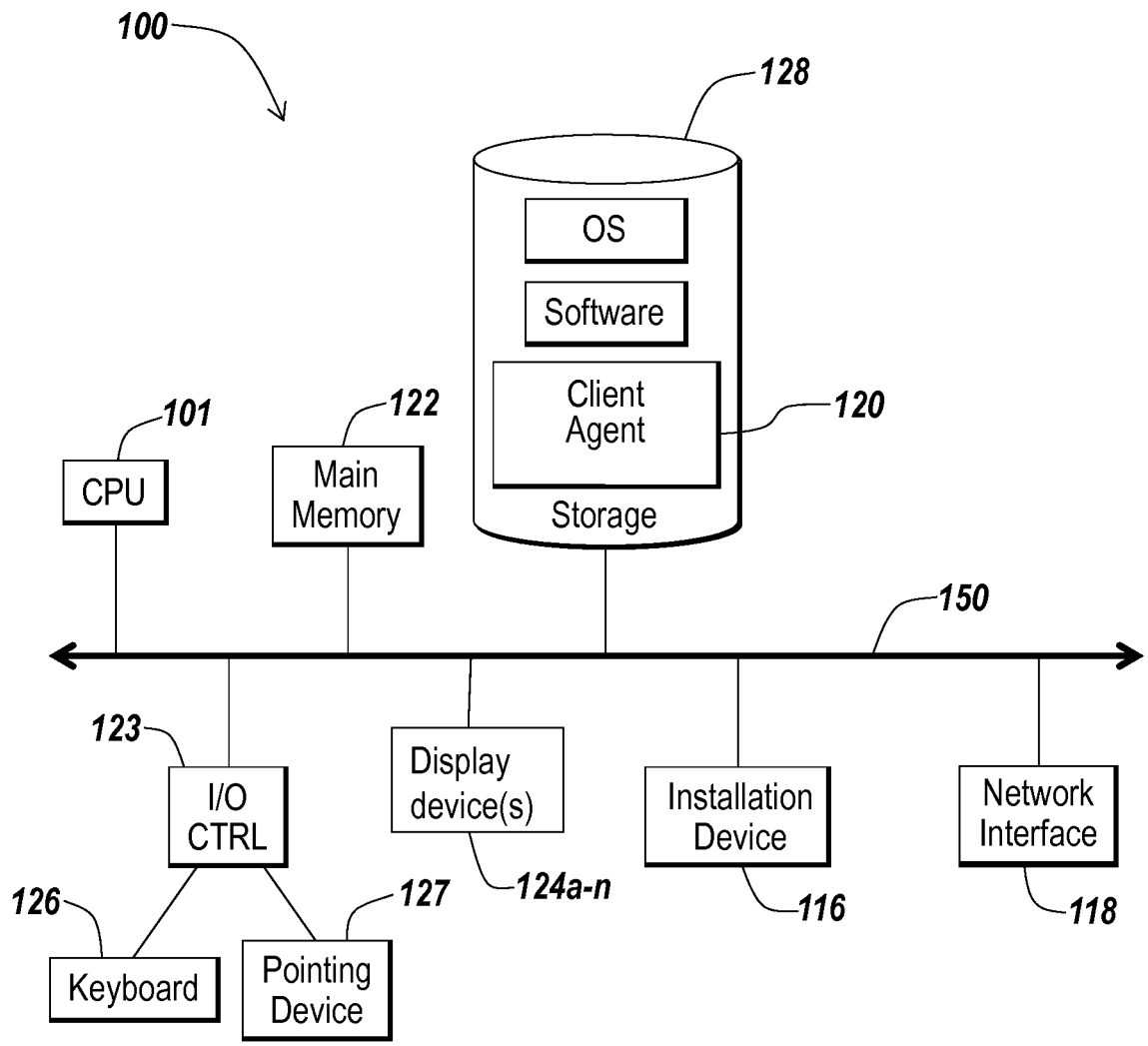
FIGS. 1E-1H are block diagrams of embodiments of a computing device.
Figure 1F:
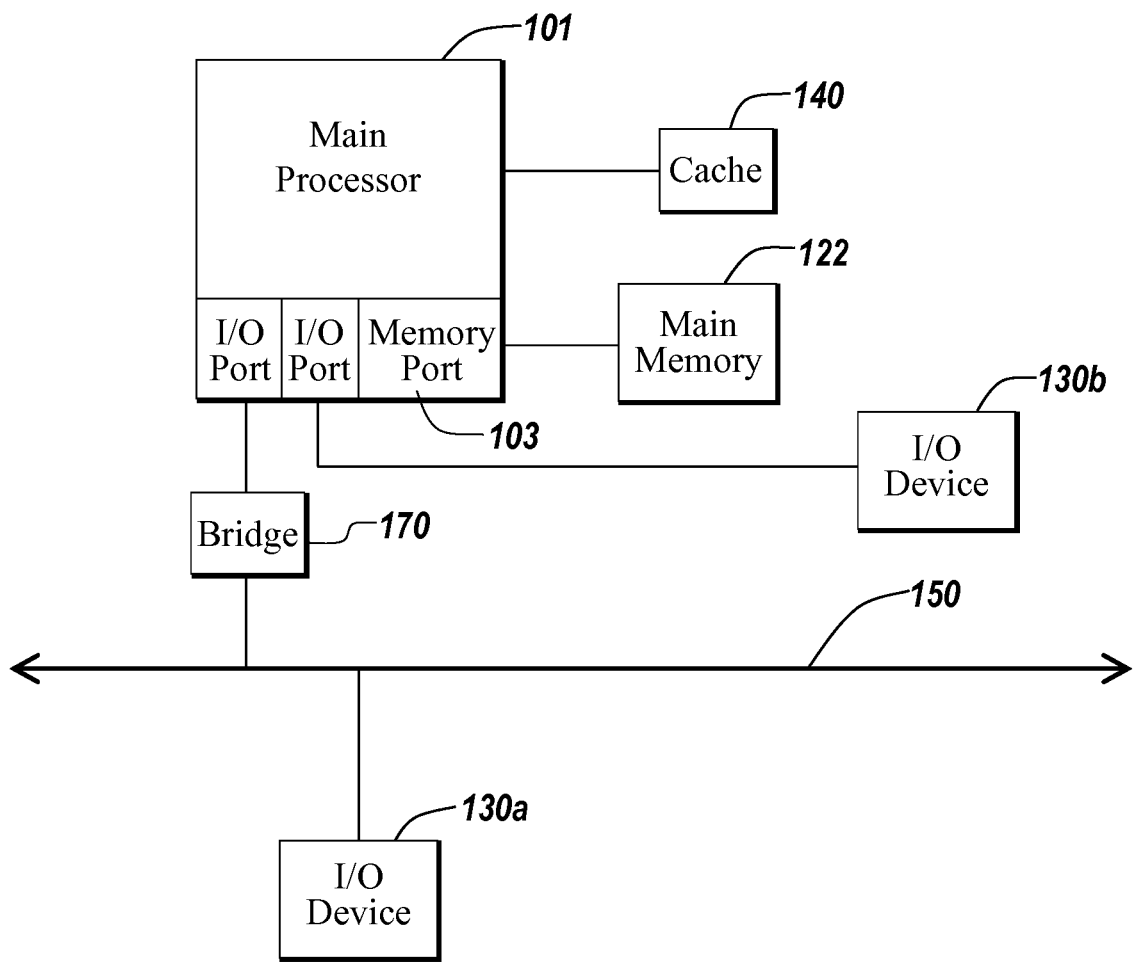

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130*a*-130*b* (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1E depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1E, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130 via Hyper-Transport, Rapid I/O, or InfiniBand. FIG. 1F also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein. A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1G:
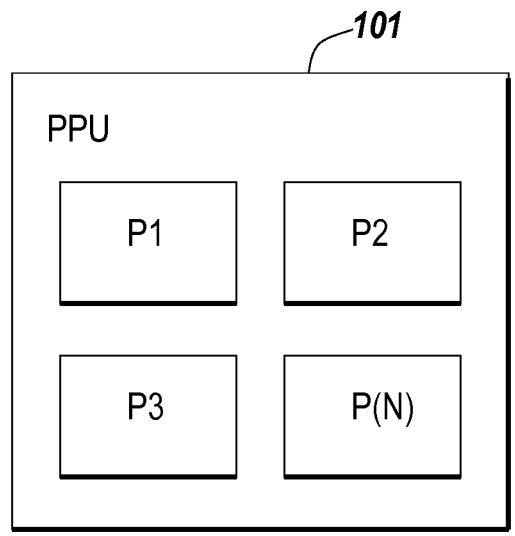

As shown in FIG. 1G, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1H:
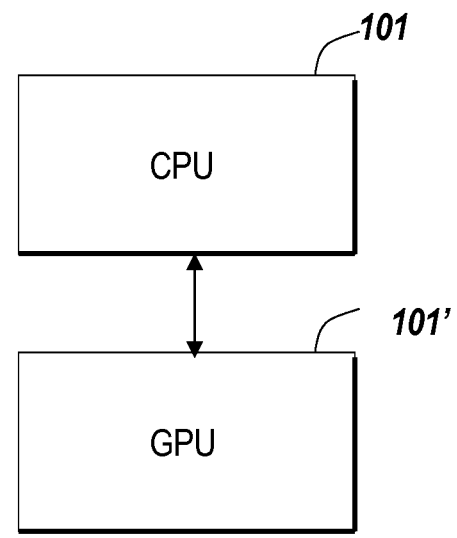

In some embodiments, the computing device 100 may comprise a graphics processing unit. In one of these embodiments, depicted in FIG. 1H, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Appliance Architecture

Figure 2A:
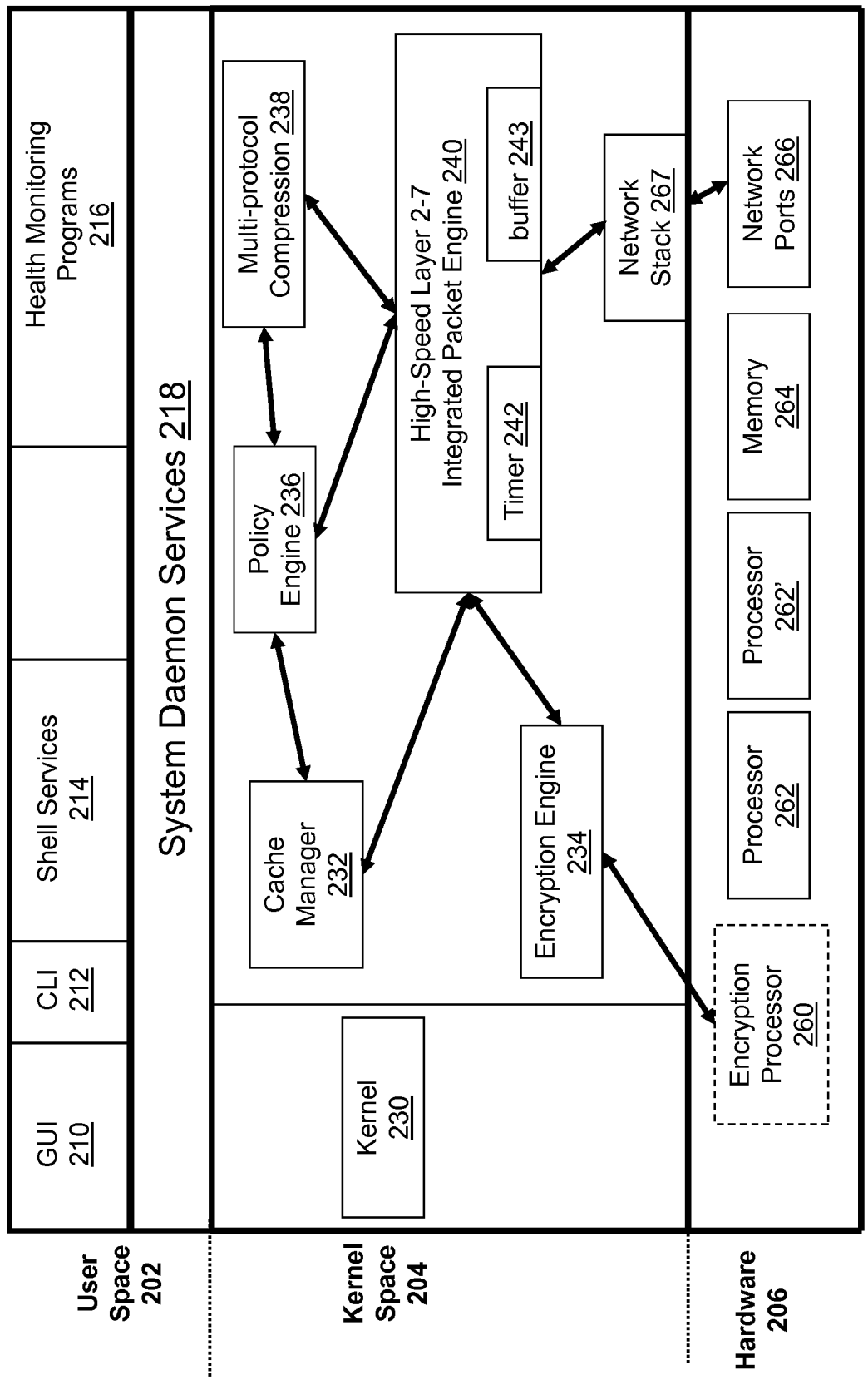
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identify, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), Hyper-Text Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packet. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200. The GUI 210 or CLI 212 can comprise code running in user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
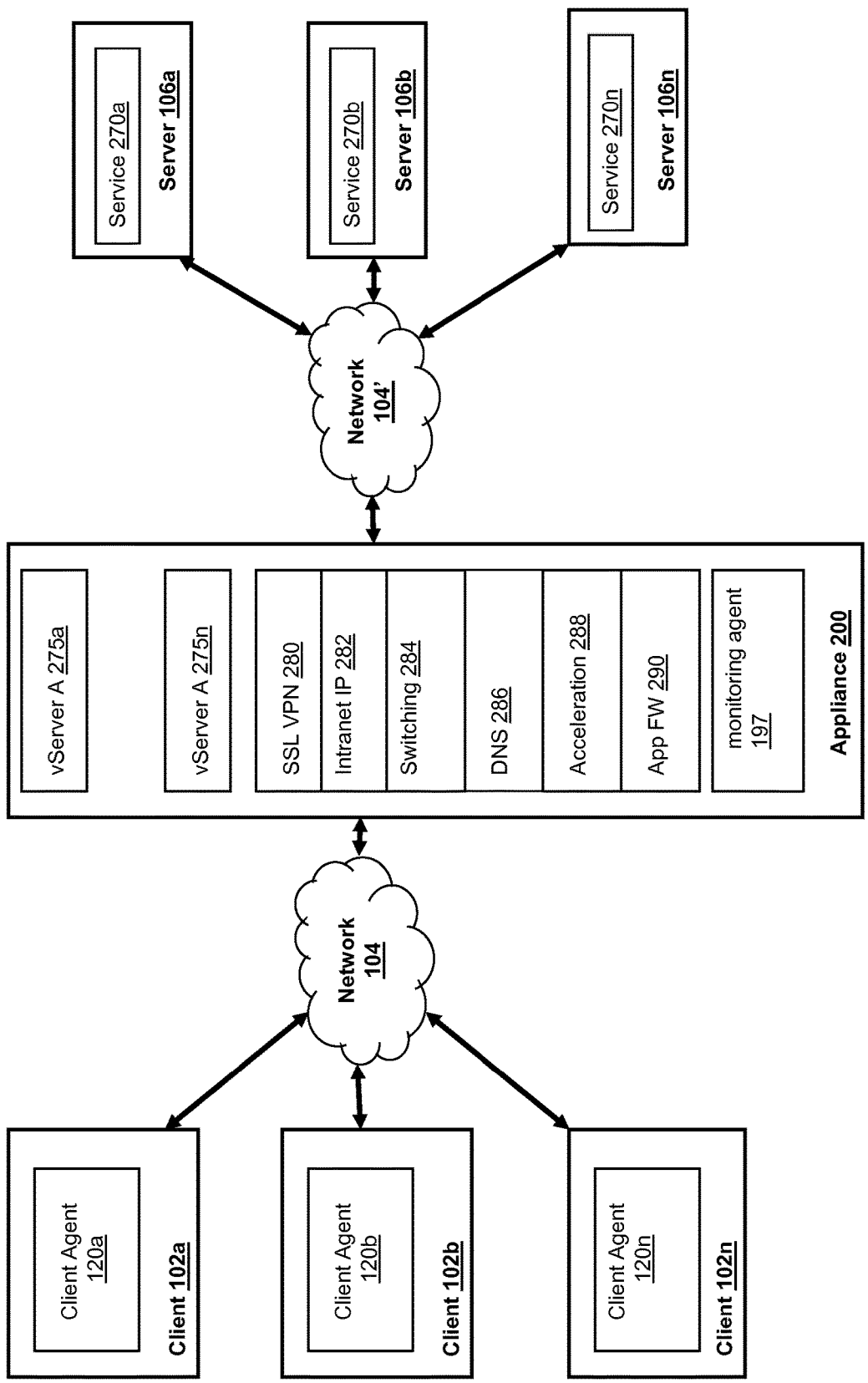
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a VServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 102 In one embodiment, the appliance 200 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or intranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP, which is network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts' a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 198 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Client Agent

Figure 3:
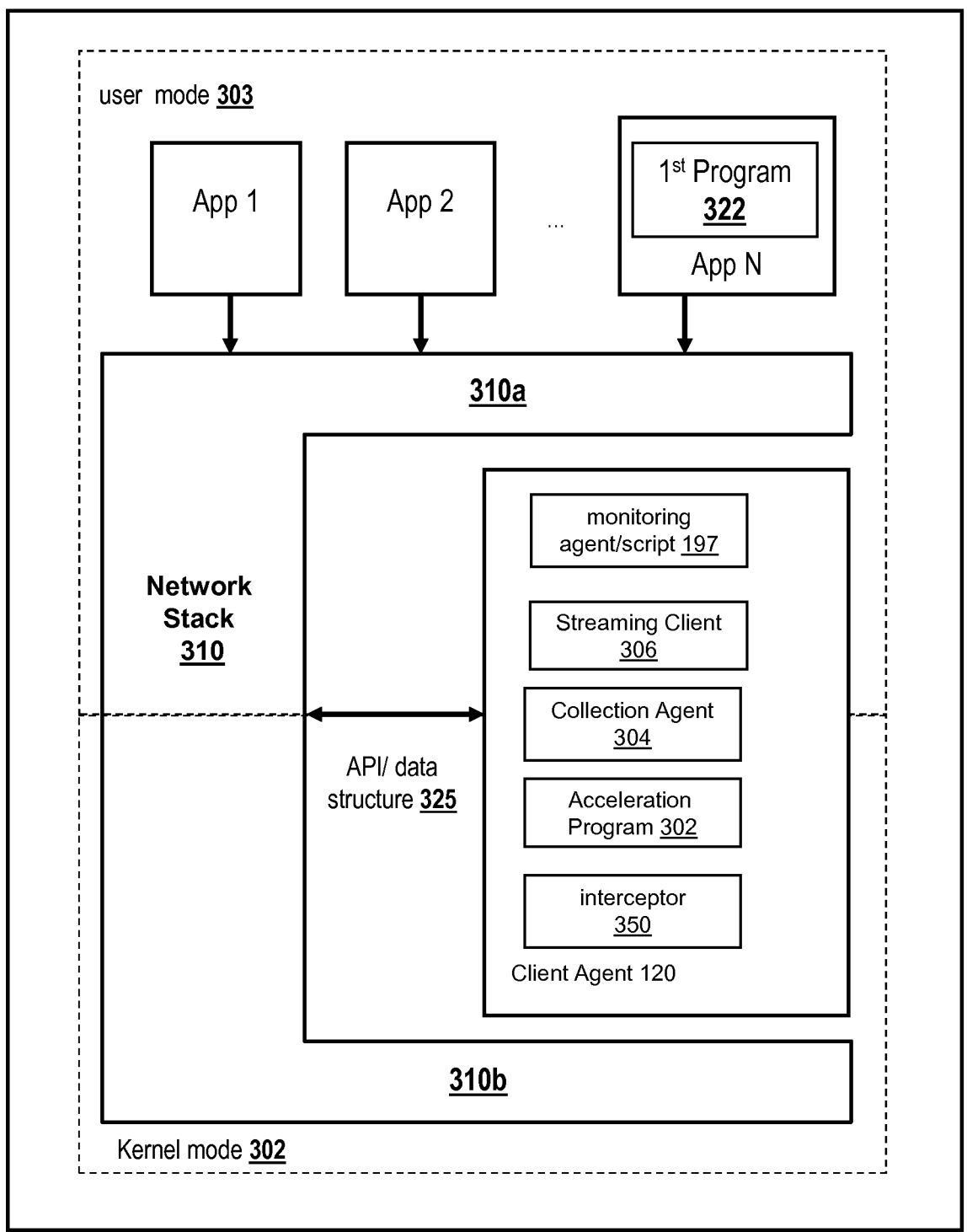
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 120 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a min-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, a collection agent 304, and/or monitoring agent 197. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol.

The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments, the client agent 120 includes a monitoring agent 197 as discussed in conjunction with FIGS. 1D and 2B. The monitoring agent 197 may be any type and form of script, such as Visual Basic or Java script. In one embodiment, the monitoring agent 129 monitors and measures performance of any portion of the client agent 120. For example, in some embodiments, the monitoring agent 129 monitors and measures performance of the acceleration program 302. In another embodiment, the monitoring agent 129 monitors and measures performance of the streaming client 306. In other embodiments, the monitoring agent 129 monitors and measures performance of the collection agent 304. In still another embodiment, the monitoring agent 129 monitors and measures performance of the interceptor 350. In some embodiments, the monitoring agent 129 monitors and measures any resource of the client 102, such as memory, CPU and disk.

The monitoring agent 197 may monitor and measure performance of any application of the client. In one embodiment, the monitoring agent 129 monitors and measures performance of a browser on the client 102. In some embodiments, the monitoring agent 197 monitors and measures performance of any application delivered via the client agent 120. In other embodiments, the monitoring agent 197 measures and monitors end user response times for an application, such as web-based or HTTP response times. The monitoring agent 197 may monitor and measure performance of an ICA or RDP client. In another embodiment, the monitoring agent 197 measures and monitors metrics for a user session or application session. In some embodiments, monitoring agent 197 measures and monitors an ICA or RDP session. In one embodiment, the monitoring agent 197 measures and monitors the performance of the appliance 200 in accelerating delivery of an application and/or data to the client 102.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

D. Systems and Methods for Providing Virtualized Application Delivery Controller Referring now to FIG. 4A, a block diagram depicts one embodiment of a virtualization environment 400. In brief overview, a computing device 100 includes a hypervisor layer, a virtualization layer, and a hardware layer. The hypervisor layer includes a hypervisor 401 (also referred to as a virtualization manager) that allocates and manages access to a number of physical resources in the hardware layer (e.g., the processor(s) 421, and disk(s) 428) by at least one virtual machine executing in the virtualization layer. The virtualization layer includes at least one operating system 410 and a plurality of virtual resources allocated to the at least one operating system 410. Virtual resources may include, without limitation, a plurality of virtual processors 432a, 432b, 432c (generally 432), and virtual disks 442a, 442b, 442c (generally 442), as well as virtual resources such as virtual memory and virtual network interfaces. The plurality of virtual resources and the operating system 410 may be referred to as a virtual machine 406. A virtual machine 406 may include a control operating system 405 in communication with the hypervisor 401 and used to execute applications for managing and configuring other virtual machines on the computing device 100.

In greater detail, a hypervisor 401 may provide virtual resources to an operating system in any manner which simulates the operating system having access to a physical device. A hypervisor 401 may provide virtual resources to any number of guest operating systems 410a, 410b (generally 410). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor that creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 401 executes within an operating system executing on a computing device. In one of these embodiments, a computing device executing an operating system and a hypervisor 401 may be said to have a host operating system (the operating system executing on the computing device), and a guest operating system (an operating system executing within a computing resource partition provided by the hypervisor 401). In other embodiments, a hypervisor 401 interacts directly with hardware on a computing device, instead of executing on a host operating system. In one of these embodiments, the hypervisor 401 may be said to be executing on "bare metal," referring to the hardware comprising the computing device.

In some embodiments, a hypervisor 401 may create a virtual machine 406a-c (generally 406) in which an operating system 410 executes. In one of these embodiments, for example, the hypervisor 401 loads a virtual machine image to create a virtual machine 406. In another of these embodiments, the hypervisor 401 executes an operating system 410 within the virtual machine 406. In still another of these embodiments, the virtual machine 406 executes an operating system 410.

In some embodiments, the hypervisor 401 controls processor scheduling and memory partitioning for a virtual machine 406 executing on the computing device 100. In one of these embodiments, the hypervisor 401 controls the execution of at least one virtual machine 406. In another of these embodiments, the hypervisor 401 presents at least one virtual machine 406 with an abstraction of at least one hardware resource provided by the computing device 100. In other embodiments, the hypervisor 401 controls whether and how physical processor capabilities are presented to the virtual machine 406.

A control operating system 405 may execute at least one application for managing and configuring the guest operating systems. In one embodiment, the control operating system 405 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 401 executes the control operating system 405 within a virtual machine 406 created by the hypervisor 401. In still another embodiment, the control operating system 405 executes in a virtual machine 406 that is authorized to directly access physical resources on the computing device 100. In some embodiments, a control operating system 405a on a computing device 100a may exchange data with a control operating system 405b on a computing device 100b, via communications between a hypervisor 401a and a hypervisor 401b. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 405 executes in a virtual machine 406 that is authorized to interact with at least one guest operating system 410. In another embodiment, a guest operating system 410 communicates with the control operating system 405 via the hypervisor 401 in order to request access to a disk or a network. In still another embodiment, the guest operating system 410 and the control operating system 405 may communicate via a communication channel established by the hypervisor 401, such as, for example, via a plurality of shared memory pages made available by the hypervisor 401.

In some embodiments, the control operating system 405 includes a network back-end driver for communicating directly with networking hardware provided by the computing device 100. In one of these embodiments, the network back-end driver processes at least one virtual machine request from at least one guest operating system 110. In other embodiments, the control operating system 405 includes a block back-end driver for communicating with a storage element on the computing device 100. In one of these embodiments, the block back-end driver reads and writes data from the storage element based upon at least one request received from a guest operating system 410.

In one embodiment, the control operating system 405 includes a tools stack 404. In another embodiment, a tools stack 404 provides functionality for interacting with the hypervisor 401, communicating with other control operating systems 405 (for example, on a second computing device 100b), or managing virtual machines 406b, 406c on the computing device 100. In another embodiment, the tools stack 404 includes customized applications for providing improved management functionality to an administrator of a virtual machine farm. In some embodiments, at least one of the tools stack 404 and the control operating system 405 include a management API that provides an interface for remotely configuring and controlling virtual machines 406 running on a computing device 100. In other embodiments, the control operating system 405 communicates with the hypervisor 401 through the tools stack 104.

In one embodiment, the hypervisor 401 executes a guest operating system 410 within a virtual machine 406 created by the hypervisor 401. In another embodiment, the guest operating system 410 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 410, in conjunction with the virtual machine on which it executes, forms a fully-virtualized virtual machine which is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 401. In such an embodiment, the driver may be aware that it executes within a virtualized environment. In another embodiment, the guest operating system 410, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 405, as described above.

Figure 4A:
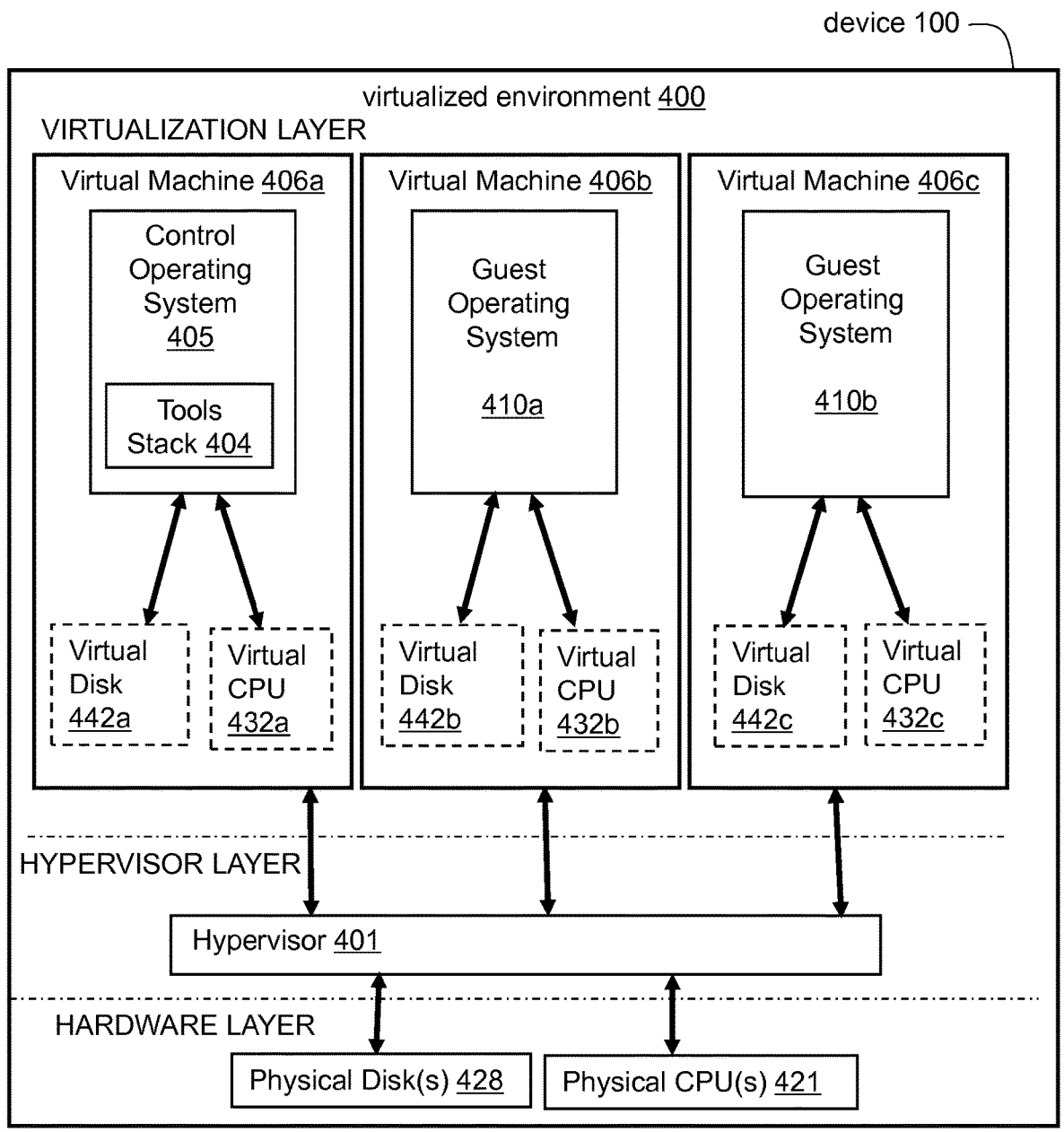
FIG. 4A is a block diagram of an embodiment of a virtualization environment.
Figure 4B:
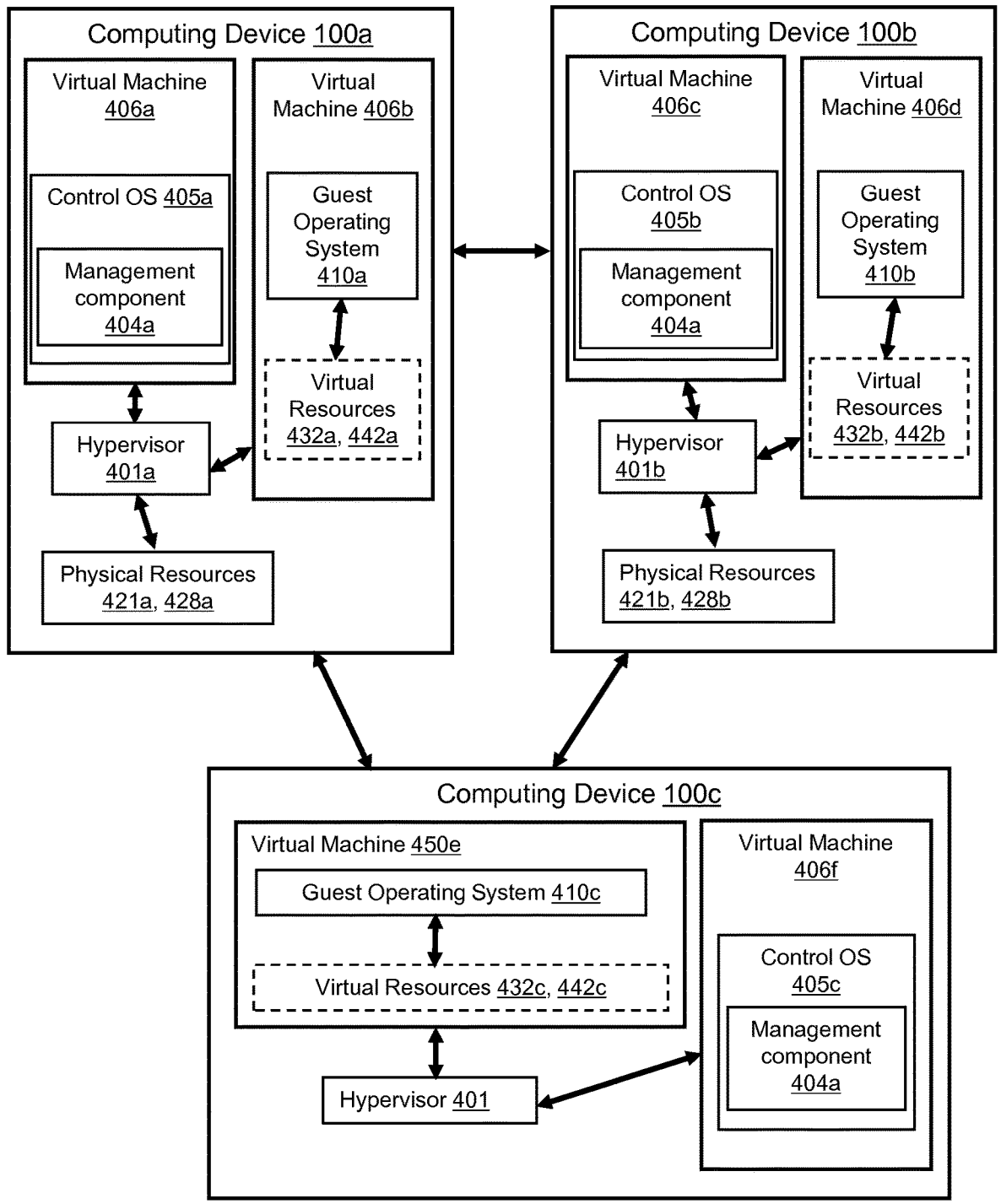
FIG. 4B is a block diagram of another embodiment of a virtualization environment.

Referring now to FIG. 4B, a block diagram depicts one embodiment of a plurality of networked computing devices in a system in which at least one physical host executes a virtual machine. In brief overview, the system includes a management component 404 and a hypervisor 401. The system includes a plurality of computing devices 100, a plurality of virtual machines 406, a plurality of hypervisors 401, a plurality of management components referred to as tools stacks 404, and a physical resource 421, 428. The plurality of physical machines 100 may each be provided as computing devices 100, described above in connection with FIGS. 1E-1H and 4A.

In greater detail, a physical disk 428 is provided by a computing device 100 and stores at least a portion of a virtual disk 442. In some embodiments, a virtual disk 442 is associated with a plurality of physical disks 428. In one of these embodiments, one or more computing devices 100 may exchange data with one or more of the other computing devices 100 regarding processors and other physical resources available in a pool of resources, allowing a hypervisor to manage a pool of resources distributed across a plurality of physical computing devices. In some embodiments, a computing device 100 on which a virtual machine 406 executes is referred to as a physical host 100 or as a host machine 100.

The hypervisor executes on a processor on the computing device 100. The hypervisor allocates, to a virtual disk, an amount of access to the physical disk. In one embodiment, the hypervisor 401 allocates an amount of space on the physical disk. In another embodiment, the hypervisor 401 allocates a plurality of pages on the physical disk. In some embodiments, the hypervisor provisions the virtual disk 442 as part of a process of initializing and executing a virtual machine 450.

In one embodiment, the management component 404a is referred to as a pool management component 404a. In another embodiment, a management operating system 405a, which may be referred to as a control operating system 405a, includes the management component. In some embodiments, the management component is referred to as a tools stack. In one of these embodiments, the management component is the tools stack 404 described above in connection with FIG. 4A. In other embodiments, the management component 404 provides a user interface for receiving, from a user such as an administrator, an identification of a virtual machine 406 to provision and/or execute. In still other embodiments, the management component 404 provides a user interface for receiving, from a user such as an administrator, the request for migration of a virtual machine 406b from one physical machine 100 to another. In further embodiments, the management component 404a identifies a computing device 100b on which to execute a requested virtual machine 406d and instructs the hypervisor 401b on the identified computing device 100b to execute the identified virtual machine; such a management component may be referred to as a pool management component.

Figure 4C:
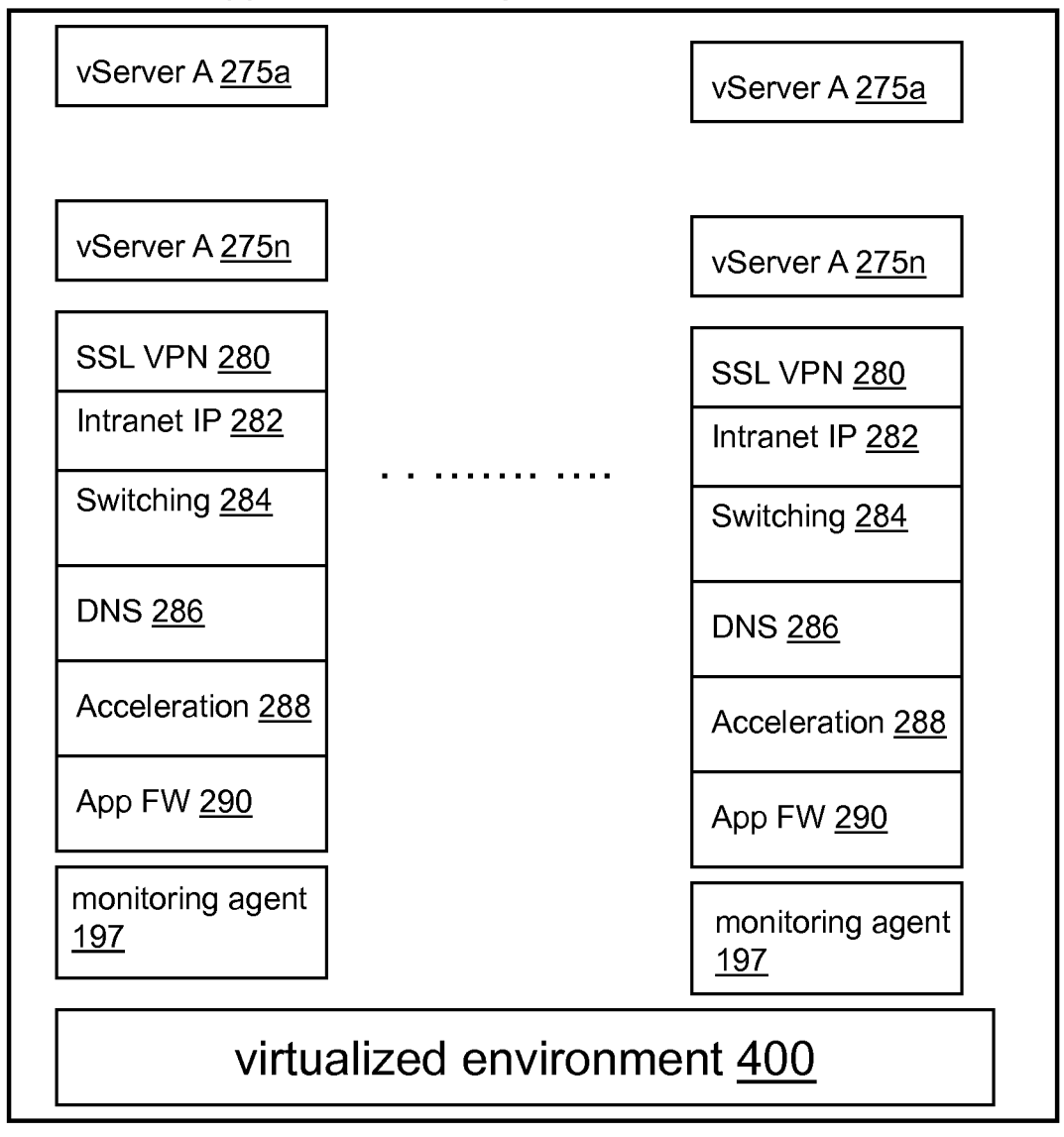
FIG. 4C is a block diagram of an embodiment of a virtualized appliance.

Referring now to FIG. 4C, embodiments of a virtual application delivery controller or virtual appliance 450 are depicted. In brief overview, any of the functionality and/or embodiments of the appliance 200 (e.g., an application delivery controller) described above in connection with FIGS. 2A and 2B may be deployed in any embodiment of the virtualized environment described above in connection with FIGS. 4A and 4B. Instead of the functionality of the application delivery controller being deployed in the form of an appliance 200, such functionality may be deployed in a virtualized environment 400 on any computing device 100, such as a client 102, server 106 or appliance 200.

Referring now to FIG. 4C, a diagram of an embodiment of a virtual appliance 450 operating on a hypervisor 401 of a server 106 is depicted. As with the appliance 200 of FIGS. 2A and 2B, the virtual appliance 450 may provide functionality for availability, performance, offload and security. For availability, the virtual appliance may perform load balancing between layers 4 and 7 of the network and may also perform intelligent service health monitoring. For performance increases via network traffic acceleration, the virtual appliance may perform caching and compression. To offload processing of any servers, the virtual appliance may perform connection multiplexing and pooling and/or SSL processing. For security, the virtual appliance may perform any of the application firewall functionality and SSL VPN function of appliance 200.

Any of the modules of the appliance 200 as described in connection with FIG. 2A may be packaged, combined, designed or constructed in a form of the virtualized appliance delivery controller 450 deployable as one or more software modules or components executable in a virtualized environment 300 or non-virtualized environment on any server, such as an off the shelf server. For example, the virtual appliance may be provided in the form of an installation package to install on a computing device. With reference to FIG. 2A, any of the cache manager 232, policy engine 236, compression 238, encryption engine 234, packet engine 240, GUI 210, CLI 212, shell services 214 and health monitoring programs 216 may be designed and constructed as a software component or module to run on any operating system of a computing device and/or of a virtualized environment 300. Instead of using the encryption processor 260, processor 262, memory 264 and network stack 267 of the appliance 200, the virtualized appliance 400 may use any of these resources as provided by the virtualized environment 400 or as otherwise available on the server 106.

Still referring to FIG. 4C, and in brief overview, any one or more vServers 275A-275N may be in operation or executed in a virtualized environment 400 of any type of computing device 100, such as any server 106. Any of the modules or functionality of the appliance 200 described in connection with FIG. 2B may be designed and constructed to operate in either a virtualized or non-virtualized environment of a server. Any of the vServer 275, SSL VPN 280, Intranet UP 282, Switching 284, DNS 286, acceleration 288, App FW 280 and monitoring agent may be packaged, combined, designed or constructed in a form of application delivery controller 450 deployable as one or more software modules or components executable on a device and/or virtualized environment 400.

In some embodiments, a server may execute multiple virtual machines 406a-406n in the virtualization environment with each virtual machine running the same or different embodiments of the virtual application delivery controller 450. In some embodiments, the server may execute one or more virtual appliances 450 on one or more virtual machines on a core of a multi-core processing system. In some embodiments, the server may execute one or more virtual appliances 450 on one or more virtual machines on each processor of a multiple processor device.

E. Systems and Methods for Providing a Multi-Core Architecture

In accordance with Moore's Law, the number of transistors that may be placed on an integrated circuit may double approximately every two years. However, CPU speed increases may reach plateaus, for example CPU speed has been around 3.5-4 GHz range since 2005. In some cases, CPU manufacturers may not rely on CPU speed increases to gain additional performance. Some CPU manufacturers may add additional cores to their processors to provide additional performance. Products, such as those of software and networking vendors, that rely on CPUs for performance gains may improve their performance by leveraging these multi-core CPUs. The software designed and constructed for a single CPU may be redesigned and/or rewritten to take advantage of a multi-threaded, parallel architecture or otherwise a multi-core architecture.

A multi-core architecture of the appliance 200, referred to as nCore or multi-core technology, allows the appliance in some embodiments to break the single core performance barrier and to leverage the power of multi-core CPUs. In the previous architecture described in connection with FIG. 2A, a single network or packet engine is run. The multiple cores of the nCore technology and architecture allow multiple packet engines to run concurrently and/or in parallel. With a packet engine running on each core, the appliance architecture leverages the processing capacity of additional cores. In some embodiments, this provides up to a 7× increase in performance and scalability.

Figure 5A:
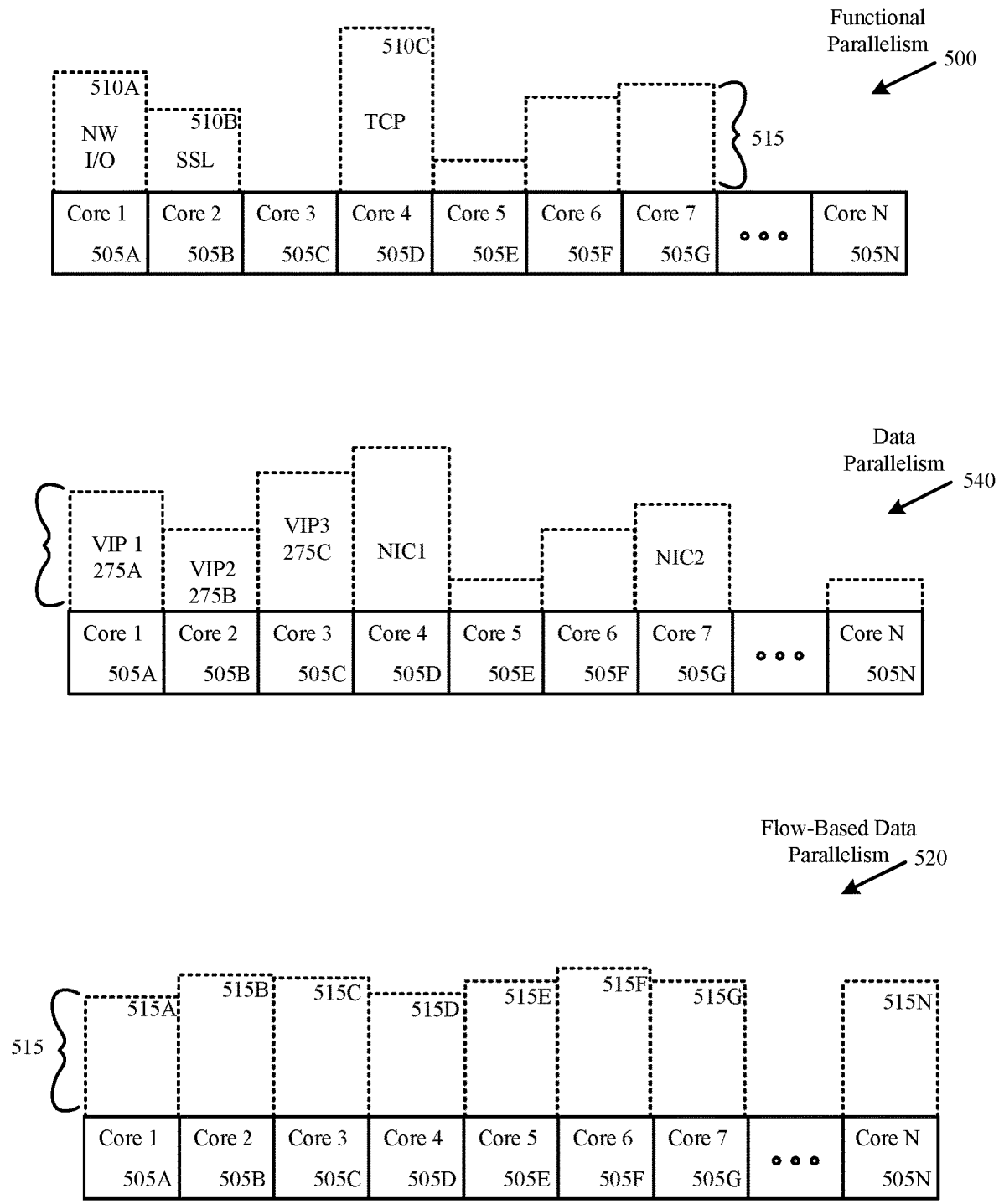
FIG. 5A are block diagrams of embodiments of approaches to implementing parallelism in a multi-core system.

Illustrated in FIG. 5A are some embodiments of work, task, load or network traffic distribution across one or more processor cores according to a type of parallelism or parallel computing scheme, such as functional parallelism, data parallelism or flow-based data parallelism. In brief overview, FIG. 5A illustrates embodiments of a multi-core system such as an appliance 200' with n-cores, a total of cores numbers 1 through N. In one embodiment, work, load or network traffic can be distributed among a first core 505A, a second core 505B, a third core 505C, a fourth core 505D, a fifth core 505E, a sixth core 505F, a seventh core 505G, and so on such that distribution is across all or two or more of the n cores 505N (hereinafter referred to collectively as cores 505.) There may be multiple VIPs 275 each running on a respective core of the plurality of cores. There may be multiple packet engines 240 each running on a respective core of the plurality of cores. Any of the approaches used may lead to different, varying or similar work load or performance level 515 across any of the cores. For a functional parallelism approach, each core may run a different function of the functionalities provided by the packet engine, a VIP 275 or appliance 200. In a data parallelism approach, data may be paralleled or distributed across the cores based on the Network Interface Card (NIC) or VIP 275 receiving the data. In another data parallelism approach, processing may be distributed across the cores by distributing data flows to each core.

In further detail to FIG. 5A, in some embodiments, load, work or network traffic can be distributed among cores 505 according to functional parallelism 500. Functional parallelism may be based on each core performing one or more respective functions. In some embodiments, a first core may perform a first function while a second core performs a second function. In functional parallelism approach, the functions to be performed by the multi-core system are divided and distributed to each core according to functionality. In some embodiments, functional parallelism may be referred to as task parallelism and may be achieved when each processor or core executes a different process or function on the same or different data. The core or processor may execute the same or different code. In some cases, different execution threads or code may communicate with one another as they work. Communication may take place to pass data from one thread to the next as part of a workflow.

In some embodiments, distributing work across the cores 505 according to functional parallelism 500, can comprise distributing network traffic according to a particular function such as network input/output management (NW I/O) 510A, secure sockets layer (SSL) encryption and decryption 510B and transmission control protocol (TCP) functions 510C. This may lead to a work, performance or computing load 515 based on a volume or level of functionality being used. In some embodiments, distributing work across the cores 505 according to data parallelism 540, can comprise distributing an amount of work 515 based on distributing data associated with a particular hardware or software component. In some embodiments, distributing work across the cores 505 according to flow-based data parallelism 520, can comprise distributing data based on a context or flow such that the amount of work 515A-N on each core may be similar, substantially equal or relatively evenly distributed.

In the case of the functional parallelism approach, each core may be configured to run one or more functionalities of the plurality of functionalities provided by the packet engine or VIP of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A, division by function may lead to different cores running at different levels of performance or load 515.

In the case of the functional parallelism approach, each core may be configured to run one or more functionalities of the plurality of functionalities provided by the packet engine of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A division by function may lead to different cores running at different levels of load or performance.

Figure 5B:
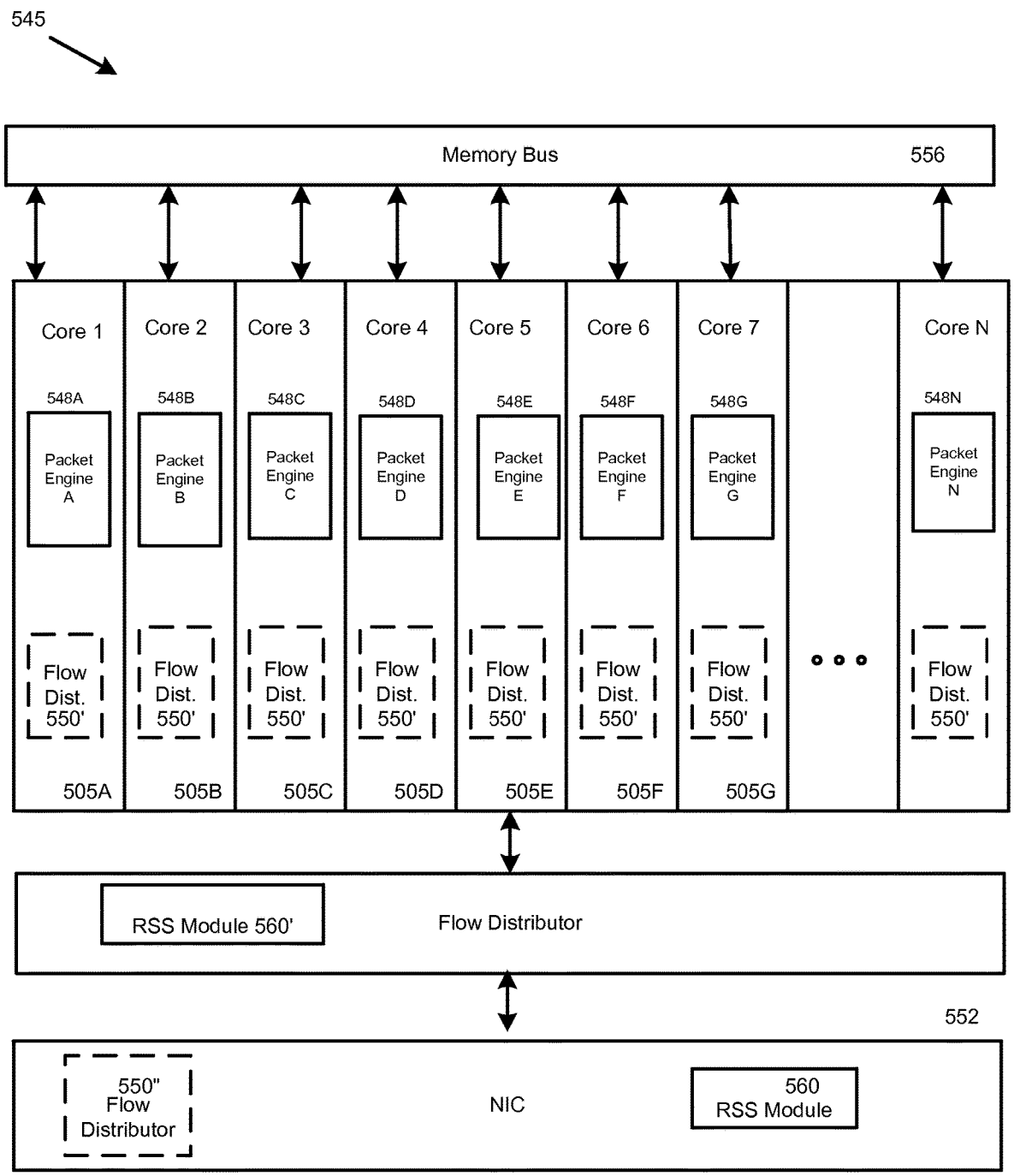
FIG. 5B is a block diagram of an embodiment of a system utilizing a multi-core system.

The functionality or tasks may be distributed in any arrangement and scheme. For example, FIG. 5B illustrates a first core, Core 1 505A, processing applications and processes associated with network I/O functionality 510A. Network traffic associated with network I/O, in some embodiments, can be associated with a particular port number. Thus, outgoing and incoming packets having a port destination associated with NW I/O 510A will be directed towards Core 1 505A which is dedicated to handling all network traffic associated with the NW I/O port. Similarly, Core 2 505B is dedicated to handling functionality associated with SSL processing and Core 4 505D may be dedicated handling all TCP level processing and functionality.

While FIG. 5A illustrates functions such as network I/O, SSL and TCP, other functions can be assigned to cores. These other functions can include any one or more of the functions or operations described herein. For example, any of the functions described in conjunction with FIGS. 2A and 2B may be distributed across the cores on a functionality basis. In some cases, a first VIP 275A may run on a first core while a second VIP 275B with a different configuration may run on a second core. In some embodiments, each core 505 can handle a particular functionality such that each core 505 can handle the processing associated with that particular function. For example, Core 2 505B may handle SSL offloading while Core 4 505D may handle application layer processing and traffic management.

In other embodiments, work, load or network traffic may be distributed among cores 505 according to any type and form of data parallelism 540. In some embodiments, data parallelism may be achieved in a multi-core system by each core performing the same task or functionally on different pieces of distributed data. In some embodiments, a single execution thread or code controls operations on all pieces of data. In other embodiments, different threads or instructions control the operation, but may execute the same code. In some embodiments, data parallelism is achieved from the perspective of a packet engine, vServers (VIPs) 275A-C, network interface cards (NIC) 542D-E and/or any other networking hardware or software included on or associated with an appliance 200. For example, each core may run the same packet engine or VIP code or configuration but operate on different sets of distributed data. Each networking hardware or software construct can receive different, varying or substantially the same amount of data, and as a result may have varying, different or relatively the same amount of load 515

In the case of a data parallelism approach, the work may be divided up and distributed based on VIPs, NICs and/or data flows of the VIPs or NICs. In one of these approaches, the work of the multi-core system may be divided or distributed among the VIPs by having each VIP work on a distributed set of data. For example, each core may be configured to run one or more VIPs. Network traffic may be distributed to the core for each VIP handling that traffic. In another of these approaches, the work of the appliance may be divided or distributed among the cores based on which NIC receives the network traffic. For example, network traffic of a first NIC may be distributed to a first core while network traffic of a second NIC may be distributed to a second core. In some cases, a core may process data from multiple NICs.

While FIG. 5A illustrates a single vServer associated with a single core 505, as is the case for VIP1 275A, VIP2 275B and VIP3 275C. In some embodiments, a single vServer can be associated with one or more cores 505. In contrast, one or more vServers can be associated with a single core 505. Associating a vServer with a core 505 may include that core 505 to process all functions associated with that particular vServer. In some embodiments, each core executes a VIP having the same code and configuration. In other embodiments, each core executes a VIP having the same code but different configuration. In some embodiments, each core executes a VIP having different code and the same or different configuration.

Like vServers, NICs can also be associated with particular cores 505. In many embodiments, NICs can be connected to one or more cores 505 such that when a NIC receives or transmits data packets, a particular core 505 handles the processing involved with receiving and transmitting the data packets. In one embodiment, a single NIC can be associated with a single core 505, as is the case with NIC1 542D and NIC2 542E. In other embodiments, one or more NICs can be associated with a single core 505. In other embodiments, a single NIC can be associated with one or more cores 505. In these embodiments, load could be distributed amongst the one or more cores 505 such that each core 505 processes a substantially similar amount of load. A core 505 associated with a NIC may process all functions and/or data associated with that particular NIC.

While distributing work across cores based on data of VIPs or NICs may have a level of independency, in some embodiments, this may lead to unbalanced use of cores as illustrated by the varying loads 515 of FIG. 5A.

In some embodiments, load, work or network traffic can be distributed among cores 505 based on any type and form of data flow. In another of these approaches, the work may be divided or distributed among cores based on data flows. For example, network traffic between a client and a server traversing the appliance may be distributed to and processed by one core of the plurality of cores. In some cases, the core initially establishing the session or connection may be the core for which network traffic for that session or connection is distributed. In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approaches.

In flow-based data parallelism 520, distribution of data is related to any type of flow of data, such as request/response pairings, transactions, sessions, connections or application communications. For example, network traffic between a client and a server traversing the appliance may be distributed to and processed by one core of the plurality of cores. In some cases, the core initially establishing the session or connection may be the core for which network traffic for that session or connection is distributed. The distribution of data flow may be such that each core 505 carries a substantially equal or relatively evenly distributed amount of load, data or network traffic.

In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approached. In one embodiment, data flow can be distributed based on a transaction or a series of transactions. This transaction, in some embodiments, can be between a client and a server and can be characterized by an IP address or other packet identifier. For example, Core 1 505A can be dedicated to transactions between a particular client and a particular server, therefore the load 536A on Core 1 505A may be comprised of the network traffic associated with the transactions between the particular client and server. Allocating the network traffic to Core 1 505A can be accomplished by routing all data packets originating from either the particular client or server to Core 1 505A.

While work or load can be distributed to the cores based in part on transactions, in other embodiments load or work can be allocated on a per packet basis. In these embodiments, the appliance 200 can intercept data packets and allocate them to a core 505 having the least amount of load. For example, the appliance 200 could allocate a first incoming data packet to Core 1 505A because the load 536A on Core 1 is less than the load 536B-N on the rest of the cores 505B-N. Once the first data packet is allocated to Core 1 505A, the amount of load 536A on Core 1 505A is increased proportional to the amount of processing resources needed to process the first data packet. When the appliance 200 intercepts a second data packet, the appliance 200 will allocate the load to Core 4 505D because Core 4 505D has the second least amount of load. Allocating data packets to the core with the least amount of load can, in some embodiments, ensure that the load 536A-N distributed to each core 505 remains substantially equal.

In other embodiments, load can be allocated on a per unit basis where a section of network traffic is allocated to a particular core 505. The above-mentioned example illustrates load balancing on a per/packet basis. In other embodiments, load can be allocated based on a number of packets such that every 10, 100 or 1000 packets are allocated to the core 505 having the least amount of load. The number of packets allocated to a core 505 can be a number determined by an application, user or administrator and can be any number greater than zero. In still other embodiments, load can be allocated based on a time metric such that packets are distributed to a particular core 505 for a predetermined amount of time. In these embodiments, packets can be distributed to a particular core 505 for five milliseconds or for any period of time determined by a user, program, system, administrator or otherwise. After the predetermined time period elapses, data packets are transmitted to a different core 505 for the predetermined period of time.

Flow-based data parallelism methods for distributing work, load or network traffic among the one or more cores 505 can comprise any combination of the above-mentioned embodiments. These methods can be carried out by any part of the appliance 200, by an application or set of executable instructions executing on one of the cores 505, such as the packet engine, or by any application, program or agent executing on a computing device in communication with the appliance 200.

The functional and data parallelism computing schemes illustrated in FIG. 5A can be combined in any manner to generate a hybrid parallelism or distributed processing scheme that encompasses function parallelism 500, data parallelism 540, flow-based data parallelism 520 or any portions thereof. In some cases, the multi-core system may use any type and form of load balancing schemes to distribute load among the one or more cores 505. The load balancing scheme may be used in any combination with any of the functional and data parallelism schemes or combinations thereof.

Illustrated in FIG. 5B is an embodiment of a multi-core system 545, which may be any type and form of one or more systems, appliances, devices or components. This system 545, in some embodiments, can be included within an appliance 200 having one or more processing cores 505A-N. The system 545 can further include one or more packet engines (PE) or packet processing engines (PPE) 548A-N communicating with a memory bus 556. The memory bus may be used to communicate with the one or more processing cores 505A-N. Also included within the system 545 can be one or more network interface cards (NIC) 552 and a flow distributor 550 which can further communicate with the one or more processing cores 505A-N. The flow distributor 550 can comprise a Receive Side Scaler (RSS) or Receive Side Scaling (RSS) module 560.

Further referring to FIG. 5B, and in more detail, in one embodiment the packet engine(s) 548A-N can comprise any portion of the appliance 200 described herein, such as any portion of the appliance described in FIGS. 2A and 2B. The packet engine(s) 548A-N can, in some embodiments, comprise any of the following elements: the packet engine 240, a network stack 267; a cache manager 232; a policy engine 236; a compression engine 238; an encryption engine 234; a GUI 210; a CLI 212; shell services 214; monitoring programs 216; and any other software or hardware element able to receive data packets from one of either the memory bus 556 or the one of more cores 505A-N. In some embodiments, the packet engine(s) 548A-N can comprise one or more vServers 275A-N, or any portion thereof. In other embodiments, the packet engine(s) 548A-N can provide any combination of the following functionalities: SSL VPN 280; Intranet UP 282; switching 284; DNS 286; packet acceleration 288; App FW 280; monitoring such as the monitoring provided by a monitoring agent 197; functionalities associated with functioning as a TCP stack; load balancing; SSL offloading and processing; content switching; policy evaluation; caching; compression; encoding; decompression; decoding; application firewall functionalities; XML processing and acceleration; and SSL VPN connectivity.

The packet engine(s) 548A-N can, in some embodiments, be associated with a particular server, user, client or network. When a packet engine 548 becomes associated with a particular entity, that packet engine 548 can process data packets associated with that entity. For example, should a packet engine 548 be associated with a first user, that packet engine 548 will process and operate on packets generated by the first user, or packets having a destination address associated with the first user. Similarly, the packet engine 548 may choose not to be associated with a particular entity such that the packet engine 548 can process and otherwise operate on any data packets not generated by that entity or destined for that entity.

In some instances, the packet engine(s) 548A-N can be configured to carry out the any of the functional and/or data parallelism schemes illustrated in FIG. 5A. In these instances, the packet engine(s) 548A-N can distribute functions or data among the processing cores 505A-N so that the distribution is according to the parallelism or distribution scheme. In some embodiments, a single packet engine(s) 548A-N carries out a load balancing scheme, while in other embodiments one or more packet engine(s) 548A-N carry out a load balancing scheme. Each core 505A-N, in one embodiment, can be associated with a particular packet engine 505 such that load balancing can be carried out by the packet engine 505. Load balancing may in this embodiment, require that each packet engine 505 associated with a core 505 communicate with the other packet engines 505 associated with cores 505 so that the packet engines 505 can collectively determine where to distribute load. One embodiment of this process can include an arbiter that receives votes from each packet engine 505 for load. The arbiter can distribute load to each packet engine 505 based in part on the age of the engine's vote and in some cases a priority value associated with the current amount of load on an engine's associated core 505.

Any of the packet engines running on the cores may run in user mode, kernel or any combination thereof. In some embodiments, the packet engine operates as an application or program running is user or application space. In these embodiments, the packet engine may use any type and form of interface to access any functionality provided by the kernel. In some embodiments, the packet engine operates in kernel mode or as part of the kernel. In some embodiments, a first portion of the packet engine operates in user mode while a second portion of the packet engine operates in kernel mode. In some embodiments, a first packet engine on a first core executes in kernel mode while a second packet engine on a second core executes in user mode. In some embodiments, the packet engine or any portions thereof operates on or in conjunction with the NIC or any drivers thereof.

In some embodiments the memory bus 556 can be any type and form of memory or computer bus. While a single memory bus 556 is depicted in FIG. 5B, the system 545 can comprise any number of memory buses 556. In one embodiment, each packet engine 548 can be associated with one or more individual memory buses 556.

The NIC 552 can in some embodiments be any of the network interface cards or mechanisms described herein. The NIC 552 can have any number of ports. The NIC can be designed and constructed to connect to any type and form of network 104. While a single NIC 552 is illustrated, the system 545 can comprise any number of NICs 552. In some embodiments, each core 505A-N can be associated with one or more single NICs 552. Thus, each core 505 can be associated with a single NIC 552 dedicated to a particular core 505. The cores 505A-N can comprise any of the processors described herein. Further, the cores 505A-N can be configured according to any of the core 505 configurations described herein. Still further, the cores 505A-N can have any of the core 505 functionalities described herein. While FIG. 5B illustrates seven cores 505A-G, any number of cores 505 can be included within the system 545. In particular, the system 545 can comprise "N" cores, where "N" is a whole number greater than zero.

A core may have or use memory that is allocated or assigned for use to that core. The memory may be considered private or local memory of that core and only accessible by that core. A core may have or use memory that is shared or assigned to multiple cores. The memory may be considered public or shared memory that is accessible by more than one core. A core may use any combination of private and public memory. With separate address spaces for each core, some level of coordination is eliminated from the case of using the same address space. With a separate address space, a core can perform work on information and data in the core's own address space without worrying about conflicts with other cores. Each packet engine may have a separate memory pool for TCP and/or SSL connections.

Further referring to FIG. 5B, any of the functionality and/or embodiments of the cores 505 described above in connection with FIG. 5A can be deployed in any embodiment of the virtualized environment described above in connection with FIGS. 4A and 4B. Instead of the functionality of the cores 505 being deployed in the form of a physical processor 505, such functionality may be deployed in a virtualized environment 400 on any computing device 100, such as a client 102, server 106 or appliance 200. In other embodiments, instead of the functionality of the cores 505 being deployed in the form of an appliance or a single device, the functionality may be deployed across multiple devices in any arrangement. For example, one device may comprise two or more cores and another device may comprise two or more cores. For example, a multi-core system may include a cluster of computing devices, a server farm or network of computing devices. In some embodiments, instead of the functionality of the cores 505 being deployed in the form of cores, the functionality may be deployed on a plurality of processors, such as a plurality of single core processors.

In one embodiment, the cores 505 may be any type and form of processor. In some embodiments, a core can function substantially similar to any processor or central processing unit described herein. In some embodiment, the cores 505 may comprise any portion of any processor described herein. While FIG. 5A illustrates seven cores, there can exist any "N" number of cores within an appliance 200, where "N" is any whole number greater than one. In some embodiments, the cores 505 can be installed within a common appliance 200, while in other embodiments the cores 505 can be installed within one or more appliance(s)

200 communicatively connected to one another. The cores 505 can in some embodiments comprise graphics processing software, while in other embodiments the cores 505 provide general processing capabilities. The cores 505 can be installed physically near each other and/or can be communicatively connected to each other. The cores may be connected by any type and form of bus or subsystem physically and/or communicatively coupled to the cores for transferring data between to, from and/or between the cores.

While each core 505 can comprise software for communicating with other cores, in some embodiments a core manager (Not Shown) can facilitate communication between each core 505. In some embodiments, the kernel may provide core management. The cores may interface or communicate with each other using a variety of interface mechanisms. In some embodiments, core to core messaging may be used to communicate between cores, such as a first core sending a message or data to a second core via a bus or subsystem connecting the cores. In some embodiments, cores may communicate via any type and form of shared memory interface. In one embodiment, there may be one or more memory locations shared among all the cores. In some embodiments, each core may have separate memory locations shared with each other core. For example, a first core may have a first shared memory with a second core and a second share memory with a third core. In some embodiments, cores may communicate via any type of programming or API, such as function calls via the kernel. In some embodiments, the operating system may recognize and support multiple core devices and provide interfaces and API for inter-core communications.

The flow distributor 550 can be any application, program, library, script, task, service, process or any type and form of executable instructions executing on any type and form of hardware. In some embodiments, the flow distributor 550 may any design and construction of circuitry to perform any of the operations and functions described herein. In some embodiments, the flow distributor distribute, forwards, routes, controls and/ors manage the distribution of data packets among the cores 505 and/or packet engine or VIPs running on the cores. The flow distributor 550, in some embodiments, can be referred to as an interface master. In one embodiment, the flow distributor 550 comprises a set of executable instructions executing on a core or processor of the appliance 200. In another embodiment, the flow distributor 550 comprises a set of executable instructions executing on a computing machine in communication with the appliance 200. In some embodiments, the flow distributor 550 comprises a set of executable instructions executing on a NIC, such as firmware. In still other embodiments, the flow distributor 550 comprises any combination of software and hardware to distribute data packets among cores or processors. In one embodiment, the flow distributor 550 executes on at least one of the cores 505A-N, while in other embodiments a separate flow distributor 550 assigned to each core 505A-N executes on an associated core 505A-N. The flow distributor may use any type and form of statistical or probabilistic algorithms or decision making to balance the flows across the cores. The hardware of the appliance, such as a NIC, or the kernel may be designed and constructed to support sequential operations across the NICs and/or cores.

In embodiments where the system 545 comprises one or more flow distributors 550, each flow distributor 550 can be associated with a processor 505 or a packet engine 548. The flow distributors 550 can comprise an interface mechanism that allows each flow distributor 550 to communicate with the other flow distributors 550 executing within the system 545. In one instance, the one or more flow distributors 550 can determine how to balance load by communicating with each other. This process can operate substantially similarly to the process described above for submitting votes to an arbiter which then determines which flow distributor 550 should receive the load. In other embodiments, a first flow distributor 550' can identify the load on an associated core and determine whether to forward a first data packet to the associated core based on any of the following criteria: the load on the associated core is above a predetermined threshold; the load on the associated core is below a predetermined threshold; the load on the associated core is less than the load on the other cores; or any other metric that can be used to determine where to forward data packets based in part on the amount of load on a processor.

The flow distributor 550 can distribute network traffic among the cores 505 according to a distribution, computing or load balancing scheme such as those described herein. In one embodiment, the flow distributor can distribute network traffic or; pad according to any one of a functional parallelism distribution scheme 550, a data parallelism load distribution scheme 540, a flow-based data parallelism distribution scheme 520, or any combination of these distribution scheme or any load balancing scheme for distributing load among multiple processors. The flow distributor 550 can therefore act as a load distributor by taking in data packets and distributing them across the processors according to an operative load balancing or distribution scheme. In one embodiment, the flow distributor 550 can comprise one or more operations, functions or logic to determine how to distribute packers, work or load accordingly. In still other embodiments, the flow distributor 550 can comprise one or more sub operations, functions or logic that can identify a source address and a destination address associated with a data packet, and distribute packets accordingly.

In some embodiments, the flow distributor 550 can comprise a receive-side scaling (RSS) network driver, module 560 or any type and form of executable instructions which distribute data packets among the one or more cores 505. The RSS module 560 can comprise any combination of hardware and software, In some embodiments, the RSS module 560 works in conjunction with the flow distributor 550 to distribute data packets across the cores 505A-N or among multiple processors in a multi-processor network. The RSS module 560 can execute within the NIC 552 in some embodiments, and in other embodiments can execute on any one of the cores 505.

In some embodiments, the RSS module 560 uses the MICROSOFT receive-side-scaling (RSS) scheme. In one embodiment, RSS is a Microsoft Scalable Networking initiative technology that enables receive processing to be balanced across multiple processors in the system while maintaining in-order delivery of the data. The RSS may use any type and form of hashing scheme to determine a core or processor for processing a network packet.

The RSS module 560 can apply any type and form hash function such as the Toeplitz hash function. The hash function may be applied to the hash type or any the sequence of values. The hash function may be a secure hash of any security level or is otherwise cryptographically secure. The has function may use a hash key. The size of the key is dependent upon the hash function. For the Toeplitz hash, the size may be 40 bytes for IPv6 and 16 bytes for IPv4.

The hash function may be designed and constructed based on any one or more criteria or design goals. In some embodiments, a hash function may be used that provides an even distribution of hash result for different hash inputs and different hash types, including TCP/IPv4, TCP/IPv6, IPv4, and IPv6 headers. In some embodiments, a hash function may be used that provides a hash result that is evenly distributed when a small number of buckets are present (for example, two or four). In some embodiments, hash function may be used that provides a hash result that is randomly distributed when a large number of buckets were present (for example, 64 buckets). In some embodiments, the hash function is determined based on a level of computational or resource usage. In some embodiments, the hash function is determined based on ease or difficulty of implementing the hash in hardware. In some embodiments, the hash function is determined bases on the ease or difficulty of a malicious remote host to send packets that would all hash to the same bucket.

The RSS may generate hashes from any type and form of input, such as a sequence of values. This sequence of values can include any portion of the network packet, such as any header, field or payload of network packet, or portions thereof. In some embodiments, the input to the hash may be referred to as a hash type and include any tuples of information associated with a network packet or data flow, such as any of the following: a four tuple comprising at least two IP addresses and two ports; a four tuple comprising any four sets of values; a six tuple; a two tuple; and/or any other sequence of numbers or values. The following are example of hash types that may be used by RSS:

- 4-tuple of source TCP Port, source IP version 4 (IPv4) address, destination TCP Port, and destination IPv4 address. This is the only required hash type to support.
- 4-tuple of source TCP Port, source IP version 6 (IPv6) address, destination TCP Port, and destination IPv6 address.
- 2-tuple of source IPv4 address, and destination IPv4 address.
- 2-tuple of source IPv6 address, and destination IPv6 address.
- 2-tuple of source IPv6 address, and destination IPv6 address, including support for parsing IPv6 extension headers.

The hash result or any portion thereof may used to identify a core or entity, such as a packet engine or VIP, for distributing a network packet. In some embodiments, one or more hash bits or mask are applied to the hash result. The hash bit or mask may be any number of bits or bytes. A NIC may support any number of bits, such as seven bits. The network stack may set the actual number of bits to be used during initialization. The number will be between 1 and 7, inclusive.

The hash result may be used to identify the core or entity via any type and form of table, such as a bucket table or indirection table. In some embodiments, the number of hash-result bits are used to index into the table. The range of the hash mask may effectively define the size of the indirection table. Any portion of the hash result or the hast result itself may be used to index the indirection table. The values in the table may identify any of the cores or processor, such as by a core or processor identifier. In some embodiments, all of the cores of the multi-core system are identified in the table. In other embodiments, a port of the cores of the multi-core system are identified in the table. The indirection table may comprise any number of buckets for example 2 to 128 buckets that may be indexed by a hash mask. Each bucket may comprise a range of index values that identify a core or processor. In some embodiments, the flow controller and/or RSS module may rebalance the network rebalance the network load by changing the indirection table.

In some embodiments, the multi-core system 575 does not include a RSS driver or RSS module 560. In some of these embodiments, a software steering module (Not Shown) or a software embodiment of the RSS module within the system can operate in conjunction with or as part of the flow distributor 550 to steer packets to cores 505 within the multi-core system 575.

The flow distributor 550, in some embodiments, executes within any module or program on the appliance 200, on any one of the cores 505 and on any one of the devices or components included within the multi-core system 575. In some embodiments, the flow distributor 550' can execute on the first core 505A, while in other embodiments the flow distributor 550" can execute on the NIC 552. In still other embodiments, an instance of the flow distributor 550' can execute on each core 505 included in the multi-core system 575. In this embodiment, each instance of the flow distributor 550' can communicate with other instances of the flow distributor 550' to forward packets back and forth across the cores 505. There exist situations where a response to a request packet may not be processed by the same core, i.e. the first core processes the request while the second core processes the response. In these situations, the instances of the flow distributor 550' can intercept the packet and forward it to the desired or correct core 505, i.e. a flow distributor instance 550' can forward the response to the first core. Multiple instances of the flow distributor 550' can execute on any number of cores 505 and any combination of cores 505.

The flow distributor may operate responsive to any one or more rules or policies. The rules may identify a core or packet processing engine to receive a network packet, data or data flow. The rules may identify any type and form of tuple information related to a network packet, such as a 4-tuple of source and destination IP address and source and destination ports. Based on a received packet matching the tuple specified by the rule, the flow distributor may forward the packet to a core or packet engine. In some embodiments, the packet is forwarded to a core via shared memory and/or core to core messaging.

Although FIG. 5B illustrates the flow distributor 550 as executing within the multi-core system 575, in some embodiments the flow distributor 550 can execute on a computing device or appliance remotely located from the multi-core system 575. In such an embodiment, the flow distributor 550 can communicate with the multi-core system 575 to take in data packets and distribute the packets across the one or more cores 505. The flow distributor 550 can, in one embodiment, receive data packets destined for the appliance 200, apply a distribution scheme to the received data packets and distribute the data packets to the one or more cores 505 of the multi-core system 575. In one embodiment, the flow distributor 550 can be included in a router or other appliance such that the router can target particular cores 505 by altering meta data associated with each packet so that each packet is targeted towards a sub-node of the multi-core system 575. In such an embodiment, CISCO's vn-tag mechanism can be used to alter or tag each packet with the appropriate meta data.

Figure 5C:
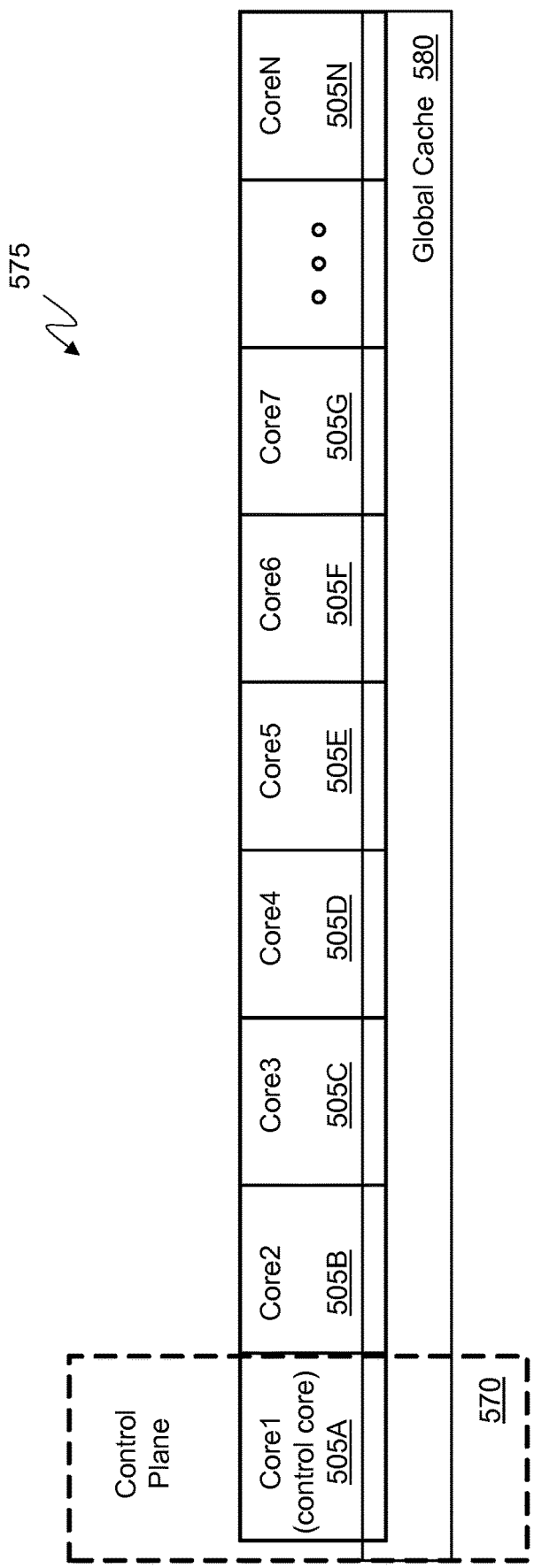
FIG. 5C is a block diagram of another embodiment of an aspect of a multi-core system.

Illustrated in FIG. 5C is an embodiment of a multi-core system 575 comprising one or more processing cores 505A-N. In brief overview, one of the cores 505 can be designated as a control core 505A and can be used as a control plane 570 for the other cores 505. The other cores may be secondary cores which operate in a data plane while the control core provides the control plane. The cores 505A-N may share a global cache 580. While the control core provides a control plane, the other cores in the multi-core system form or provide a data plane. These cores perform data processing functionality on network traffic while the control provides initialization, configuration and control of the multi-core system.

Further referring to FIG. 5C, and in more detail, the cores 505A-N as well as the control core 505A can be any processor described herein. Furthermore, the cores 505A-N and the control core 505A can be any processor able to function within the system 575 described in FIG. 5C. Still further, the cores 505A-N and the control core 505A can be any core or group of cores described herein. The control core may be a different type of core or processor than the other cores. In some embodiments, the control may operate a different packet engine or have a packet engine configured differently than the packet engines of the other cores.

Any portion of the memory of each of the cores may be allocated to or used for a global cache that is shared by the cores. In brief overview, a predetermined percentage or predetermined amount of each of the memory of each core may be used for the global cache. For example, 50% of each memory of each code may be dedicated or allocated to the shared global cache. That is, in the illustrated embodiment, 2 GB of each core excluding the control plane core or core 1 may be used to form a 28 GB shared global cache. The configuration of the control plane such as via the configuration services may determine the amount of memory used for the shared global cache. In some embodiments, each core may provide a different amount of memory for use by the global cache. In other embodiments, any one core may not provide any memory or use the global cache. In some embodiments, any of the cores may also have a local cache in memory not allocated to the global shared memory. Each of the cores may store any portion of network traffic to the global shared cache. Each of the cores may check the cache for any content to use in a request or response. Any of the cores may obtain content from the global shared cache to use in a data flow, request or response.

The global cache 580 can be any type and form of memory or storage element, such as any memory or storage element described herein. In some embodiments, the cores 505 may have access to a predetermined amount of memory (i.e. 32 GB or any other memory amount commensurate with the system 575.) The global cache 580 can be allocated from that predetermined amount of memory while the rest of the available memory can be allocated among the cores 505. In other embodiments, each core 505 can have a predetermined amount of memory. The global cache 580 can comprise an amount of the memory allocated to each core 505. This memory amount can be measured in bytes, or can be measured as a percentage of the memory allocated to each core 505. Thus, the global cache 580 can comprise 1 GB of memory from the memory associated with each core 505, or can comprise 20 percent or one-half of the memory associated with each core 505. In some embodiments, only a portion of the cores 505 provide memory to the global cache 580, while in other embodiments the global cache 580 can comprise memory not allocated to the cores 505.

Each core 505 can use the global cache 580 to store network traffic or cache data. In some embodiments, the packet engines of the core use the global cache to cache and use data stored by the plurality of packet engines. For example, the cache manager of FIG. 2A and cache functionality of FIG. 2B may use the global cache to share data for acceleration. For example, each of the packet engines may store responses, such as HTML data, to the global cache. Any of the cache managers operating on a core may access the global cache to server caches responses to client requests.

In some embodiments, the cores 505 can use the global cache 580 to store a port allocation table which can be used to determine data flow based in part on ports. In other embodiments, the cores 505 can use the global cache 580 to store an address lookup table or any other table or list that can be used by the flow distributor to determine where to direct incoming and outgoing data packets. The cores 505 can, in some embodiments read from and write to cache 580, while in other embodiments the cores 505 can only read from or write to cache 580. The cores may use the global cache to perform core to core communications.

The global cache 580 may be sectioned into individual memory sections where each section can be dedicated to a particular core 505. In one embodiment, the control core 505A can receive a greater amount of available cache, while the other cores 505 can receiving varying amounts or access to the global cache 580.

In some embodiments, the system 575 can comprise a control core 505A. While FIG. 5C illustrates core 1 505A as the control core, the control core can be any core within the appliance 200 or multi-core system. Further, while only a single control core is depicted, the system 575 can comprise one or more control cores each having a level of control over the system. In some embodiments, one or more control cores can each control a particular aspect of the system 575. For example, one core can control deciding which distribution scheme to use, while another core can determine the size of the global cache 580.

The control plane of the multi-core system may be the designation and configuration of a core as the dedicated management core or as a master core. This control plane core may provide control, management and coordination of operation and functionality the plurality of cores in the multi-core system. This control plane core may provide control, management and coordination of allocation and use of memory of the system among the plurality of cores in the multi-core system, including initialization and configuration of the same. In some embodiments, the control plane includes the flow distributor for controlling the assignment of data flows to cores and the distribution of network packets to cores based on data flows. In some embodiments, the control plane core runs a packet engine and in other embodiments, the control plane core is dedicated to management and control of the other cores of the system.

The control core 505A can exercise a level of control over the other cores 505 such as determining how much memory should be allocated to each core 505 or determining which core 505 should be assigned to handle a particular function or hardware/software entity. The control core 505A, in some embodiments, can exercise control over those cores 505 within the control plan 570. Thus, there can exist processors outside of the control plane 570 which are not controlled by the control core 505A. Determining the boundaries of the control plane 570 can include maintaining, by the control core 505A or agent executing within the system 575, a list of those cores 505 controlled by the control core 505A. The control core 505A can control any of the following: initialization of a core; determining when a core is unavailable; re-distributing load to other cores 505 when one core fails; determining which distribution scheme to implement; determining which core should receive network traffic; determining how much cache should be allocated to each core; determining whether to assign a particular function or element to a particular core; determining whether to permit cores to communicate with one another; determining the size of the global cache 580; and any other determination of a function, configuration or operation of the cores within the system 575.

F. Systems and Methods for Dynamic Connection Spillover

Figure 6:
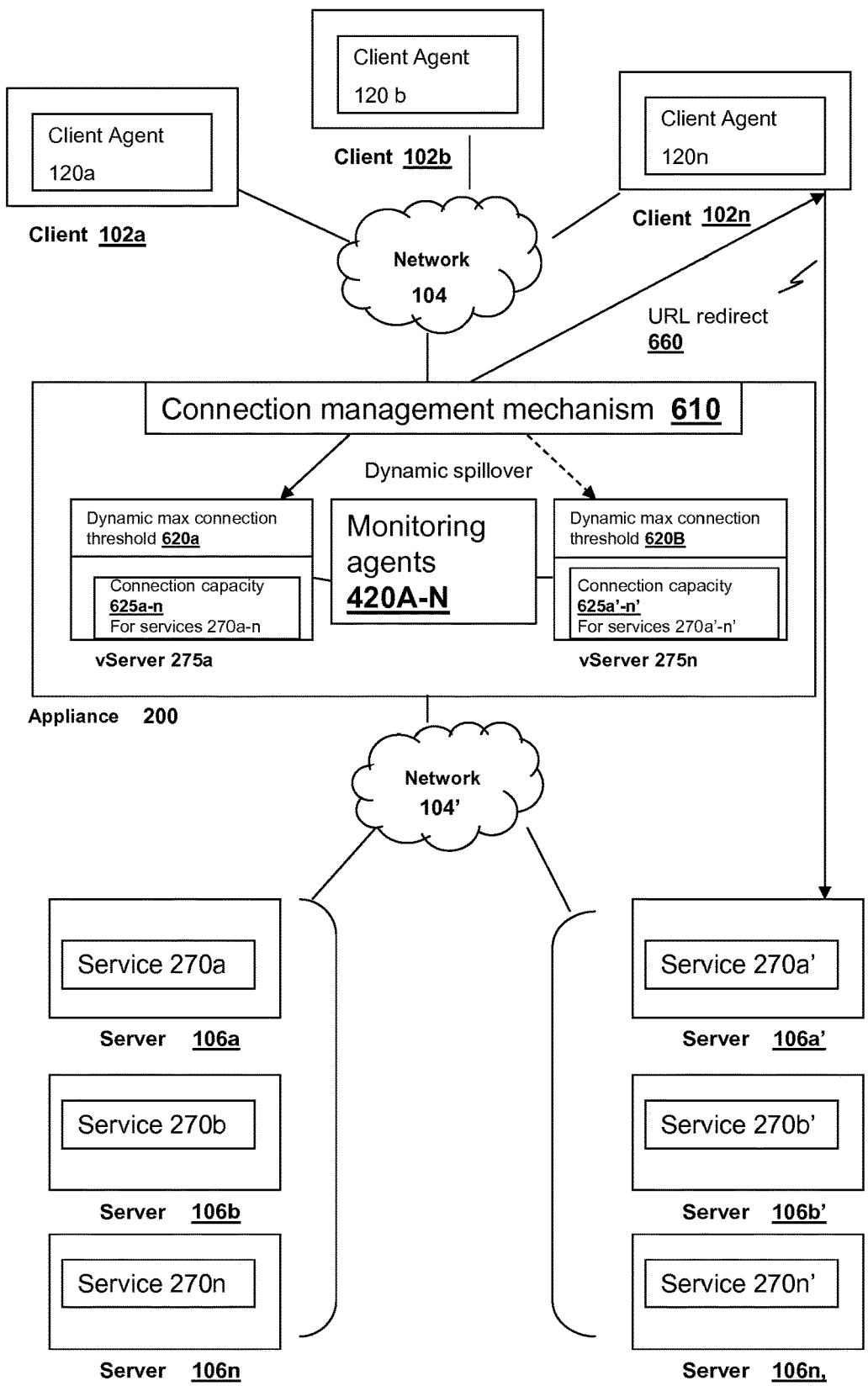
FIG. 6 is an embodiment of an appliance for providing a technique of dynamic connection threshold management.

Referring now to FIG. 6, an embodiment of a system for providing management of transport layer connections via an appliance using a dynamic maximum connection threshold is depicted. In brief overview, the appliance 200 establishes a first vServer 275A to load balance 284 a plurality of clients 102*a*-102*n* access to one or more services 270A-270N of a first set of servers 106A-106N. The appliance 200 includes a connection management mechanism 610 for managing and balancing transport layer connection requests from clients 102*a*-102*n* to one or more set of services 270A-270N. The appliance 200 establishes for the first vServer 275A a maximum dynamic connection threshold 1020A based on the sum of the connection capacity 625A-625N each of the services 270A-270N are targeted or configured to handle. Via monitoring agents 420A-420N, the appliance monitors the operational status of each of the services 270A-270N. If any of the services 270A-270N have a change in status from available to not available, or not available to available, the appliance 200 adjusts the dynamic maximum connection threshold 1020A by including or not including the corresponding connection capacity 625A-625B of the service in the summation of the threshold. For example, if the appliance 200 detects a first service 270A has a status of not available, the appliance 200 subtracts the connection capacity 625A of the first service 270A from the maximum dynamic connection threshold 1020A. As such, the appliance 200 dynamically adjusts the maximum connection threshold 1020 for a vServer 275 in real-time in accordance with the monitored status of the services 270A-270N and each service's corresponding connection capacity 625A-625N.

In further detail, the connection management mechanism 610 comprises software, hardware, or any combination of software and hardware having logic, functions or operations for receiving and managing connection requests and communications from one or more clients 102A-102N. In one embodiment, the connection management mechanism 610 receives or intercepts transport layer connection requests and communications between the clients 102A-102N and one or more services 270A-270N. The connection management mechanism 610 may include an application, program, service, process, task, thread or any type and form of executable instructions. In another embodiment, the connection management mechanism 610 identifies, determines or selects a vServer 275 for processing a received communication from a client 102.

In some embodiments, the connection management mechanism 610 determines if the dynamic maximum connection threshold 1020 has been reached or exceeded. The connection management mechanism 610 determines if the dynamic maximum connection threshold is exceeded, and whether or not to establish a backup or second vServer 275N, e.g., a spillover vServer. Upon detecting the number of active transport layer connections of the first vServer 275A exceeds the dynamically adjusted maximum connection threshold 1020, the connection management mechanism 610 may direct, transfer or otherwise provide a received transport layer connection request of a client 102 to the second vServer 275N for handling. By using the dynamically adjusted maximum connection threshold 1020, the connection management mechanism 610 dynamically and automatically spillovers connection requests from clients 102 from a first vServer 275A to a backup or second vServer 275N.

In other embodiments, the connection management mechanism 610 may maintain connection or session persistence between a client 102 and the vServer 275A-275N handling requests for the client 102. In some embodiments, the connection management mechanism 610 selects the spillover vServer 275N for handling a client request even though the number of active connections of the first vServer 275A does not exceed the maximum connection threshold 1020. In other embodiments, the connection management mechanism 610 selects the first vServer 275A for handling a client request event though requests from other clients are directed to the spillover vServer 275N. In one embodiment, the connection management mechanism 610 may select the first vServer 275A or second vServer 275N based on which vServer 275 most recently handled a request from the client 102.

Upon detecting the dynamically adjusted maximum connection threshold 1020 has been exceeded for the first vServer 275A and/or the second vServer 275N, the connection management mechanism 610, in one embodiment, may determine not to establish another spillover vServer 275N but instead redirects the client 102 directly to a server 106 or otherwise to bypass the appliance 200. For example, the connection management mechanism 610 may determine the dynamically adjusted maximum connection threshold 1020B for the spillover vServer 275N has been reached and may redirect the client 102 to bypass the appliance 200 instead of establishing a third vServer 275N for spillover. In these embodiments, the connection management mechanism 610 may transmit a redirect Uniform Resource Locator (URL) 660 to the client 102 for the client 102 to connect to in response to the client's connection request. The URL 660 may identify any one of the servers 106 or services 270.

In yet another embodiment, the appliance 200 and/or connection management mechanism 610 manages the number of active connections and performs dynamic spillover techniques for a plurality of vServers 275A-275N. In one embodiment, the second vServer 275B may be managing connections from a plurality of clients 102A-102N to a second set of services 270A'-270N'. In some embodiments, the appliance 200 monitors a second dynamic maximum connection threshold 1020B for a second vServer 275B. In one embodiment, the second vServer 275B may be acting as a spillover vServer for the first vServer 275N or a third vServer.

The connection capacity 625 for a service 270 comprises a predetermined number of clients, transport layer connections or users a service 270 is designed, configured or intended to handle or process. In some embodiments, the connection capacity 625 comprises a maximum number of clients, connections or users 625 a service 270 is configured, targeted or intended to handle or process. In one embodiment, a user, such as the administrator of the appliance 200 configures the connection capacity 625 for the service 270. In another embodiment, the appliance 200 determines the connection capacity 625 from the service 270 or server 106 providing the service 270. For example, the appliance 200 may transmit a request to the server 106 or service 270 for its connection capacity, and in response, the server 106 transmits to the appliance a predetermined number of active connections it may handle.

Each of the connection capacities 625A-625N may comprise any combination of a same or different connection capacity 625 as another capacity. In one embodiment, the connection capacity 625A for a first server 270A is different than the connection capacity 625B of a second server 270B. In some embodiments, the connection capacity 625A for a first service 270A is the same as the connection capacity 625B for a second service 270B. In another embodiment, the connection capacity 625A of a service 270A may be set to a value below the service's actual connection capacity. In other embodiments, the connection capacity 625A of a service 270A may be set to a value above the service's actual connection capacity. In some embodiments, the connection capacities may represent a connection-based weighting of each of the services 270A-270N in a first set or second set of a plurality of services.

The dynamic maximum connection threshold 1020A-620N (generally 620) comprises a predetermined number identifying a maximum number of active transport layer connections the vServer 275 is configured, designed or otherwise intended to process, handle or have active. In one embodiment, a user, such as an administrator of the appliance 200, configures the dynamic maximum connection threshold 1020. In another embodiment, the appliance 200 sets the dynamic maximum connection threshold 1020 to a default value of the sum of the configured connection capacity for each of the services 270A-270N managed by the vServer 275.

The appliance 200 may adjust the dynamic maximum connection threshold 1020 in response to events corresponding to a vServer 250 and to one or more services 270. The appliance 200 may monitor the services 270 using one or more monitoring agents 420. In one embodiment, the appliance may adjust the dynamic maximum connection threshold in response to a monitoring agent 420 reporting a service 270 as unavailable. If a service 270 with a given connection capacity is reported as unavailable, the appliance may subtract the service's 270 connection capacity from the dynamic maximum connection threshold 1020 of the vServer providing access to that service 270. Further, if the service 270 previously reported as unavailable is then reported as available, the appliance 200 may then add back the connection capacity for that service 270 to the dynamic maximum connection threshold 1020.

The monitoring agents may monitor any aspect of a service 270, and may use any technique to determine whether a given service is available. In one embodiment, a monitor may measure the response time of a service 270 and report the service as unavailable if the response time exceeds a given threshold. In another embodiment, a monitor may measure the response time of a service 270 and report the service as unavailable if the response time exceeds a determined average response time for the service 270. In still another embodiment, a monitor may measure the response time of a service 270 and report the service 270 as unavailable if the response time exceeds a given deviation from a determined average response time for the service.

Although the technique of dynamically adjusted maximum connection threshold 1020 is generally discussed in view of transport layer connections and connection requests, the appliance may perform this technique for any type and form of transport layer protocol or application layer protocol carried via the transport layer. In one embodiment, the appliance 200 may perform dynamic connection spillover among vServers 275A-275N using a dynamically adjusted maximum connection threshold 1020 for Secure Socket Layer (SSL) or Transport Layer Security (TLS) connections and connection requests.

Figure 7:
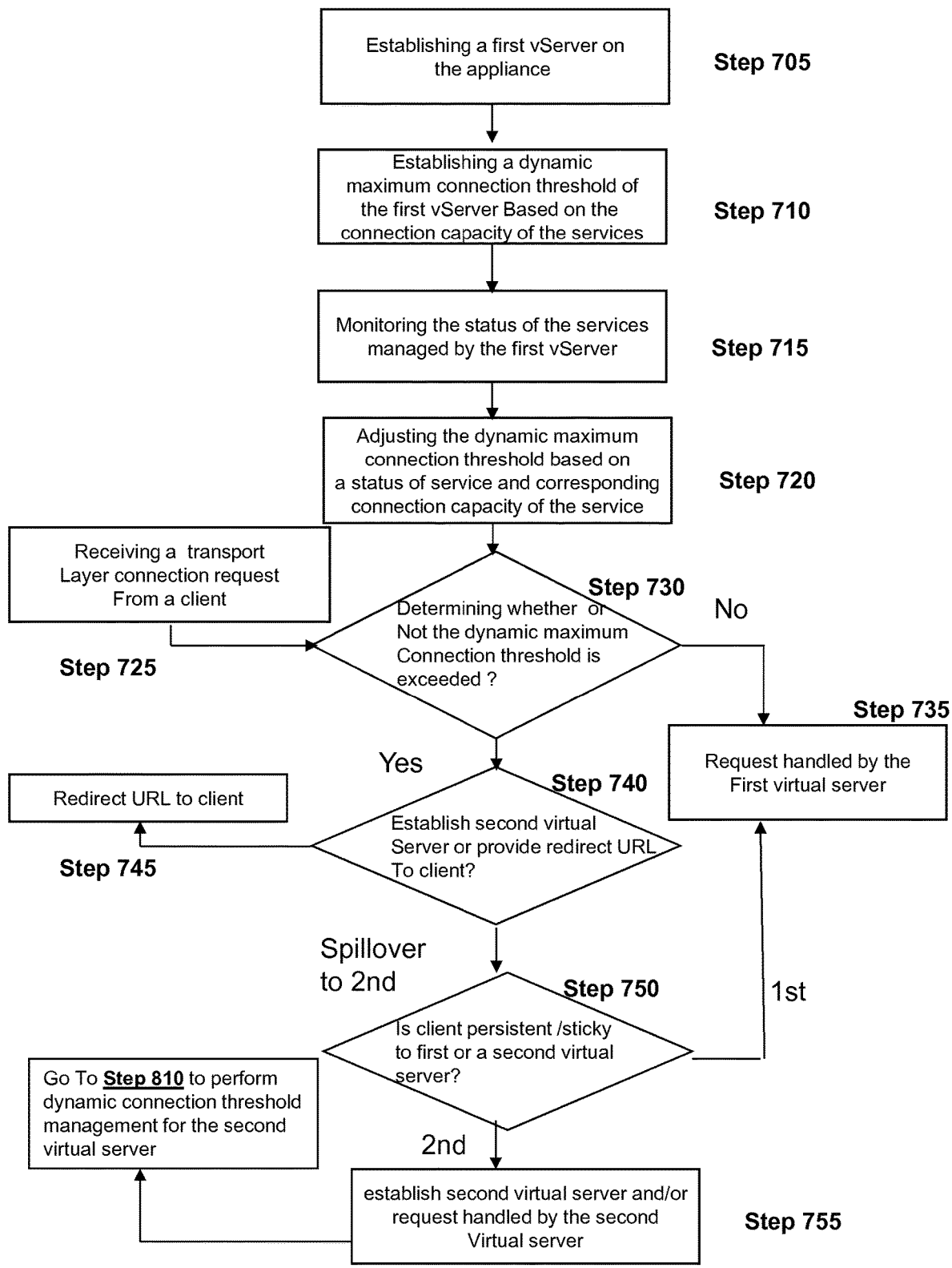
FIG. 7 is a flow diagram of steps of an embodiment of a method for practicing a technique of dynamic connection threshold management in conjunction with the system of FIG. 6.

Referring now to FIG. 7, steps of an embodiment of a method for practicing a technique of dynamical spillover management is depicted. In brief overview, the method comprises establishing, on an appliance, a first virtual server which directs transport layer connection requests from a plurality of clients to a first plurality of services (step 705); establishing, via the appliance, a predetermined threshold identifying a maximum active transport layer connection capacity for the first virtual server, the predetermined threshold comprising a sum of a predetermined connection capacity for each of the plurality of services (step 710); monitoring, by the appliance, a status for each of the plurality of services (step 715); and adjusting, by the appliance, the predetermined threshold to comprise the sum of the predetermined connection capacity for each of the plurality of services having a status of available (step 720). The appliance may then receive a transport layer connection request (step 725); determine that a number of active connections to the first virtual server exceeds the predetermined threshold (step 730). The appliance may then determine to provide the request to a second virtual server (step 740).

Still referring to FIG. 7, now in greater detail, an appliance establishes a first virtual server which directs transport layer connection requests from a plurality of clients to a first plurality of services (step 705). This virtual server may comprise any virtual server capable of providing access to one or more services 270. In one embodiment, the virtual server may comprise a vServer 275. In one embodiment, the appliance may establish the virtual server upon startup of the appliance. In another embodiment, the appliance may establish the virtual server in response to a previously established virtual server exceeding maximum connection threshold. In one embodiment, the appliance may establish a plurality of virtual servers.

In the embodiment shown, the appliance may then establish a dynamic maximum connection threshold 1020 for the first virtual server (step 710). In some embodiments, the threshold comprises a sum of a predetermined connection capacity for each of the plurality of services. In one embodiment, the threshold 1020 may be initially configured by a user or administrator of the appliance. In another embodiment, the threshold 1020 may be initially determined by the appliance by polling one or more services 270.

In the embodiment shown, the appliance may then monitor a status for each of the plurality of services (step 715). The appliance may monitor a status for each of the services 270 using any means. In one embodiment, the appliance may use a monitoring agent 420. In another embodiment, the appliance may use a plurality of monitoring agents 420. In one embodiment, the appliance may monitor the status for each of the services at predetermined time intervals, for example once every 0.01, 0.1, 0.2, 0.5, or 1 seconds. In another embodiment, the appliance may monitor the status for each of the services 270 asynchronously.

In the embodiment shown, the appliance may then adjust the predetermined threshold to comprise the sum of the predetermined connection capacity for each of the plurality of services having a status of available (step 720). For example, if a service 270 with a given connection capacity is reported as unavailable, the appliance may subtract the service's 270 connection capacity from the dynamic maximum connection threshold 1020 of the vServer providing access to that service 270. Further, if a service 270 previously reported as unavailable is then reported as available, the appliance 200 may then add back the connection capacity for that service 270 to the dynamic maximum connection threshold 1020.

In the embodiment shown, the appliance may then receive a transport layer connection request (step 725). The transport layer request may comprise any request to connect to a service 270. The transport layer request may be received from any computing device including a client 102, server 106, or a second appliance 200. In one embodiment, the request may identify a type of service 270. For example, the transport layer request may comprise a request for HTTP service. Or, for example, the transport layer request may comprise a request for UDP service.

In the embodiment shown, the appliance may then determine whether the dynamic maximum connection threshold 1020 of the first virtual server has been exceeded. The appliance may compare the current connection load for the first virtual server with the current value of the dynamic maximum connection threshold for the first virtual server. In one embodiment, the first virtual server may comprise a primary or default virtual server. In another embodiment, the first virtual server may comprise a primary or default virtual server for a particular type of service. If the dynamic maximum connection threshold 1020 of the first virtual server has not been exceeded, the appliance may provide the connection request to the first virtual server (step 735).

If the dynamic maximum connection threshold 1020 of the first virtual server has been exceeded, the appliance may establish, in response to the threshold being exceeded, a second virtual server (step 740). In other embodiments, a second virtual server may already have been established prior to some or any of the steps shown. The second virtual server may provide access to a second plurality of services 270. In one embodiment, one or more of the second plurality of services 270 may comprise the same type of service 270 as one or more of the first plurality of services. The appliance may then establish and subsequently adjust a dynamic maximum connection threshold 1020 corresponding to the second virtual server. The appliance may then provide the connection request to the second virtual server 200 (step 755).

In other embodiments, a second virtual server may already have been established prior to some or any of the steps shown. The second virtual server may provide access to a second plurality of services 270. In one embodiment, one or more of the second plurality of services 270 may comprise the same type of service 270 as one or more of the first plurality of services. The appliance may then provide the connection request to the second virtual server 200 (step 755). The appliance may then establish and subsequently adjust a dynamic maximum connection threshold 1020 corresponding to the second virtual server.

In still other embodiments, if the dynamic maximum connection threshold 1020 of the first virtual server has been exceeded, the appliance may, in response to the threshold being exceeded, redirect the client making the request to another resource. In one embodiment, the appliance may transmit a URL to the client comprising the address of a server 106 or service 270 such that the client may bypass the appliance 200 and access the server 106 or service 270 directly. In one embodiment, the appliance may transmit a URL to the client comprising the address of a second appliance 200. In still another embodiment, the appliance 200 may redirect the client request to a second appliance based on a dynamically determined connection capacity for the second appliance.

The appliance 200 may then determine whether the client making the connection request has a previously existing connection with either the first or a second virtual server (step 750). In some embodiments, an appliance may assign a priority to providing connection requests from a client to virtual servers that have previously serviced or are currently servicing connections from the client. For example, if a connection request is received from a client, and the client has a currently existing connection with a first virtual server, the appliance 200 may provide the connection request to the first virtual server even if the first virtual server is above its dynamic maximum connection threshold. Or, for example, if a client has a previous connection via a backup virtual server, and the primary virtual server subsequently becomes available again, the appliance 200 may still provide a subsequent connection request from the client to the backup virtual server. In one embodiment, a connection management mechanism 610, or other appliance component may track previously established or current connections so that incoming connection requests from a client can be provided to a virtual server having previously serviced connections from the client.

G. Systems and Methods for Dynamic Spillover Based on Bandwidth

Figure 8A:
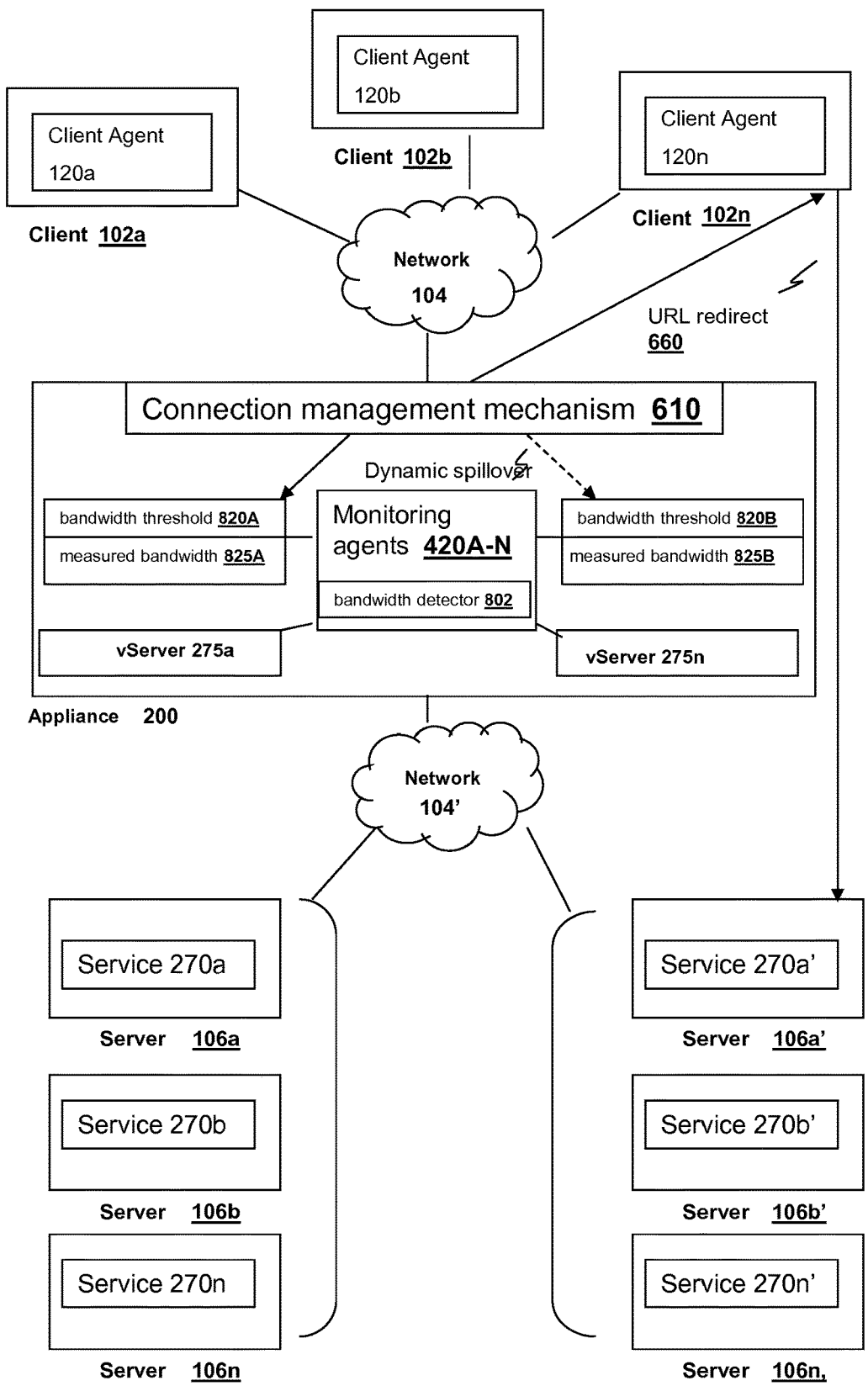
FIG. 8A is an embodiment of an appliance for providing a technique of virtual server spillover management based on bandwidth.
Figure 8B:
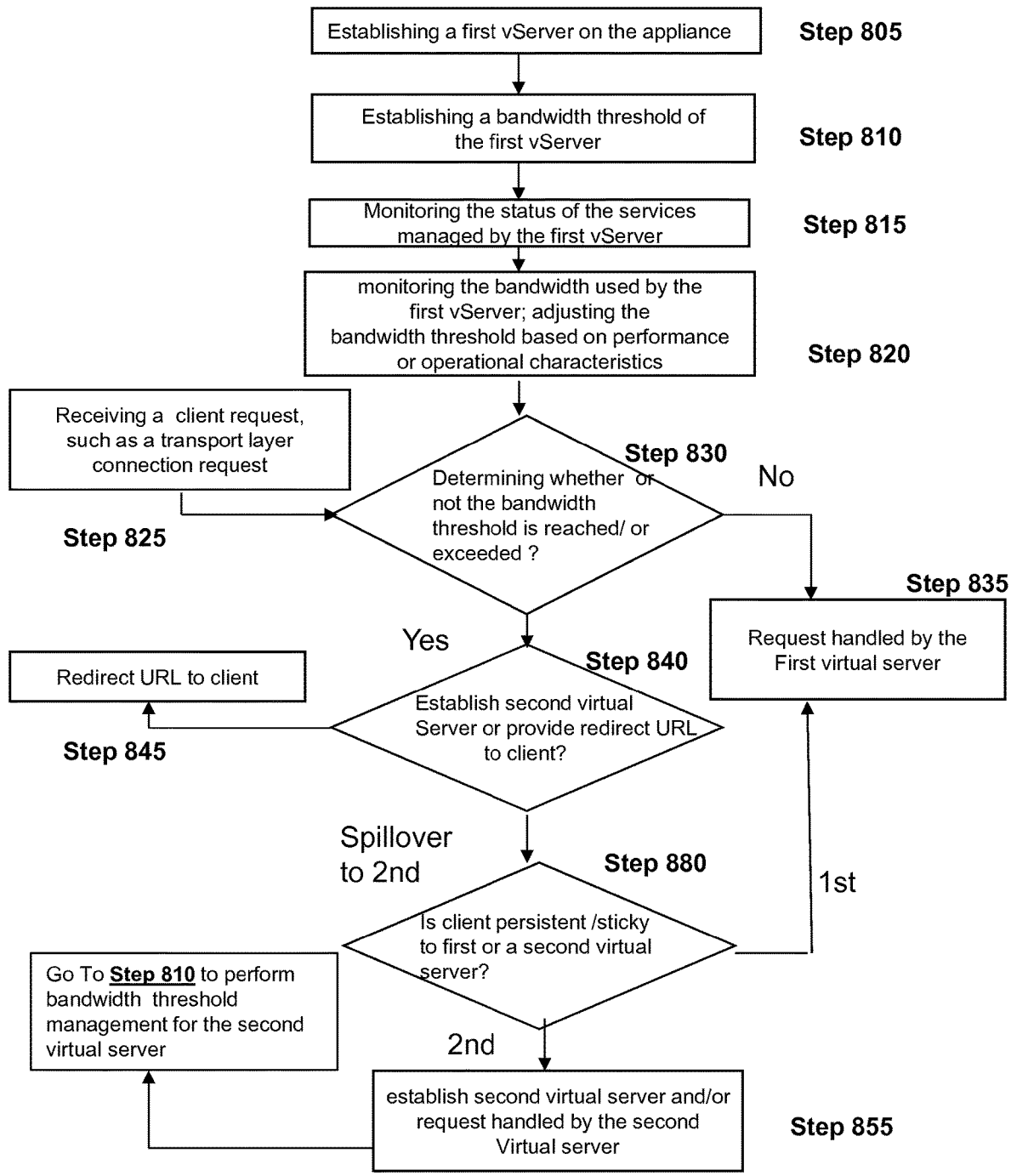
FIG. 8B is a flow diagram of steps of an embodiment of a method for practicing a technique of spillover management based on bandwidth in conjunction with the system of FIG. 8A.

Referring now to FIGS. 8A and 8B, systems and methods for dynamically managing connection spillover from a first virtual server to a second virtual server based on bandwidth are depicted. The appliance may establish or a user may configure a bandwidth threshold for one or more virtual servers managing one or more services. The appliance monitors the bandwidth used by a virtual server. In response to detecting the bandwidth reaching or exceeding the bandwidth threshold, the appliance dynamically directs client requests to another virtual server. The bandwidth threshold may be adjusted to take into account bandwidth capacity, response times, virtual server performance or performance of the server. The appliance manages virtual servers based on the bandwidth usage to maintain performance of the virtual servers and the services managed by the virtual servers at a desired level or within a predetermined performance range.

Referring now to FIG. 8A, an embodiment of an appliance for providing dynamic virtual server spillover management based on bandwidth is depicted. In brief overview, the appliance 200 establishes a first vServer 275A to manage access by a plurality of clients 102a-102n to one or more services 270A-270N of a first set of servers 106A-106N. The appliance 200 includes a connection management mechanism 610 for managing and balancing requests from clients 102a-102n to one or more set of services 270A-270N via one or more vServers 275A-275N. The appliance 200 establishes for a first vServer 275A a bandwidth threshold 820A, which may be specified by a user. The appliance may establish a second vServer 275N with a second bandwidth threshold 820B.

Via monitoring agents 420A-420N, the appliance monitors the operational status of each of the services 270A-270N. The monitoring agents 420 may include a bandwidth detector 802 for measuring the bandwidth used by a virtual server 275. The bandwidth detector 802 may at predetermined frequencies or time frames determine a measured bandwidth 825A for a first vServer 275A. The bandwidth detector 802 may also determine a measured bandwidth 825B for the second vServer 275N.

If the measured bandwidth for the first vServer 275A is determined to have reached or exceeded the bandwidth threshold 820A, the connection manager 610 of the appliance may determine to direct client requests to the second vServer 275N. For example, a user may configure a bandwidth threshold of 5 Mbytes per second. If the bandwidth detector 920 determines the measured bandwidth 825 of the vServer 275 exceeds 5 Mbytes a second, the appliance 200 via the connection management mechanism 610 may switch client requests to the second vServer 275N.

The bandwidth detector 802 includes or provides logic, business rules, functions or operations for determining an availability, idleness, throughput or utilization of network bandwidth for one or more virtual servers 275. The bandwidth detector 802 may include software, hardware or any combination of software and hardware. The bandwidth detector 802 may comprise an application, program, script, library, process, service, driver, task, thread or any type and form of executable instructions.

In some embodiments, the bandwidth detector 802 determines a number of bytes transferred by the vServer 275 for the measured bandwidth 825. The bandwidth detector 802 determines the number of transferred bytes over a time period, such as every second or bytes transferred per second. In one embodiment, the bandwidth detector 802 determines an average number of bytes transferred per the time period, such as per second. In some embodiments, the bandwidth detector 802 measures the number of bytes transmitted by the vServer 275. In other embodiments, the bandwidth detector 802 measures the number of bytes received by the vServer 275. In one embodiment, the bandwidth detector 802 measures the number of bytes received and transmitted by the vServer 275. In yet another embodiment, the bandwidth detector 802 measures the number of bytes transmitted by the one or more services 270 to the vServer 275. In other embodiments, the bandwidth detector 802 measures the number of bytes transmitted by one or more clients 102 to the vServer 275. In other embodiments, the bandwidth detector 802 measures the bandwidth 825 for a vServer 275 based on the number of packets on a queue waiting to be transmitted. In some embodiments, the bandwidth detector 802 determines bandwidth usage via the transition of a queue of network packets from empty to non-empty and vice-versa.

In one embodiment, the bandwidth detector 802 determines the measured bandwidth 825 in relation to round-trip times between a virtual server and a service 270 or server 106. In one embodiment, the bandwidth detector 802 measures round-trip times between a virtual server and a client 106. In another embodiment, the bandwidth detector 802 measures round-trip times between a client and server via the virtual server.275. The bandwidth detector 802 may use any type and form of round-trip time computation or calculation to measure bandwidth 825. For example, the bandwidth detector 802 may use the following type of bandwidth measurement:

$$\text{Bandwidth} = \text{Factor} * \text{MTU}/(\text{Round Trip Times} * \text{sqrt}(\text{Packet Loss})),$$

where the factor may be for example 1.3

As illustrated by the above equation, bandwidth may be determined based on packet loss, round trip times and/or packet size adjusted by a predetermined factor. Although a measurement of bandwidth using the above equation is described, other derivatives of this request using any combination of factors, maximum transmission unit (MTU), round trip times and packet loss may be used.

The bandwidth threshold 820 for a vServer 275 may be specified as a number, such as a real or integer. In one embodiment, the bandwidth threshold 820 may be expressed in units of number of bytes per a unit of time. In some embodiments, the bandwidth threshold 820 may be specified as a percentage. For example, the bandwidth threshold 820 may represent a percentage of bandwidth used by the vServer 275. In another example, the bandwidth threshold 820 may represent a percentage of bandwidth available to the vServer 275.

In some embodiments, the bandwidth threshold 820 may indicate a direction for measuring the bandwidth 825 of a vServer 275. In one embodiment, the bandwidth threshold 820 identified the measurement is bi-directional. For example, the bandwidth threshold 820 may indicate to measure bandwidth 825 of bytes transmitted by the vServer 275 to the service and received from the service. In another example, the bandwidth threshold 820 may indicate to measure bandwidth 825 of the number of bytes sent from a client to the service via the vServer 275 and sent from the server to the client via the vServer 275. In other embodiments, the bandwidth threshold 820 may indicate to measure bandwidth 825 in one direction, such as any of the following directions: from the vServer to the service, from the service to the vServer, from the vServer to the client.

As discussed above in connection with FIG. 8A, the connection management mechanism 610, also referred to as a connection manager or a virtual server switch, comprises software, hardware, or any combination of software and hardware having logic, functions or operations for receiving and managing connection requests and communications from one or more clients 102A-102N. In one embodiment, the connection management mechanism 610 receives or intercepts transport layer connection requests and communications between the clients 102A-102N and one or more services 270A-270N. The connection management mechanism 610 may include an application, program, service, process, task, thread or any type and form of executable instructions. In response to receiving a client communication, the connection management mechanism 610 identifies, determines or selects a vServer 275 for processing a received communication from a client 102.

The connection manager 610 may operate responsive to the load monitor 420 and/or the bandwidth detector 802. The load monitor 420 may monitor the measured bandwidth 825. In some embodiments, the load monitor 420 and/or bandwidth detector 802 measures the bandwidth on a predetermined frequency. In one embodiment, the load monitor 420 and/or bandwidth detector 802 measures the bandwidth responsive to any events, such as receipt of a network packet. In other embodiments, the load monitor 420 and/or bandwidth detector 802 may determine whether or not if the measured bandwidth 825 is greater than the bandwidth threshold 820.

If the connection manager 610 determines from the load monitor 420 and/or bandwidth detector 802 that the measured bandwidth 825 of a first vServer 275A exceeds the bandwidth threshold 820, the connection manager 610 directs client requests for the services managed by the first vServer 275A to a second vServer 275n. The second vServer 275n may be configured or established as backup server to the first vServer 275A. For example, the first vServer 275A may be designated a primary vServer 275A and the second vServer 275N as backup vServer 275N. In another embodiment, the second vServer 275N may be another virtual server—primary, redundant, or otherwise—for managing the services 270A-270N. In yet another embodiment, the second vServer 275N is configures or designated as the spillover virtual server for the first vServer 275A. In some cases, the second vServer 275N is established upon determining the first vServer 275275A exceeds the bandwidth threshold 820. In other cases, the vServer 275N is already operating or executing on the appliance 200.

In some embodiments, the connection manager 270 directs new client connection requests to the second vServer 275. In one embodiment, if the request is from a connection already established with the first vServer 275A, the connection manager 610 may direct the request to the first vServer 275A even if the bandwidth threshold 820 is exceeded. This may be referred to as connection or session persistence. In another embodiment, the connection manager 610 directs any client requests to the second vServer 275, for example, even a request of a previously established connection.

In one embodiment, the connection manager 610 directs client requests to the second vServer 275N while the first vServer 275 has a measured bandwidth 825 greater than the bandwidth threshold 820. In another embodiment, the connection manager 610 directs clients requests back to the first vServer upon determining that the measured bandwidth 825 of the first vServer 275 has fallen within the bandwidth threshold 820. In some embodiment, the connection manager 610 determines which of the first vServer 275A and the second vServer 275N has the lowest bandwidth usage or is the least nearest to the corresponding bandwidth threshold 820 and directs the client requests to the determined vServer. In other embodiments and in the case of multiple vServers 275A-275N exceeding a bandwidth threshold 820, the connection manager 610 determines which vServer 275A-275N exceeds its corresponding threshold 820 the least and directs the client requests to the determined vServer.

In some embodiments, the appliance 200 via a load monitor 420 and/or bandwidth detector 802 measures and monitors the bandwidth of the second virtual server 275N. The second vServer 275N may have the same bandwidth threshold 820 or a different bandwidth threshold 820 as the first vServer 275A. If the connection manager 610 determines from the load monitor 420 and/or bandwidth detector 802 that the measured bandwidth 825N of the second vServer 275N exceeds the bandwidth threshold 820, the connection manager 610 directs client requests for the services managed by the second vServer 275A to another vServer 275N, such as the first vServer 275A or a third vServer 275B. The second vServer 275N may have a third vServer 275B designated as backup virtual server or a spillover virtual server. The bandwidth threshold management techniques described herein may be used for a chain or plurality of virtual servers and spillover virtual servers, each with a bandwidth threshold and designated backup or spillover virtual server.

The appliance via the connection manager directs client requests to the primary vServer 275 or any backup or spillover vServer 275 based on measured bandwidth 825 in view of the established bandwidth thresholds 820. The appliance 200 may dynamically adjust any bandwidth threshold 820 for any vServer 275 based on any performance or operational characteristics of the appliance, vServer, bandwidth, network connection, client or server. For example, the load monitor and/or bandwidth detector may measure the bandwidth of the vServer or the network connection based on round trip times, packet loss and/or MTU. In one embodiment, the appliance may determine that the established bandwidth threshold 820 is set relatively low in comparison to the measured bandwidth 825 and determines to dynamically increase the bandwidth threshold 820. For example, the appliance may adjust to the bandwidth threshold 820 within a certain percentage or threshold of the measured bandwidth. In another embodiment, the appliance may determine that the established bandwidth threshold 820 is set relatively high in comparison to the measured bandwidth 825 and determines to dynamically decrease the bandwidth threshold 820.

In one case, the appliance 200 dynamically sets or establishes a bandwidth threshold 820 by measuring bandwidth 825 of a vServer 275 for a predetermined time period. For example, upon startup of a vServer 275, the bandwidth detector 802 may measure bandwidth for a predetermined or configured time period, and then based on an average, peak or range of bandwidth measurements set the bandwidth threshold 820. In yet other examples, the appliance 200 may dynamically adjust a bandwidth threshold 820 based on running additional vServers 275 or stopping, shutting down or other removing a vServer 275. In another case, the appliance 200 may dynamically adjust a bandwidth threshold 820 based on adding or removing services 270A-270n managed by a vServer 275. In still other embodiments, the appliance 200 may dynamically adjust the bandwidth threshold 820 of a vServer 275 based on information and feedback from a monitoring agent 197 and/or monitoring service 198. In still other embodiments, the appliance 200 may dynamically adjust bandwidth thresholds 820 based on one or more policies of a policy engine 195.

In some embodiment, the appliance 200 excludes a vServer 275 from a load computation or determination, or otherwise a load balancing decision if the bandwidth used 825 by the vServer 275 exceeds the bandwidth threshold 820. In these embodiments, this may be done so that the other vServer 275A-275N which carry the load for the excluded vServer 275 do not also become overloaded. In other embodiments, the appliance 200 adjusts a weight used for the vServer 275 upon detecting the vServer's bandwidth 825 exceeds the bandwidth threshold 820. For example, the weight of the vServer 275 may be adjusted to minimize the impact to the other vServer 275A-275N for not having the vServer 275 available to also service requests.

Referring now to FIG. 8B, an embodiment of steps of a method for practicing dynamic virtual server spillover management based on bandwidth is depicted. In brief overview, at step 805, the appliance establishes a first virtual server 275A which directs requests from a plurality of clients to a plurality of services. At step 810, the appliance establishes a bandwidth threshold for the first virtual server. At step 815, the appliance monitors a status for each of the plurality of services. At step 820, the appliance measures and monitors the bandwidth 825 used by the first vServer 275. At step 825, the appliance receives a client request. At step 830, the appliance determines whether or not the bandwidth threshold for the first vServer 275A has been exceeded. If not, at step 835, the appliance directs the client request to the first vServer 275A. If the threshold has been exceeded, the appliance at step 840 determines whether or not to establish or use a second vServer 275N or provide a redirect URL to the client 102. In one case, at step 845, the client is redirected to the service and bypasses the first vServer 275A. At step 850, the appliance may determine if the client is persistent with the first vServer 275A or the second vServer 275N. If the client is sticky to the first vServer 275A, the appliance may direct the request to the first vServer 275A at step 835. Otherwise, the appliance spills over to an established second vServer 275N at step 855. The method may continue at step 810 to monitor and perform spillover management for the second vServer 275N.

In further detail, at step 805, an appliance establishes a first virtual server 275 which manages connections and direct requests from a plurality of clients to a first plurality of services 270. In one embodiment, the appliance may establish the virtual server upon startup of the appliance. In another embodiment, the appliance may establish the virtual server in response to a previously established virtual server exceeding maximum connection threshold. In one embodiment, the appliance may establish a plurality of virtual servers. In some embodiments, a user configures and starts the first vServer 275. In other embodiments, the first vServer is configured, established or designed by the appliance or a user as a primary virtual server.

At step 810, the appliance may establish or otherwise provide a bandwidth threshold 820 for the first vServer 275. In one embodiment, the bandwidth threshold 820 may be initially configured by a user or administrator of the appliance. In another embodiment, the bandwidth threshold 820 may be initially determined by the appliance by monitoring the bandwidth used by the vServer 275 or by polling one or more services 270. In some embodiments, the appliance 200 may use a default or predetermined bandwidth threshold 820. For example, the appliance may use a predetermined bandwidth threshold 820 associated with or based on the type of service 270.

At step 815, the appliance may monitor a status for each of the services 270 using any means. In one embodiment, the appliance may use a monitoring agent 420. In another embodiment, the appliance may use a plurality of monitoring agents 420. In one embodiment, the appliance may monitor the status for each of the services at predetermined time intervals, for example once every 0.01, 0.1, 0.2, 0.5, or 1 seconds. In another embodiment, the appliance may monitor the status for each of the services 270 asynchronously or based on any events.

At step 820, the appliance measures and monitors the bandwidth used in association with the first vServer 275A. The load monitor 420 and/or bandwidth detector 802 may compute, determine or otherwise make bandwidth measurements 925. In one embodiment, the appliance determines the measured bandwidth 825 of a vServer 275 on a predetermined frequency. In another embodiment, the appliance determines the measured bandwidth 825 of a vServer 275 triggered by an event. In one case, the appliance determines the measured bandwidth 825 of a vServer 275 at the request of a user. In some embodiments, the appliance 200 measures bandwidth based on a number of bytes transferred to and/or from a vServer 275. In other embodiments, the appliance 200 measures bandwidth based on round trip times of communication to and/or from a vServer 275. In some embodiments, the appliance may dynamically adjust the bandwidth threshold 820 based on bandwidth measurements. In other embodiments, the appliance may dynamically adjust the bandwidth threshold 820 based on performance and/or operational characteristics of the appliance, the vServer 275, the network connection, and/or the service 270.

At step 825, the appliance may receive a client request. In one embodiment, the appliance intercepts the client request as a transparent interception device. In another embodiment, the client transmits the request to the appliance as a proxy. In some embodiments, the appliance receives a client request to open or establish a transport layer connection. In other embodiments, the appliances receive a client request to access a service via a previously established transport layer connection. The transport layer request may be received from any computing device including a client 102, server 106, or a second appliance 200. In one embodiment, the request may identify a type of service 270. For example, the transport layer request may comprise a request for HTTP service. Or, for example, the transport layer request may comprise a request for UDP service.

At step 830 the appliance may determine whether the measured bandwidth 825 for a vServer 275 has reached or exceeded the bandwidth threshold 820. The appliance may compare the current measured bandwidth 825 for the first virtual server with the current value of the bandwidth threshold 820 for the first virtual server. In other embodiments, the load monitor 420 and/or bandwidth detector 802 may have already determined the bandwidth threshold 925 for the vServer 275 has been reached or exceeded. In another embodiment, the appliance 200 may determine if the bandwidth threshold 825 has been reached or exceeded responsive to receiving the client request. If the bandwidth threshold 820 of the first virtual server has not been exceeded, the appliance may provide the client request to the first virtual server at step 835.

If the appliance determines the bandwidth threshold 820 of the first virtual server has been exceeded, the appliance may establish, use or otherwise spillover to a second virtual server 275N at step 840. In other embodiments, a second virtual server 275N may already have been established prior to some or any of the steps shown. In another embodiment, the second virtual server 275N may be established responsive to determining the bandwidth threshold 820 has been exceeded. The second virtual server may provide access to a second plurality of services 270. In one embodiment, one or more of the second plurality of services 270 may comprise the same type of service 270 as one or more of the first plurality of services. The appliance may then establish and/or adjust a bandwidth threshold 820 for the second virtual server. The appliance may provide the client request to the second virtual server 275 at step 855.

In other embodiments, if the bandwidth threshold 820 of the first virtual server has been exceeded, the appliance may redirect the client making the request to another resource. In one embodiment, the appliance may transmit a URL to the client comprising the address of a server 106 or service 270 such that the client may bypass the appliance 200 and access the server 106 or service 270 directly. In one embodiment, the appliance may transmit a URL to the client comprising the address of a second appliance 200. In still another embodiment, the appliance 200 may redirect the client request to a second appliance.

At step 850, the appliance 200 may determine whether the client making the request has a previously existing connection or session with either the first or a second virtual server. In some embodiments, an appliance may assign a priority to providing requests from a client to virtual servers that have previously serviced or are currently servicing connections or session from the client. For example, if a request is received from a client, and the client has a currently existing connection with a first virtual server, the appliance 200 may provide the request to the first virtual server even if the first virtual server has reached or exceeded the bandwidth threshold. Or, for example, if a client has a previous connection via a backup virtual server, and the primary virtual server subsequently falls below the bandwidth threshold 820, the appliance 200 may still provide a subsequent request from the client to the backup virtual server. In one embodiment, a connection management mechanism 610, or other appliance component may track previously established or current connections or session so that incoming requests from a client can be provided to a virtual server having previously serviced the connection or session from the client.

At step 855, the appliance 200 may dynamically manage virtual spillover based on bandwidth by directing or providing the client request to the spillover or second vServer 275N. In some embodiments, the appliance determines the second vServer 275 is busy, unavailable or has exceeded its bandwidth threshold or another threshold. In response, the appliance may redirect the client at step 840 or provide the client request to a third vServer 275B or another appliance 200'. In some embodiments, the appliance has a plurality of vServers 275A-275N managing the services 270 and determines which vServer to direct the client request based on comparison of each vServer's measured bandwidth and/or bandwidth threshold. In one case, the appliance provides the client request to one of a plurality of backup or spillover vServers based on the least measured bandwidth. In another case, the appliance provides the client request to the vServer with the greatest difference between the measured bandwidth and the bandwidth threshold.

Although an embodiment of method 800 is generally described above in regards to measuring and monitoring bandwidth of a first vServer and spilling over to a second vServer, any steps of the method may be performed for the second vServer and a spillover server for the second vServer, and for a third vServer, and so on. An embodiment of method 800 or any steps thereof may be practiced for a plurality of virtual servers, such as a set of primary vServer managing the same or different services. Another embodiment of method 800 or any steps thereof may be practiced for a chain of spillover virtual servers, so that a second vServer spills over into a third vServer based on bandwidth and so on.

Furthermore, any of the systems and method discussed herein may be practiced in combination. For example, the techniques of dynamic connection spillover management described in conjunction with FIGS. 6 and 7 may be practiced with the bandwidth based spillover management described in conjunction with FIGS. 8A and 8B. In some embodiment, the appliance may establish, monitor and manage spillover of virtual servers based on multiple thresholds. For example, the appliance may use both connection based thresholds and bandwidth based thresholds to determine to spillover a client request from one virtual server to another. In one embodiment, the appliance may spillover from one virtual server to another virtual server when both thresholds are reached or exceeded. In another embodiment, the appliance may spillover from one virtual server to another virtual server when either of the thresholds are reached or exceeded.

In some embodiments, the techniques of bandwidth based virtual server switching and spillover management described above may be combined with the content switching functionality and policies of the appliance to provide bandwidth management of a virtual server on an object basis. The appliance may be configured to have a set of one or more virtual servers to manage requests and response of predetermined object types. A first virtual server may be configured to provide requests to a second virtual server if the request identifies an object matching a pattern, such as a pattern of URL or file extension. For example, the first virtual server may direct the second virtual server to handle all image file requests with the extension of *.jpg, or *.gif. For these object types, the second virtual server manages requests and response of a plurality of services. The second virtual server may also be under bandwidth management by the appliance and have a bandwidth threshold. The appliance via one or more monitoring agents monitor the second virtual server to determine if the bandwidth used by the second virtual server in handling the requests for these object types is exceeded. If the threshold is exceeded, the appliance or first virtual server may spillover handling of the requests of these object types to another virtual server. Or in some cases, the appliance may provide a redirect URL to the client or redirect the client's request to another appliance, a server or to the service.

Figure 9A:
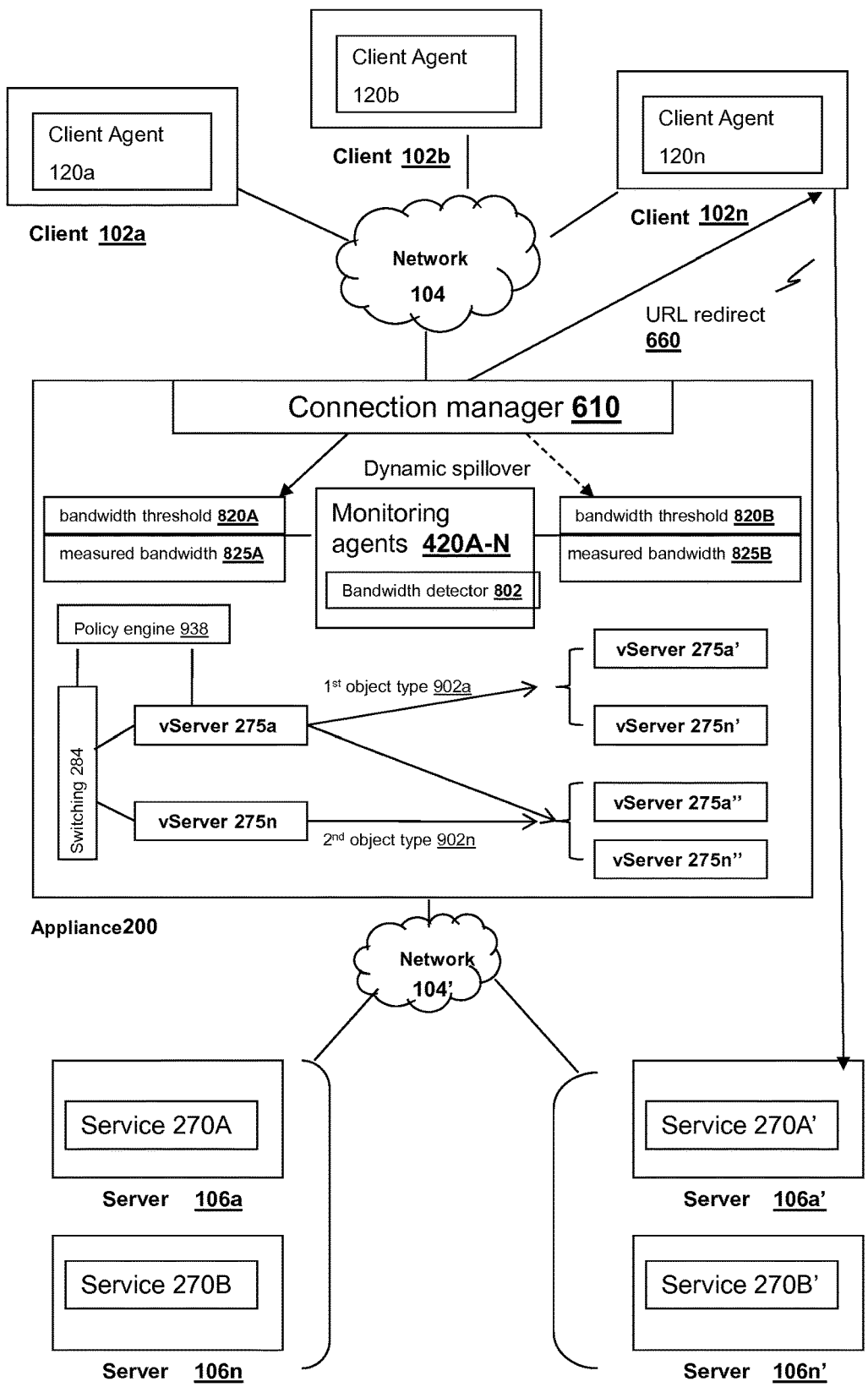
FIG. 9A is another embodiment of an appliance for providing a technique of virtual server spillover management based on bandwidth and objects.

Referring now to FIG. 9A, an embodiment of an appliance 200 for practicing a technique of object based bandwidth switching and spillover management is depicted. In brief overview, the appliance 200 establishes a first vServer 275A to manage access by a plurality of clients 102a-102n to one or more virtual servers 275A'-275N'which in turn manager access to one or more services 270A-270N of a first set of servers 106A-106N. The appliance 200 includes a connection management mechanism 610 for managing and balancing requests from clients 102a-102n to the vServers. A first vServer 275A may be configured via a policy engine 935 and/or via content switching 284 to direct requests from clients to one or more vServer 275A'-275N' based on the type of object 902A or objects identified via the request. In some cases, a policy of a policy engine provides logic or rules to determine which requests are forwarded by the first vServer 275 to one of the plurality of vServer 275A'-275N'. For example, the first vServer 275 may direct all requests matching a pattern for a URL may be transmitted to a second vServer 275A. Another vServer 275N may be configured to direct client request matching another policy or object type 902N to a second set of one or more vServers 275A"-275N".

The appliance 200 establishes for any of the object handling vServers 275A'-275N a bandwidth threshold 820A. This bandwidth threshold may be established by the appliance or specified by the user. Via monitoring agents 420A-420N, the appliance monitors the operational status of each of the object handling vServers 275A'275N' and corresponding services 270A-270N. For example, as previously discussed above, the monitoring agents 420 may use a bandwidth detector 802 to determine or measure bandwidth usage by a virtual server. If the measured bandwidth for a second vServer 275A' is determined to have reached or exceeded the bandwidth threshold 820A, the first virtual server 275A and/or connection manager 610 of the appliance may determine to direct client requests to a spillover vServer 275B which may handle requests for the same object type as the second vServer 275A. For example, a user may configure a bandwidth threshold of 5 Mbytes per second for graphic image object types, such as files with a *.jpg extension. If the bandwidth detector 820 determines the measured bandwidth 825 of the vServer 275A' exceeds 5 Mbytes a second, the appliance 200 may switch or spillover client requests to another vServer 275N'.

In some embodiments, a virtual server 275 may be designed, constructed or configured to manage other virtual servers. In one embodiment, a virtual server 275A-275N may be designed, constructed or configured to direct requests to other virtual servers based on any type and form of object type. In some embodiments, a vServer 275A-275N comprises any of the functionality and capabilities of the content switching 284 functionality as described above in FIG. 2B. In one embodiment, the vServer 275A-275N includes logic, functions, rules or operations to identify an object or objects from any content of a request or network packet(s) thereof. In some embodiments, the vServer 275A-275N identifies type of objects from URLs, or portions thereof. For example, the vServer 275A-275N may identify an object type from a URL of request by matching a predetermined URL pattern to the request's URL. In other embodiments, the vServer 275A-275N identifies types of objects from any file references, file names, file types or file extensions in the content of the request. In another embodiment, the vServer 275A-275N identifies types of objects from a request via any headers of any protocol layer of the requests, such as HTTP headers in an application layer protocol portion of the request.

In still other embodiments, the vServer 275A-275N identifies types of objects from any portion of any network packet(s) for a request. In one embodiment, the vServer 275A-275N associates an internet protocol address and/or port with an object type. In these embodiments, the vServer 275A-1275N identifies the object type from the source and/or destination of the network packet. In some embodiments, the vServer 275A-275N identifies or associates an object type from any header fields of any protocol layer of a network packet. In other embodiments, the vServer 275A-275N identifies or associates an object type from any option field of a header, such as TCP or IP option field. In another embodiment, the vServer 275A-275N identifies an object type from any information encoded in a header or payload of a packet. In one embodiment, the vServer 275A-275N identifies an object type by a type of protocol used for the request.

In other embodiments, a vServer 275A is designed to determine which requests to forward or provide to other virtual servers responsive to a policy engine 238. In some embodiments, the policy engine 238 includes one or more policies 1003 which identify rules for which the vServer 275A-275N may direct client requests to one of the other vServers 275A'-275N'. In one embodiment, the policy 903 identifies to a vServer 275A-275N any portion of content of a network packet or of a request to associate with an object type or otherwise direct to a vServer 275A'-275N. In another embodiment, the policy 903 identifies to a vServer 275A-275N any portion of content of a network packet or of a request to direct to a predetermined set of one or more services 270. In other embodiments, the policy 903 provides rules for matching any patterns of the rule to requests to associate with or identify an object type. For example, the policy 903 may identify a string pattern for a portion of a URL. In another example, the policy 903 may specify a pattern or rule for name of a file, or portion thereof. In further examples, the policy 903 may specify a pattern or rule for a file extensions. In still other cases, the policy 903 may specify a web page name with an object type. In another case, the policy 903 may specify a source and/or destination IP address or port with an object type. In one case, the policy 902 may specify a type of protocol to associate or identify an object type. The policy engine 238 and/or polices 1003 may specify any portion of a network packet, such as any data element of a header or payload, to use to identify an object type or otherwise indicate to a vServer 275A-275N to provide requests to other vServer 275A'275N' or services 270.

In view of the various ways to identify types of objects, an object type 902 may comprise any type and form of categorization, classification, grouping or identification. An object type may be an identification of an object as a certain type or belong to a group or classification. Any data or information included in, referenced by or associated with a client request may used to identify an object, or type thereof. An object type may also be referred to or considered an object identifier. In one embodiment, an object type 902A-902N may be based on groups of one or more object types. In other embodiments, an object type 902A-1002N may be granular and based on a specific name, reference or instance of an object. In some embodiments, the object type comprises types of files by name, content, or extension. For example, a first object type 902A may includes objects having a first file name extension, and a second object type 902N may include objects having a second file name extension. In another example, an object type 902A may include a group of objects, such as any object having one of a plurality of file name extensions. In yet further examples, the object type 902 may identify any type and form of media, such as voice, audio, data or any combination.

In other embodiments, an object type 902 is based on a pattern for a URL. In another embodiment, an object type 902 is based on a destination portion of a URL. In some embodiments, the object type 902 may be based on a domain or server identified by a URL. In one embodiment, the object type 902 may include URLs that identify a specified web page. In some embodiments, an object type 902 may include a set or group of one or more URL patterns, or portions of URLs. In yet other embodiments, an object type 902 is based on a source and/or destination of the request. In one embodiment, the object type 902 is based on the type of protocol used by the request. In other embodiments, the object type 902 is based on any information of a header or payload of a packet(s) for the request.

In still other embodiments, a user may configure or identify object types 902A-1002N in any desired combination, arrangement or manner. In one embodiment, a user may specify an object type 902 to be any URL pattern. In another embodiment, a user may specify an object type 902 to be any pattern for a resource or file identified in the request. In some embodiments, the user may specify any IP address and/or port to be used to identify an object type. In other embodiments, the user may specify any portion of a network packet, such as any header field or data in a payload, as identifying an object type 902. In still further embodiments, a user may specify any matching portion of a request to be associated with an object type.

As illustrated in FIG. 9A, multiple vServers 275A-N may be configured, designed or constructed to direct client requests based on a multiple object types 902A-1002N to a plurality of vServers 275A'-275N' and 275A"-275N". A first vServer 275A may be configured to forward requests corresponding to a first object type to one or more vServers 275A-275N, which manage one or more services 270A-270N. A second vServer 275N may be configured to forward requests corresponding to a second object type 902N to a second set of one or more vServers 275A'-275N', which manage one or more services 270A'-270N'. For example, the first vServer 275A may direct requests corresponding to graphical image related object types to a second vServer 275A'. The second vServer 275N may direct requests corresponding to predetermined URL patterns to a third vServer 275A". In some cases, the second vServer 275N may direct request corresponding to the object types handled by the first vServer 275A to the second set of vServers 275A'-275N'.

The appliance 200 may have a plurality of a first set of vServers 275A-275N directing requests to a plurality of other vServers 275A'-275N' and 275A"-275N" based on a multitude of object types 902A-902N. Object types 902A-902N or policies thereof may be configured by a user to have a wide range of different types 902 from broad groupings to very granular object identifiers. For example, a first vServer 275A may directs requests corresponding to a more broad classification of object types 902, that are identifies as an HTTP object. In another example, a second vServer 275N may directs requests corresponding to a more narrow identification of an object type, such a file by a specific name or a specific URL, or portion of a URL.

Figure 9B:
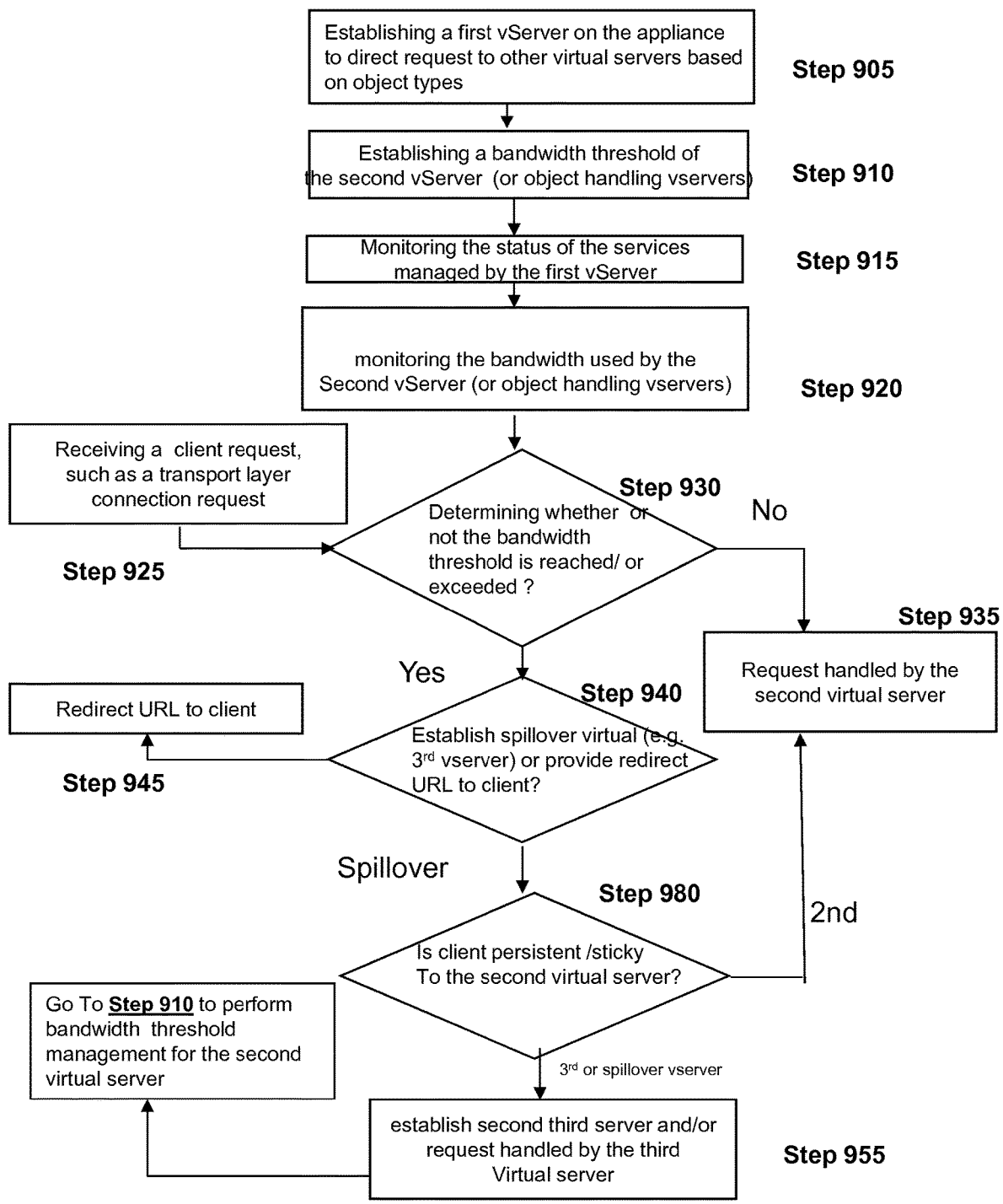
FIG. 9B is a flow diagram of steps of an embodiment of a method for practicing a technique of spillover management based on bandwidth and objects in conjunction with the system of FIG. 9A.

Referring now to FIG. 9B, an embodiment of steps of a method for practicing an object and bandwidth based virtual spillover management and switching technique is depicted. In brief overview, at step 905, the appliance establishes a first virtual server 275A which directs requests from a plurality of clients corresponding to an object type 902 to one or more virtual servers 275A'275N, such as a second virtual server 275A'. At step 910, the appliance establishes a bandwidth threshold for the second virtual server. At step 915, the appliance monitors a status for each of the plurality of virtual servers, and corresponding to services. At step 920, the appliance measures and monitors the bandwidth 825 used by the second vServer 275A'. At step 925, the appliance receives a client request. At step 930, the appliance determines whether or not the bandwidth threshold for the second vServer 275A' has been exceeded. If not, at step 935, the appliance directs the client request to the second vServer 275A'. If the threshold has been exceeded, the appliance at step 940 determines whether or not to establish or use a third vServer 275N' or provide a redirect URL to the client 102. In one case, at step 945, the client is redirected to the service and bypasses the second vServer 275A'. At step 950, the appliance may determine if the client is persistent with the second vServer 275A'. If the client is sticky or persistent to the second vServer 275A, the appliance may direct the request to the second vServer 275A' at step 935. Otherwise, the appliance spills over to an established third vServer 275N' at step 955. The method may continue at step 910 to monitor and perform object based spillover management for the third vServer 275N.

In further detail, at step 905, an appliance establishes a first virtual server 275A which manages connections and direct requests from a plurality of clients to a first set of one or more vServers 275A'-275N'. The first set of one or more vServers 275A'-275N' may manage, such as load balance, one or more services 270. The first vServer 275A may be configured to direct request identifying a first object type 902A to a first set of one or more vServers 275A'-275N', such as a second vServer 275A'. In some embodiments, the first vServer 275A determines or identifies object types from a request responsive to one or more policies 1003 of a policy engine 238. In another embodiment, the first vServer 275N determines which vServer 275A'-275N' to direct the request responsive to a policy 903 and/or the policy engine 238. In one embodiment, the appliance may establish a plurality of virtual servers 275A-275N, each vServer 275A-275N direct client requests based on a different object type or the same object type.

At step 910, the appliance may establish or otherwise provide a bandwidth threshold 820 for any of the object handling vServers, such as the second vServer 275A'. In one embodiment, the bandwidth threshold 820 may be initially configured by a user or administrator of the appliance. In another embodiment, the bandwidth threshold 820 may be initially determined by the appliance by monitoring the bandwidth used by the vServer 275 or by polling one or more services 270. In some embodiments, the appliance 200 may use a default or predetermined bandwidth threshold 820. For example, the appliance may use a predetermined bandwidth threshold 820 associated with or based on the type of service 270. In other embodiments, the bandwidth thresholds 920 may be established by the appliance or user based on the object type. In one case, a vServer 275A' may be configured to have a bandwidth threshold 820A for a first object type 902 and another vServer 275N' may be configured with a bandwidth threshold 820N having a different threshold value than bandwidth threshold 820A. For example, a vServer 275A' processing requests for media content, such as video, audio may be designated with a larger bandwidth threshold 820A than a vServer 275B' handlings requests for smaller files or web pages.

At step 915, the appliance may monitor a status of any of the vServers and any vServers or services 270 under management. In one embodiment, the appliance may use a monitoring agent 420. In another embodiment, the appliance may use a plurality of monitoring agents 420A-420N. In one embodiment, the appliance may monitor the status for each or any of the vServers 275A'-275N' at predetermined time intervals, for example once every 0.01, 0.1, 0.2, 0.5, or 1 seconds. In another embodiment, the appliance may monitor the status for each or any of the vServers 275A'-275N' asynchronously or based on any events.

At step 920, the appliance measures and monitors the bandwidth used by any of the vServers 275A'-275N' receiving client communications directed from the first vServer 275A. The load monitor 420 and/or bandwidth detector 802 may compute, determine or otherwise make bandwidth measurements 925. In one embodiment, the appliance determines the measured bandwidth 825 of a vServer 275 on a predetermined frequency. In another embodiment, the appliance determines the measured bandwidth 825 of a vServer 275 triggered by an event. In one case, the appliance determines the measured bandwidth 825 of a vServer 275 at the request of a user. In some embodiments, the appliance 200 measures bandwidth based on a number of bytes transferred to and/or from a vServer 275. In other embodiments, the appliance 200 measures bandwidth based on round trip times of communication to and/or from a vServer 275. In some embodiments, the appliance may dynamically adjust the bandwidth threshold 820 based on bandwidth measurements. In other embodiments, the appliance may dynamically adjust the bandwidth threshold 820 based on performance and/or operational characteristics of the appliance, the vServer 275, the network connection, and/or the service 270.

At step 925, the appliance may receive a client request. In some embodiments, the client request is for one or more objects having an object type 902. In one embodiment, the client request includes a URL matching, identifying, associated with or corresponding to an object type 902. In another embodiment, the client request includes a file name, reference, type or extension identifying or associated with an object type 902. In one embodiment, the appliance intercepts the client request as a transparent interception device. In another embodiment, the client transmits the request to the appliance as a proxy. In other embodiments, the appliances receives a client request to access a service via a previously established transport layer connection. The transport layer request may be received from any computing device including a client 102, server 106, or a second appliance 200. In one embodiment, the request may identify a type of service 270, which may be associated with or other identify an object type 902. In yet another embodiment, the appliance 200 applies a policy 903 to any portion or content the client request to identify or determine the object type 902.

In other embodiments, the client request identifies a plurality of object types 902A-902N. In these embodiments, the first vServer 275A directing traffic to the other vServers 275A'-275N' may split the request up according to each of the plurality of object types 902A-902N. For example, the first vServer 275A may directs a first portion of the request corresponding to a first object type to a second vServer 275A', and a second portion of the request corresponding to a second object type to a third vServer 275N'. In another example, the first vServer 275A directs a first portion of the request identifying a first object type 902A to vServer 275A' while a second vServer 275B directs a second portion of the request identifying a second object type 902N to another vServer 275N". In some embodiments, the first vServer 275A may direct a client request having a plurality of object types 902A-902N to a single second vServer 275A'. The handling of multiple object types 902A-902N may be specified by a policy of which object type 902A-902N has priority in switching decisions for virtual servers.

At step 930 the appliance may determine whether the measured bandwidth 825 for an object handling vServer 275A'-275N' has reached or exceeded the corresponding bandwidth threshold 820A-920N. For example, the appliance may compare the current measured bandwidth 825A for the second first virtual server 275A' handling a first object type 902 with the current value of the bandwidth threshold 820A for the second virtual server. In other embodiments, the load monitor 420 and/or bandwidth detector 802 may have already determined the bandwidth threshold 925 for the second vServer 275A' has been reached or exceeded. In another embodiment, the appliance 200 may determine if the bandwidth threshold 925 has been reached or exceeded responsive to receiving the client request. If the bandwidth threshold 820 of the second vServer 275A', the appliance may provide the client request to the second virtual server at step 935.

If the appliance determines the bandwidth threshold 820 of the second virtual server 275A' has been exceeded, the appliance may establish, use or otherwise spillover to a third virtual server 275N at step 940. The third virtual server 275N' may handle client requests corresponding to the object type of the second virtual server 275A'. In other embodiments, a third virtual server 275N' may already have been established prior to some or any of the steps shown. In another embodiment, the third virtual server 275N may be established responsive to determining the bandwidth threshold 820 has been exceeded. The second virtual server may provide access to the object type 920 via a second plurality of services 270. In one embodiment, one or more of the second plurality of services 270 may comprise the same type of service 270 as one or more of the first plurality of services. The appliance may then establish and/or adjust a bandwidth threshold 820 for the third virtual server. The appliance may provide the client request to the second virtual server 275N' at step 955.

In other embodiments, if the bandwidth threshold 820 of the second virtual server 275A' has been exceeded, the appliance may redirect the client making the request to another resource. In one embodiment, the appliance may transmit a URL to the client comprising the address of a server 106 or service 270 such that the client may bypass the appliance 200 and access the server 106 or service 270 directly. In one embodiment, the appliance may transmit a URL to the client comprising the address of a second appliance 200. In still another embodiment, the appliance 200 may redirect the client request to a second appliance.

At step 950, the appliance 200 may determine whether the client making the request has a previously existing connection or session with either the first or a second virtual server. In some embodiments, an appliance may assign a priority to providing requests from a client to virtual servers that have previously serviced or are currently servicing connections or session from the client. For example, if a request is received from a client, and the client has a currently existing connection with a third virtual server 275N', the appliance 200 may provide the request to the third virtual server even if the second virtual server 275A' has reached or exceeded the bandwidth threshold. Or, for example, if a client has a previous connection via a backup virtual server, and the primary virtual server subsequently falls below the bandwidth threshold 820, the appliance 200 may still provide a subsequent request from the client to the backup virtual server. In one embodiment, a connection management mechanism 610, or other appliance component may track previously established or current connections or session so that incoming requests from a client can be provided to a virtual server having previously serviced the connection or session from the client.

At step 955, the appliance 200 may dynamically manage virtual spillover based on bandwidth and object types by directing or providing the client request to the spillover or third vServer 275N'. In some embodiments, the appliance determines the third vServer 275N' handling a first object type is busy, unavailable or has exceeded its bandwidth threshold or another threshold. In response, the appliance may redirect the client at step 940 or provide the client request to a fourth vServer 275B' handling the first object type or another appliance 200'. In some embodiments, the appliance has a plurality of vServers 275A'-275N' handling objects corresponding to an object type and determines which vServer to direct the client request based on comparison of each vServer's measured bandwidth and/or bandwidth threshold. In one case, the appliance provides the client request to one of a plurality of backup or spillover vServers configured to handle the object type based on the least measured bandwidth. In another case, the appliance provides the client request to the vServer handling the object type with the greatest difference between the measured bandwidth and the bandwidth threshold.

Although an embodiment of method 900 is generally described above in regards to measuring and monitoring bandwidth of a second vServer managed by a first vServer and spilling over to a third or fourth vServer, any steps of the method may be performed for the third spillover vServer, fourth spillover vServer and so on. An embodiment of method 1000 or any steps thereof may be practiced for a plurality of virtual servers managing a plurality of other virtual servers, each handling a plurality of object types. Another embodiment of the method or any steps thereof may be practiced for a chain of spillover virtual servers, so that a second vServer spills over into a third vServer based on bandwidth and object types, and the third vServer into a fourth vServer and so on.

Furthermore, any of the systems and method discussed herein may be practiced in combination. For example, the techniques of dynamic connection spillover management described in conjunction with FIGS. 6 and 9 may be practiced with the object based bandwidth based spillover management described in conjunction with FIGS. 9A and 9B. In some embodiment, the appliance may establish, monitor and manage spillover of virtual servers based on multiple thresholds. For example, the appliance may use both connection based thresholds and bandwidth based thresholds to determine to spillover from one virtual server to another for handling a client request identifying an object type. In one embodiment, the appliance may spillover from one virtual server to another virtual server when both thresholds are reached or exceeded and for a certain object type. For example, for processing client requests of a first object type, the second vServer managed by the first vServer may have a connection capacity threshold and a bandwidth threshold. Another object handling vServer may have different connection capacity threshold and/or bandwidth threshold. In another embodiment, the appliance may spillover from one virtual server to another virtual server for handling objects of a certain type when either of the thresholds are reached or exceeded.

H. Systems and Methods for Health Based Spillover

Figure 10A:
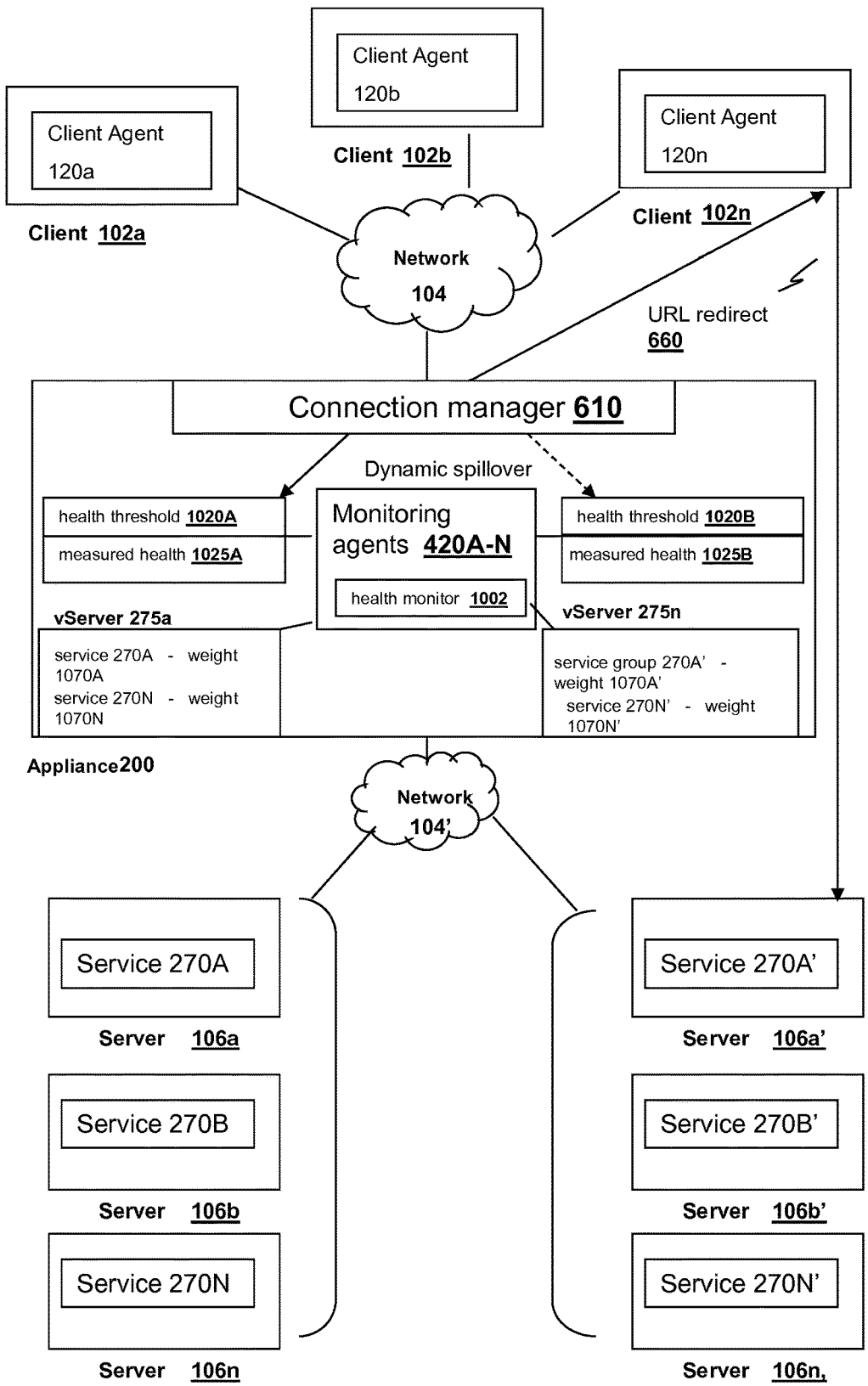
FIG. 10A is an embodiment of an appliance for providing a technique of virtual server spillover management based on health.
Figure 10B:
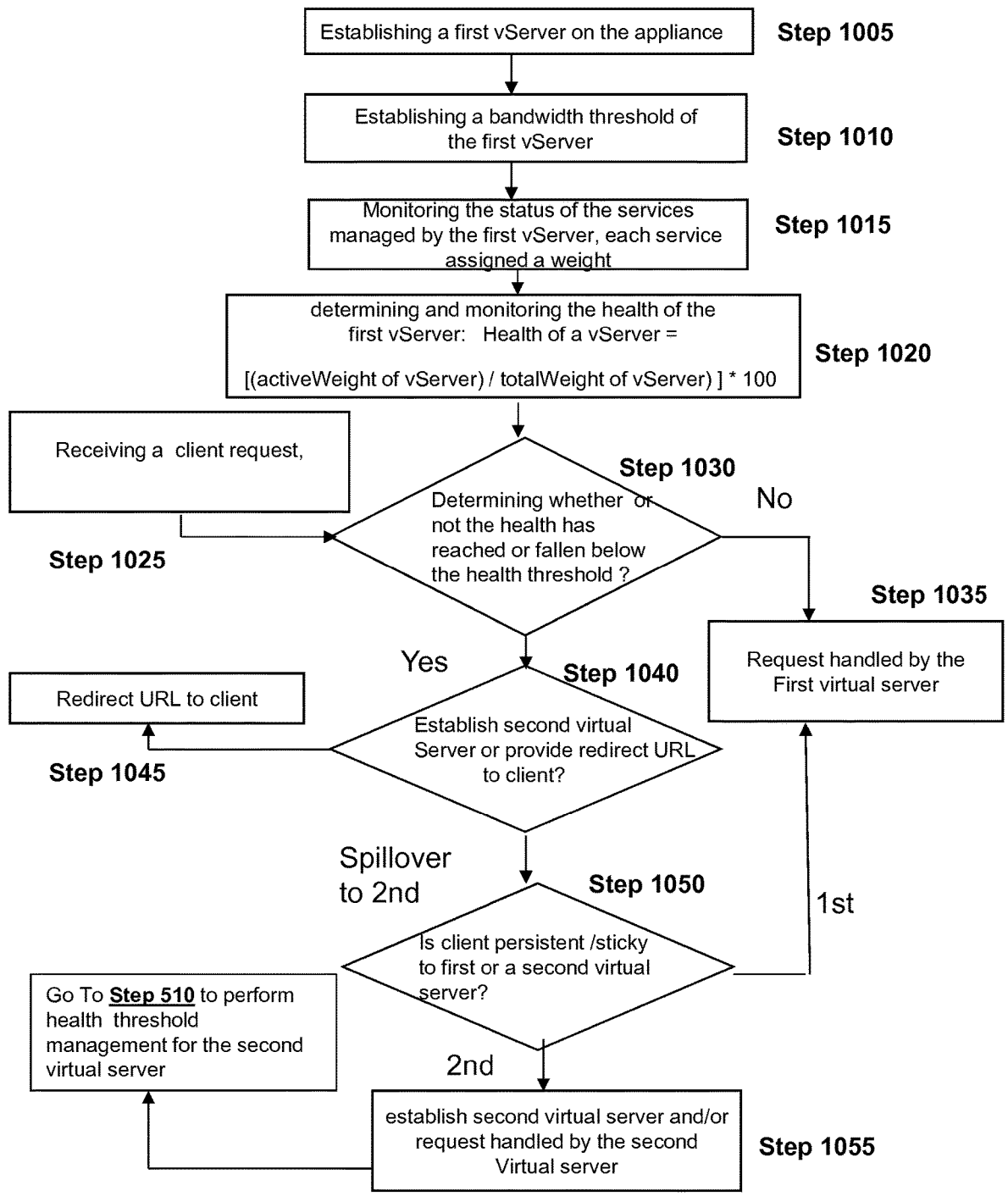
FIG. 10B is a flow diagram of steps of an embodiment of a method for practicing a technique of spillover management based on health in conjunction with the system of FIG. 5A.

Referring now to FIGS. 10A and 10B, systems and methods for managing spillover from a first virtual server to a second virtual server based on health are depicted. The appliance may establish or user configure a health threshold for one or more virtual servers managing one or more services. The health threshold may be established or identified as a percentage. The appliance monitors the health of the services used by a virtual server. In response to detecting the health falling below the established health threshold, the appliance dynamically directs client requests to another virtual server. The health threshold may be adjusted to take into account capacity, response times, virtual server performance or performance of the server. The appliance manages virtual servers based on health to maintain performance of the virtual servers and the services managed by the virtual servers at a desired level or within a predetermined performance range.

Referring now to FIG. 10A, an embodiment of an appliance or intermediary for providing virtual server spillover management based on health is depicted. In brief overview, the appliance 200 establishes a first vServer 275A to manage access by a plurality of clients 102a-102n to one or more services 270A-270N of a first set of servers 106A-106N. The appliance 200 includes a connection management mechanism 610 or connection manager for managing and balancing requests from clients 102a-102n to one or more set of services 270A-270N via one or more vServers 275A-275N. The appliance 200 establishes for a first vServer 275A a health threshold 1020A, which may be specified by a user. The appliance may establish a second vServer 275N with a second health threshold 1020B. Via monitoring agents 420A-420N, the appliance monitors the operational status of each of the services 270A-270N. The monitoring agents 420 may include a health monitor 1002 for measuring the health used by a virtual server 275. The health monitor 1002 may at predetermined frequencies or time frames determine a measured health 1025A for a first vServer 275A. The health monitor 1002 may also determine a measured health 1025B for the second vServer 275N.

If the measured health for the first vServer 275A is determined to have reached or fallen below the health threshold 1020A, the connection manager 610 of the appliance may determine to direct client requests to the second vServer 275N. For example, a user may configure a health threshold at 50%. If the health detector 1020 determines the measured health 1025 of the vServer 275 falls below 50%, the appliance 200 via the connection management mechanism 610 may switch client requests to the second vServer 275N.

Each of the vServers 275A-275n may identify or be configured to identify the one or more services the vServer is managing. In some embodiments services may be organized or configured into a group referred to as a service group or group of services. In some of these embodiments, a command, instruction, policy or configuration may be applied to each service in a service group by referencing the service group via the command, instruction, policy or configuration. In some embodiments, a service or a service group may be enabled or disabled by an administrator of the appliance. In other embodiments, a service or service group may be enabled or disabled by any component of the appliance, such as connection manager 610 or a monitoring agent 420. In some embodiments, a service or service group may be referred to or considered a member of the vServer.

In some embodiments, to have a service or service group be managed by a vServer, the service or service group may be bound to the vServer via any type and form of bind command or instruction. In some of these embodiments, a service may be referred to as bound to a vServer. In some embodiments, a service may be enabled or disabled but not bound to the vServer. In other embodiments, a service may be bound to a vServer but disabled.

Any of the services 270A-270N' and/or service groups may be assigned any type and form of weight 1070, such as any of the weights described in conjunction with FIGS. 4A and/or 4B. The weight may be any type and form of numerical factor identifying a relative degree of importance, influence, consideration or value. In some embodiments, each service may be assigned the same weight. In other embodiments, each service may be assigned a different weight. In some embodiments, some services are assigned the same weight while other services are assigned different weights. In one embodiment, a same or different weight may be assigned to any service group. In some embodiments, the weight assigned to a service group is assigned at the group level. For example, the service group may be considered a single entity with the assigned eight. In other embodiments the weight assigned to a service group is assigned to each of the services of the service group. For example, the services in the service group may be treated as separate entities each with the same weight assigned to the service group. In some embodiments, a sum of the weights 770 assigned to a service and/or service group may be equal to 100. In other embodiments, a sum of the weights 770 assigned to a service and/or service group may be any predetermined number greater than or less than 100.

In some embodiments, a service and/or service group may be assigned a different weight based on state: up/down (active/inactive), enabled/disabled, etc. In one embodiment, a service may have a first weight for an up state. In some embodiments, the service may have a second weight for a down state. In some embodiments, a service and/or service group may be assigned a different weight based on load. In another embodiment, the a service and/or service group may be assigned a progressively changing weight based on changes in state and/or load.

The health 1025A-1025B, generally referred to as health 1025, may be defined as a percentage of weights of services that are currently in an up state, sometimes referred to as active, to the sum total of the weights of all enabled services, such as those services that are either in an up or down state. The down state is sometimes referred to as inactive. From a computational perspective, the health 1045 may be expressed or represented in logic or executable form as:

Health of a virtualServer=[(activeWeight of virtualServer)/totalWeight of virtualServer)]*100 where:
activeWeight of services for vServer 275=sum of weights of services and/or service groups that are (a) active and, in some embodiments, also (b) enabled
totalWeight(virtual server)=sum of weights of services and/or service groups of the vServer 275 that are enabled.

The activeWeight parameter, input or value to the health determination may comprise the addition or summation of each of the weights assigned to each service and/or service group that is identified as in a predetermined state. In one embodiment, the predetermined state is up or active. The activeWeight value may be set to a resulting total of the addition or summation. In some embodiments, the service and/or service group must be enabled and in the predetermined state to be included in the addition or summation. In some embodiments, the service and/or service group must be bound and in the predetermined state to be included in the addition or summation.

The totalWeight parameter, input or value to the health determination may comprise the addition or summation of each of the weights assigned to each service and/or service group that is assigned to the vServer. In some embodiments, those service and/or service groups that are enabled are included in the totalWeight computation. In some embodiments, those service and/or service groups that are bound to the vServer are included in the totalWeight computation. in some embodiments, those service and/or service groups that either have an up or down state are included in the totalWeight computation The sum of weights of services and/or service groups that are enabled may include all services that are either identified as 'UP' or 'DOWN'. In some embodiments, the sum of weights of services and/or service groups that are enabled may not includes those services which are marked disabled or otherwise configured to be disabled.

In some embodiments, the health is expressed numerically. In other embodiments, the health is expressed as text or string format. In some embodiments, health is expressed as a percentage, in the form X %, XX %, XXX %, In some embodiments, the range of health is from 0% to 100%. In some embodiments, health may be expressed as a percentage with any number of decimal places, such as X.X %, XX.XX % or XXX.XXX %. In other embodiments, health is expressed without multiplying by a 100 in the above equation. In these embodiments, health may be expressed as a percentage greater than 100%. In other embodiments, the health may be a number. In some embodiments, health may be a ratio. In one embodiment, health may be a fraction. In some embodiments, health may be a decimal.

The health monitor 1002, sometimes referred to as a health detector or detector, includes or provides logic, business rules, functions or operations for determining the health of one or more virtual servers 275. The health detector 1002 may include software, hardware or any combination of software and hardware. The health detector 1002 may comprise an application, program, script, library, process, service, driver, task, thread or any type and form of executable instructions. In some embodiments, the health monitor is a monitoring agent. In another embodiment, the health monitor is part of a monitoring agent. In still another embodiment, the health monitor may be part of the vServer. In yet another embodiment, the health monitor may be a separate component of the appliance in communication with any one or more of the monitoring agent, vServer and/or connection manager.

In some embodiments, the health detector 1002 determines or computes the health 1020. The health detector 1002 may determine the health on a predetermined frequency. In some embodiments, the health detector 1002 determines an average health over any period of time In other embodiments, the health detector 1002 measures the health 1025 for a vServer 275 based on the number of packets on a queue waiting to be transmitted. In some embodiments, the health detector 1002 determines health upon the transition of a queue of network packets from empty to non-empty and vice-versa. In some embodiments, the health detector 1002 determines health upon receipt of a client request. In some embodiments, the health detector 1002 determines health upon receipt of a server response.

The health detector 1002 may determine the health of a vServer responsive to any one or more monitoring agents. For example, in some embodiments, the health detector may compute/recompute the health upon return of a status of a service from a monitoring agent. In another embodiment, the health detector may compute/recompute the health upon a change in status of a service from a monitoring agent. In some embodiments, the health detector may determine the health at a configured or configurable predetermined frequency. In some embodiments, the health detector may determine the health at different times or different frequencies for each vServer. In yet another embodiment, the health detector may use different health computations among a plurality of vServers. For example, in some embodiments, the type and form of the health computation may be configurable or specified by policy.

In some embodiments, the health detector 1002 determines, computes or establishes the totalWeight of health a first time and updates the totalWeight of services upon a change in the enabled or disabled state of a service or service group. In some embodiments, the health detector 1002 determines, computes or establishes the totalWeight of health a first time and updates the totalWeight of services upon a change in the weight of any of a service or service group. In other embodiments, the health detector 1002 determines, computes or establishes the totalWeight any type a health determination or computation is made.

The health threshold 1020 for a vServer 275 may be specified as a number, such as a real or integer. In some embodiments, the health threshold 1020 may be expressed as a percentage. In other embodiments, the health threshold 1020 may be expressed as a ratio or a decimal. For example, the health threshold 1020 may represent a percentage of enabled services active and used by the vServer 275. In another example, the health threshold 1020 may represent a percentage of health available to the vServer 275. In some embodiments, the health threshold may be expressed logically using any type and form of expression, such as for example, "health <20%".

In some embodiments, the health threshold 1020 may indicate a relative percentage from a predetermined point. In one embodiment, the health threshold 1020 identifies an amount of change of the measured health. For example, the health threshold 1020 may represent an amount of decrease in percentage of health to be considered triggering the threshold. In another embodiment, the health threshold 1020 may indicate an average health value to maintain. In some embodiments, the health threshold 1020 may indicate an average health value over a period of time. In other embodiments, the health threshold 1020 may indicate a relative percentage of services that change from an active to inactive state or from an up to a down state.

The connection management mechanism 610, also referred to as a connection manager or a virtual server switch, comprises software, hardware, or any combination of software and hardware having logic, functions or operations for receiving and managing requests, connections and communications from one or more clients 102A-102N. In one embodiment, the connection manager 610 receives or intercepts transport layer connection requests and/or communications between the clients 102A-102N and one or more services 270A-270N. The connection manager 610 may include an application, program, service, process, task, thread or any type and form of executable instructions. In response to receiving a client communication, the connection manager 610 identifies, determines or selects a vServer 275 for processing a received communication from a client 102.

The connection manager 610 may operate responsive to the load monitor 420 and/or the health detector 1002. The load monitor 420 may monitor the measured health 1025. In some embodiments, the load monitor 420 and/or health detector 1002 measures the health on a predetermined frequency. In one embodiment, the load monitor 420 and/or health detector 1002 measures the health responsive to any events, such as receipt of a network packet. In other embodiments, the load monitor 420 and/or health detector 1002 may determine whether or not the measured health 1025 is less than the health threshold 1020.

If the connection manager 610 determines from the load monitor 420 and/or health detector 1002 that the measured health 1025 of a first vServer 275A falls below the health threshold 1020, the connection manager 610 directs client requests for the services managed by the first vServer 275A to a second vServer 275n. The second vServer 275n may be configured or established as backup server to the first vServer 275A. For example, the first vServer 275A may be designated a primary vServer 275A and the second vServer 275N as backup vServer 275N. In another embodiment, the second vServer 275N may be another virtual server—primary, redundant, or otherwise—for managing the services 270A-270N. In yet another embodiment, the second vServer 275N is configures or designated as the spillover virtual server for the first vServer 275A. In some cases, the second vServer 275N is established upon determining the first vServer 275275A fall below the health threshold 1020. In other cases, the vServer 275N is already operating or executing on the appliance 200.

In some embodiments, the connection manager 270 directs new client request requests to the second vServer 275. In one embodiment, if the request is from a connection already established with the first vServer 275A, the connection manager 610 may direct the request to the first vServer 275A even if the health threshold 1020 is exceeded or fallen below. This may be referred to as connection or session persistence. In another embodiment, the connection manager 610 directs any client requests to the second vServer 275, for example, even a request of a previously established connection.

In one embodiment, the connection manager 610 directs client requests to the second vServer 275N while the first vServer 275 has a measured health 1025 greater than the health threshold 1020. In another embodiment, the connection manager 610 directs clients requests back to the first vServer upon determining that the measured health 1025 of the first vServer 275 has increased above the health threshold 1020. In some embodiment, the connection manager 610 determines which of the first vServer 275A and the second vServer 275N has the highest health or is the least nearest to the corresponding health threshold 1020 and directs the client requests to the determined vServer. In other embodiments and in the case of multiple vServers 275A-275N falling below a health threshold 1020, the connection manager 610 determines which vServer 275A-275N falls below its corresponding threshold 1020 the least and directs the client requests to the determined vServer.

Upon detecting the health threshold 1020 has been reached for the first vServer 275A and/or the second vServer 275N, the connection management mechanism 610, in one embodiment, may determine not to establish another spillover vServer 275N but instead redirects the client 102 directly to a server 106 or otherwise to bypass the appliance 200. For example, the connection management mechanism 610 may determine the health threshold 1020B for the spillover vServer 275N has been reached and may redirect the client 102 to bypass the appliance 200 instead of establishing a third vServer 275N for spillover. In these embodiments, the connection management mechanism 610 may transmit a redirect Uniform Resource Locator (URL) 660 to the client 102 for the client 102 to connect to in response to the client's connection request. The URL 660 may identify any one of the servers 106 or services 270.

In some embodiments, the appliance 200 via a load monitor 420 and/or health detector 1002 measures and monitors the health of the second virtual server 275N. The second vServer 275N may have the same health threshold 1020 or a different health threshold 1020 as the first vServer 275A. If the connection manager 610 determines from the load monitor 420 and/or health detector 1002 that the measured health 1025N of the second vServer 275N falls below the health threshold 1020, the connection manager 610 directs client requests for the services managed by the second vServer 275A to another vServer 275N, such as the first vServer 275A or a third vServer 275B. The second vServer 275N may have a third vServer 275B designated as backup virtual server or a spillover virtual server. The health threshold management techniques described herein may be used for a chain or plurality of virtual servers and spillover virtual servers, each with a health threshold and designated backup or spillover virtual server.

The appliance via the connection manager directs client requests to the primary vServer 275 or any backup or spillover vServer 275 based on measured health 1025 in view of the established health threshold 1020. The appliance 200 may dynamically adjust any health threshold 1020 for any vServer 275 based on any performance or operational characteristics of the appliance, vServer, bandwidth, network connection, client or server. In one embodiment, the appliance may determine that the established health threshold 1020 is set relatively low in comparison to the measured health 1025 and determines to dynamically increase the health threshold 1020. For example, the appliance may adjust to the health threshold 1020 within a certain percentage or threshold of the measured health. In another embodiment, the appliance may determine that the established health threshold 1020 is set relatively high in comparison to the measured health 1025 and determines to dynamically decrease the health threshold 1020.

In one case, the appliance 200 dynamically sets or establishes a health threshold 1020 by measuring health 1025 of a vServer 275 for a predetermined time period. For example, upon startup of a vServer 275, the health detector 1002 may measure health for a predetermined or configured time period, and then based on an average, peak or range of health measurements set the health threshold 1020. In another case, the appliance 200 may dynamically adjust a health threshold 1020 based on adding or removing services 270A-270n managed by a vServer 275. In still other embodiments, the appliance 200 may dynamically adjust the health threshold 1020 of a vServer 275 based on information and feedback from a monitoring agent 197 and/or monitoring service 198. In still other embodiments, the appliance 200 may dynamically adjust health thresholds 1020 based on one or more policies of a policy engine 195.

In some embodiment, the appliance 200 excludes a vServer 275 from a load computation or determination, or otherwise a load balancing decision if the health 725 of the vServer 275 falls below the health threshold 1020. In these embodiments, this may be done so that the other vServer 275A-275N which carry the load for the excluded vServer 275 do not also become overloaded. In other embodiments, the appliance 200 adjusts a weight used for the vServer 275 upon detecting the vServer's bandwidth 1025 exceeds the health threshold 1020. For example, the weight of the vServer 275 may be adjusted to minimize the impact to the other vServer 275A-275N for not having the vServer 275 available to also service requests.

In some embodiments, the appliance or any component thereof may adjust any one or more weight of any one of the services or service groups and then recompute the health. The appliance 200 may dynamically adjust any weight any service or service group based on any performance or operational characteristics of the appliance, vServer, bandwidth, network connection, client or server.

Referring now to FIG. 10B, an embodiment of steps of a method for practicing dynamic virtual server spillover management based on health is depicted. In brief overview, at step 905, the appliance establishes a first virtual server 275A which directs requests from a plurality of clients to a plurality of services. At step 910, the appliance establishes a health threshold for the first virtual server. At step 915, the appliance monitors a status for each of the plurality of services. At step 950, the appliance measures and monitors the health 1025 of the first vServer 275. At step 925, the appliance receives a client request. At step 930, the appliance determines whether or not the health threshold for the first vServer 275A has been exceeded. If not, at step 935, the appliance directs the client request to the first vServer 275A. If the threshold has been exceeded, the appliance at step 940 determines whether or not to establish or use a second vServer 275N or provide a redirect URL to the client 102. In one case, at step 945, the client is redirected to the service and bypasses the first vServer 275A. At step 950, the appliance may determine if the client is persistent (referred to as being sticky) with the first vServer 275A or the second vServer 275N. If the client is sticky to the first vServer 275A, the appliance may direct the request to the first vServer 275A at step 935. Otherwise, the appliance spills over to an established second vServer 275N at step 955. The method may continue at step 910 to monitor and perform health based spillover management for the second vServer 275N.

In further detail, at step 905, an appliance establishes a first virtual server 275 which manages connections and direct requests from a plurality of clients to a first plurality of services 270. In one embodiment, the appliance may establish the virtual server upon startup of the appliance. In another embodiment, the appliance may establish the virtual server in response to a previously established virtual server exceeding maximum connection threshold. In one embodiment, the appliance may establish a plurality of virtual servers. In some embodiments, a user configures and starts the first vServer 275. In other embodiments, the first vServer is configured, established or designed by the appliance or a user as a primary virtual server.

At step 910, the appliance may establish or otherwise provide a health threshold 1020 for the first vServer 275. In one embodiment, the health threshold 1020 may be initially configured by a user or administrator of the appliance. In another embodiment, the health threshold 1020 may be initially determined by the appliance by monitoring the health of the vServer 275 or by polling one or more services 270. In some embodiments, the appliance 200 may use a default or predetermined health threshold 1020. For example, the appliance may use a predetermined health threshold 1020 associated with or based on the type of service 270.

At step 915, the appliance may monitor a status for each of the services 270 using any means. In one embodiment, the appliance may use a monitoring agent 420. In another embodiment, the appliance may use a plurality of monitoring agents 420. In one embodiment, the appliance may monitor the status for each of the services at predetermined time intervals, for example once every 0.01, 0.1, 0.2, 0.5, or 1 seconds. In another embodiment, the appliance may monitor the status for each of the services 270 asynchronously or based on any events.

At step 920, the appliance measures and monitors the health of the first vServer 275A. The load monitor 420 and/or health detector 1002 may compute, determine or otherwise make health measurements 1025. In one embodiment, the appliance determines the measured health 1025 of a vServer 275 on a predetermined frequency. In another embodiment, the appliance determines the measured health 1025 of a vServer 275 triggered by an event. In one case, the appliance determines the measured health 1025 of a vServer 275 at the request of a user. In some embodiments, the appliance 200 measures health as a percentage using any of the health computations described in connection with FIG. 10A. In some embodiments, the appliance may dynamically adjust the health threshold 1020 based on health measurements. In other embodiments, the appliance may dynamically adjust the health threshold 1020 based on performance and/or operational characteristics of the appliance, the vServer 275, the network connection, and/or the service 270.

At step 925, the appliance may receive a client request. In one embodiment, the appliance intercepts the client request as a transparent interception device. In another embodiment, the client transmits the request to the appliance as a proxy. In some embodiments, the appliance receives a client request to open or establish a transport layer connection. In other embodiments, the appliances receive a client request to access a service via a previously established transport layer connection. The transport layer request may be received from any computing device including a client 102, server 106, or a second appliance 200. In one embodiment, the request may identify a type of service 270. For example, the request may comprise a request for HTTP service. Or, for example, the request may comprise a request for UDP service.

At step 930 the appliance may determine whether the measured health 1025 for a vServer 275 has reached or fallen below the health threshold 1020. The appliance may compare the current measured health 1025 for the first virtual server with the current value of the health threshold 1020 for the first virtual server. In other embodiments, the load monitor 420 and/or health detector 1002 may have already determined the health threshold 1025 for the vServer 275 has been reached or exceeded. In another embodiment, the appliance 200 may determine if the health threshold 1025 has been reached responsive to receiving the client request. If the health threshold 1020 of the first virtual server has not been reached, the appliance may provide the client request to the first virtual server at step 935.

If the appliance determines the health threshold 1020 of the first virtual server has been reached, the appliance may establish, use or otherwise spillover to a second virtual server 275N at step 940. In other embodiments, a second virtual server 275N may already have been established prior to some or any of the steps shown. In another embodiment, the second virtual server 275N may be established responsive to determining the health threshold 1020 has been reached. The second virtual server may provide access to a second plurality of services 270. In one embodiment, one or more of the second plurality of services 270 may comprise the same type of service 270 as one or more of the first plurality of services. The appliance may then establish and/or adjust a health threshold 1020 for the second virtual server. The appliance may provide the client request to the second virtual server 275 at step 955.

In other embodiments, if the health threshold 1020 of the first virtual server has been reached, the appliance may redirect the client making the request to another resource. In one embodiment, the appliance may transmit a URL to the client comprising the address of a server 106 or service 270 such that the client may bypass the appliance 200 and access the server 106 or service 270 directly. In one embodiment, the appliance may transmit a URL to the client comprising the address of a second appliance 200. In still another embodiment, the appliance 200 may redirect the client request to a second appliance.

In another embodiment, the appliance identifies that the measured health exceeds the health threshold and directs client requests to the first vServer. In some embodiments, the appliance identifies that one or more services that were previously down and the measure health now exceeds the health threshold. In response to the health reaching or being above the health threshold, the appliance may direct client request to the first vServer instead of the second vServer.

At step 950, the appliance 200 may determine whether the client making the request has a previously existing connection or session with either the first or a second virtual server. In some embodiments, an appliance may assign a priority to providing requests from a client to virtual servers that have previously serviced or are currently servicing connections or session from the client. For example, if a request is received from a client, and the client has a currently existing connection with a first virtual server, the appliance 200 may provide the request to the first virtual server even if the first virtual server has reached or exceeded the bandwidth threshold. Or, for example, if a client has a previous connection via a backup virtual server, and the primary virtual server subsequently falls below the health threshold 1020, the appliance 200 may still provide a subsequent request from the client to the backup virtual server. In one embodiment, a connection management mechanism 610, or other appliance component may track previously established or current connections or session so that incoming requests from a client can be provided to a virtual server having previously serviced the connection or session from the client.

At step 955, the appliance 200 may dynamically manage virtual spillover based on health by directing or providing the client request to the spillover or second vServer 275N. In some embodiments, the appliance determines the second vServer 275 is busy, unavailable or has exceeded its health threshold or another threshold. In response, the appliance may redirect the client at step 940 or provide the client request to a third vServer 275B or another appliance 200'. In some embodiments, the appliance has a plurality of vServers 275A-275N managing the services 270 and determines which vServer to direct the client request based on comparison of each vServer's measured health and/or health threshold. In one case, the appliance provides the client request to one of a plurality of backup or spillover vServers based on the best measured health. In another case, the appliance provides the client request to the vServer with the greatest difference between the measured health and the health threshold.

Although an embodiment of method 1000 is generally described above in regards to measuring and monitoring health of a first vServer and spilling over to a second vServer, any steps of the method may be performed for the second vServer and a spillover server for the second vServer, and for a third vServer, and so on. An embodiment of method 1000 or any steps thereof may be practiced for a plurality of virtual servers, such as a set of primary vServer managing the same or different services. Another embodiment of method 1000 or any steps thereof may be practiced for a chain of spillover virtual servers, so that a second vServer spills over into a third vServer based on health and so on.

I. Systems and Methods for Handling Spillover in Conjunction with Limit Parameters in a Multi-Core System The systems and methods of the solution described herein are directed towards handling spillover in conjunction with limit parameters for resources used by a plurality of cores in a multi-core system. In general overview, a pool manager allocates a limited number of uses of a resource across a plurality of packet processing engines operating on a plurality of cores of a multi-core system. The pool manager divides the limited number of uses into an exclusive quota pool and a shared quota pool. The pool manager allocates to each packet processing engine an exclusive number of uses of a resource, wherein each exclusive number may be taken from the exclusive quota pool. Each packet processing engine may use the resource up to its exclusive number of uses without further restrictions.

If a packet processing engine wishes to increase its use of the resource beyond the exclusive number of uses, the packet processing engine may request to the pool manager to borrow uses from the shared quota pool. The pool manager may grant the packet processing engine a batch number of uses from the shared quota pool. When the packet processing engine completes one or more uses of the resources, the packet processing engine may return borrowed uses (also referred to herein as "quota") to the shared quota pool.

At times, the pool manager may have already granted all the uses from the shared quota pool to one or more packet processing engines. In these situations, the pool manager may evaluate the packet processing engines to determine if one of the engines have available exclusive uses of the resource. The pool manager may select an engine as the spillover engine for the packet processing engine seeking another use of the resource. Thus, the request to use the resource is redirected to and serviced by the spillover packet processing engine. As a result, while a limited number of uses for a resource is being distributed across a plurality of cores on a multi-core system, a core receiving heavy traffic may nevertheless spillover into another core that services the requests.

Figure 11:
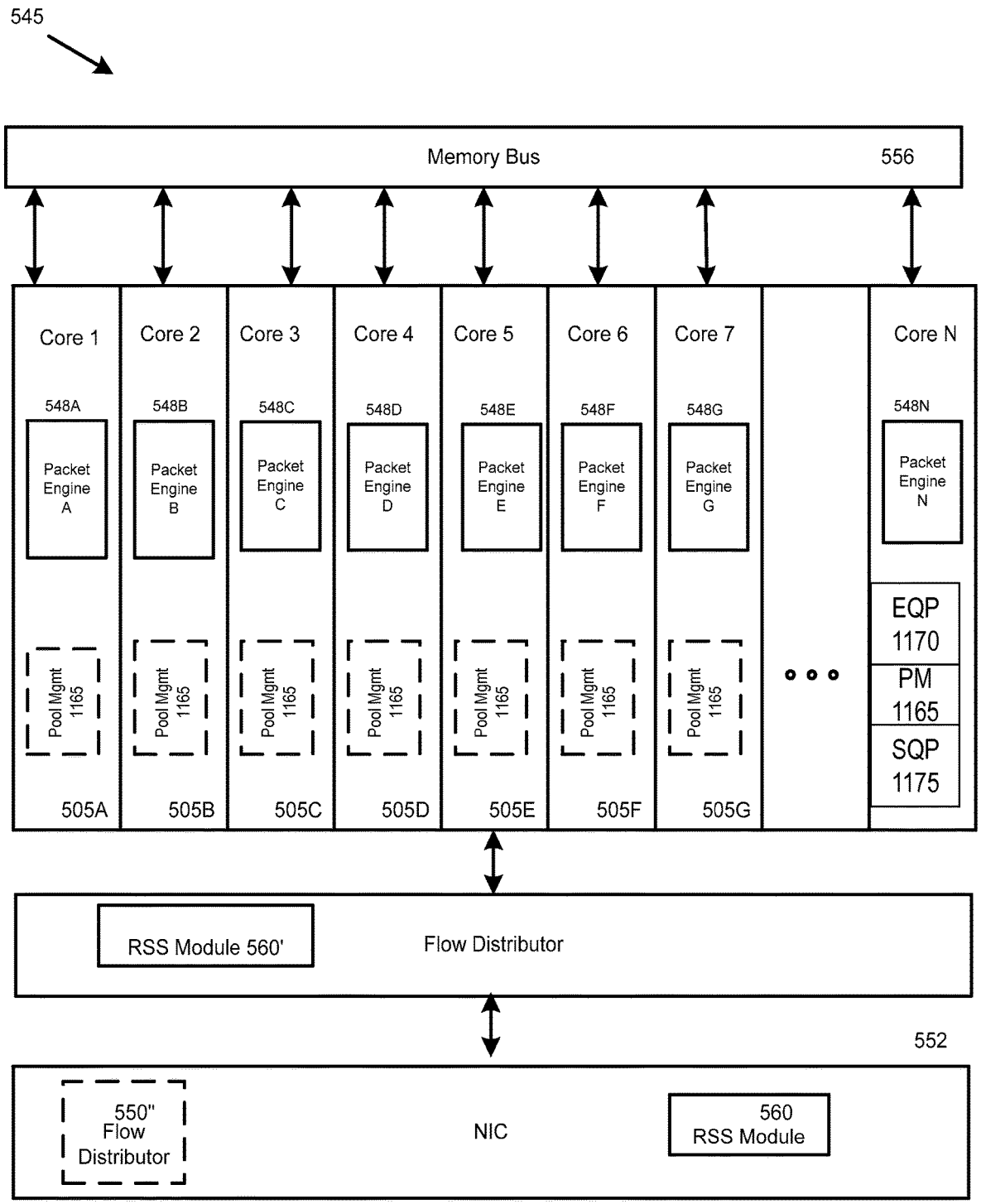
FIG. 11 is a block diagram of an embodiment of a multi-core system for handling limit parameters for one or more resources.

Referring now to FIG. 11, a block diagram of an embodiment of a multi-core system 1145 that handles a limit parameter for one or more resources is depicted. The multi-core system 1145 may comprise any of the embodiments of the multi-core system of FIG. 5B. The multi-core system may include a pool manager 1165 operating on any portion of the multi-core system, such as any core, packet engine, or the flow distributor. One of the cores 505 may be designated a master core for which the pool manager 1165 operates. The other cores may also run a pool manager 1165 for communicating with the master core regarding the use of the resource. The pool manager 1165 may manage the use of a resource and limits thereof via an exclusive quota pool 1170 and/or a shared quota pool 1175.

The pool manager 1165 may comprise any program, application, process, task or set of executable instructions for managing, allocating, distributing, and/or controlling the use of a resource via quota pools. The pool manager 668 may determine the limit for the number of uses of the resource, the exclusive quota pool 1170, and the shared quota pool 1175. The pool manager 668 may allocate batch numbers of uses to packet processing engines 548 from the shared quota pool 1175.

In some embodiments, the pool manager 1165 executes on a master core. In other embodiments, the pool manager 1165 executes as part of the flow distributors 550. In some embodiments, the pool manager 1165 executes as part of a packet processing engine 548. In various embodiments, the pool manager 1165 may include a plurality of pool managers, each of which may execute on a respective core of the plurality of cores. The pool manager 1165 on the master core may control and allocate the use of resources via the quota pools. Any pool manager 1165 on any secondary core may request and receive an allocation of the use of resources from the pool manager 1165 of the master core. In some embodiments, a pool manager 1165 on any secondary core may request uses from the exclusive quota pool 1170 allocated to the secondary core. In other embodiments, a pool manager 1165 on any secondary core may request a batch number of uses from the shared quota pool 1175.

The pool manager 1165 on any secondary core may determine when the secondary core has reached its exclusive number of uses of the resource. In some embodiments, the pool manager 1165 may communicate with the pool manager 1165 on the master core to determine the availability of uses in the shared quota pool 1175. In some embodiments, the pool manager 1165 on any secondary core may detect when the secondary core has completed a use of a resource and whether the secondary core has borrowed from the shared quota pool 1175. In these embodiments, the pool manager 1165 may determine if the secondary core should return quota to the shared quota pool 1175.

The exclusive quota pool 1170 may include a predetermined number of uses that may be assigned or allocated to a core or packet engine exclusively and/or without restrictions. In one aspect, the exclusive quota pool provides a number of exclusive uses to a resource. In some embodiments, an allocation of an exclusive use from the exclusive quote pool to a specific core or packet engine may not be shared or used by another core or packet engine. Exclusive uses from the exclusive quota pool 1170 may be divided or allocated across the plurality of cores 505 in any manner. In some embodiments, each core 505 may be assigned an exclusive number of uses of the resource. In some embodiments, the exclusive quota pool 1170 may include a plurality of exclusive quota pools. Each exclusive pool including an exclusive number of uses for a respective core 505 or packet engine of that core.

The shared quota pool 1175 may include a predetermined number of uses that may be shared and/or allocated to any core or packet engine in a non-exclusive manner. In one aspect, the shared quota pool provides a number of non-exclusive uses to a resource. In some embodiments, an allocation of a shared use from the shared quote pool to a specific core or packet engine may be returned to the shared quota pool to be used by another core or packet engine. In some embodiments, a core 505 may access the shared quota pool after the core 505 has reached its exclusive number of uses of the resource. The shared quota pool 1175 may be accessed by any core in the plurality of cores 505. A core 505 that has reached its exclusive number of uses may borrow from the shared quota pool 1175. The core 505 may request to borrow uses from the shared quota pool 1175 by sending a request to the pool manager 1165. The pool manager 1165 may determine if the shared quota pool 1175 has available uses of the resource. If uses of the resource are available, the pool manager 1165 may allocate a batch number of uses to the core 505. The pool manager 1165 may decrement the available number of uses of the resource by the batch number of uses. In some embodiments, the core 505 may implement a lock upon borrowing uses from the shared quota pool 1175. When the core 505 completes its use of a resource, the core 505 may determine if it has borrowed from the shared quota pool 1175 and return quota.

The pool manager 1165 may allocate the limited uses of the resource among the exclusive quota pool 1170 and the shared quota pool 1175 in any manner by any algorithm or decision making process. In some embodiments, the pool manager 1165 may make the allocation according to user input that configures the quota pools. For example, a user may input a percentage to designate the percentage of the limit to be exclusive or shared. The user may input a number to designate the number of exclusive uses for each core. The user may input a number to designate the number of uses for the shared quota pool 1175 such that the remaining uses may be placed in the exclusive quota pool 1170. In other embodiments, the pool manager 1165 may make the allocation according to a predetermined number coded into the pool manager 1165. In some embodiments, the pool manager 1165 may make the allocation according to the performance of the multi-core system. In these embodiments, the pool manager 1165 may evaluate a metric associated with the performance of the multi-core system and adjust the allocation of uses between the exclusive quota pool 1170 and the shared quota pool 1175.

The pool manager 1165 may manage the uses of any type or kind of resource. In some embodiments, the pool manager 1165 may manage the number of connections running in parallel to a service. In some embodiments, the pool manager 1165 may manage the connection capacity each core may access. In other embodiments, the pool manager 1165 may manage the bandwidth of the multi-core system. In additional embodiments, the pool manager 1165 may manage the number of bytes per second being processed by the cores 505. In various embodiments, the pool manager 1165 may manage the number of packets per second being processed by the cores 505. In various embodiments, the pool manager 1165 may manage any type or form of resource use as described in reference to FIGS. 6-10.

Figure 12A:
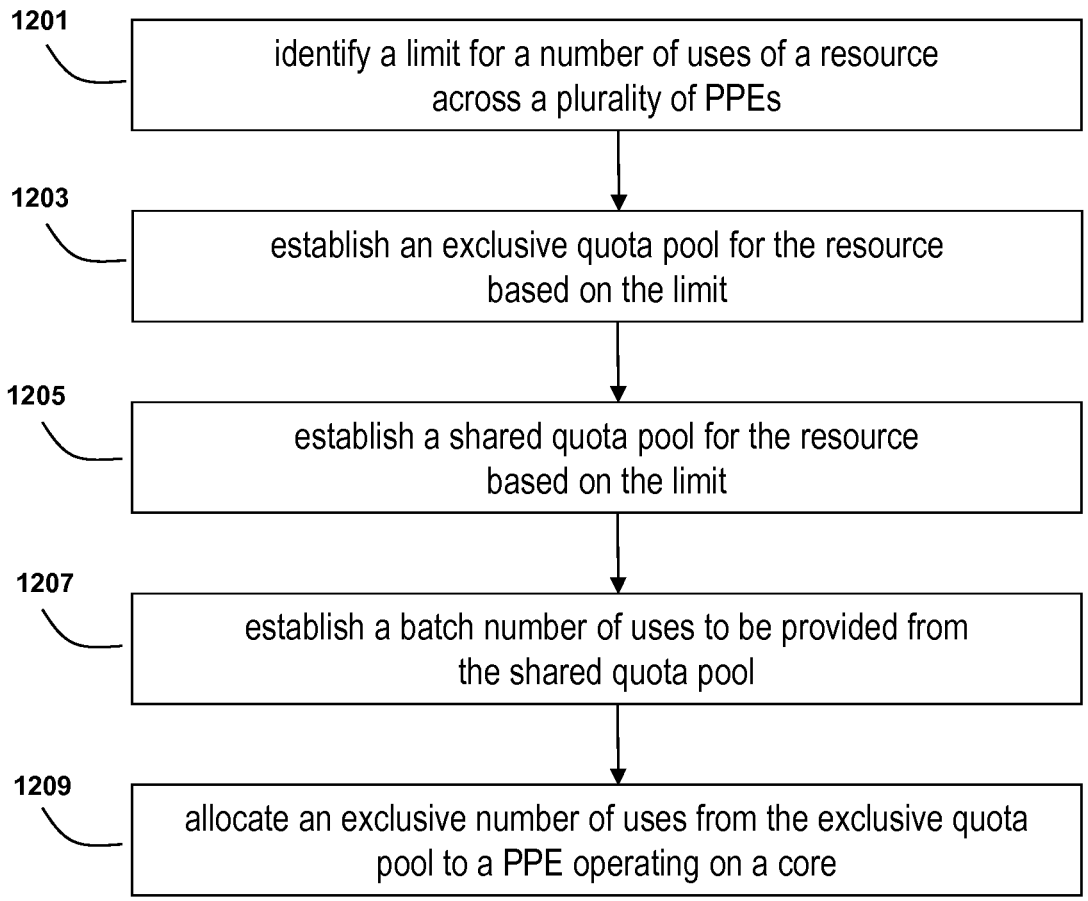
FIG. 12A is a flow diagram depicting steps of an embodiment of a method for allocating numbers of uses of resources to a plurality of packet processing engines operating on a plurality of cores in a multi-core system.

Referring now to FIG. 12A, a flow diagram depicting steps of an embodiment of a method for allocating limited numbers of uses of resources to a plurality of packet processing engines operating on a plurality of cores is shown and described. In brief overview, the method includes identifying (step 1201) a limit for a number of uses of a resource across a plurality of packet processing engines. The method further includes establishing (step 1203) an exclusive quota pool for the resource based on the limit. The method further includes establishing (step 1205) a shared quota pool for the resource based on the limit. The method further includes establishing (step 1207) a batch number of uses to be provided from the shared quota pool. The method further includes allocating (step 1209) an exclusive number of uses from the exclusive quota pool to a packet processing engine operating on a core.

The pool manager 1165 may identify the limit for the number of uses of a resource. This limit may be for the use of the resource across the multi-core system, the plurality of cores and/or packet engines, or any portion thereof. In some embodiments, a user inputs the limit to the appliance 200. The user may input the limit through the graphical user interface (GUI) 210 or the command line interface (CLI) 212 as described in FIG. 2A. The limit may be any type and form of threshold on a number of uses of the resource. In some embodiments, the pool manager 1165 identifies the limit according to a parameter of the data communication network. In many embodiments, the pool manager 1165 identifies the limit as the maximum dynamic connection threshold, bandwidth threshold, and/or health threshold described in reference to FIGS. 6-10.

In various embodiments, the limit may represent a maximum capacity of the resource. In some embodiments, the limit may represent a physical capacity of the resource. In other embodiments, the limit may represent a processing capacity of the resource. For example, the limit may be a maximum number of connections that may run in parallel to a service. In many embodiments, the limit for a number of uses for a resource may be absolute. Also the limit may simply be a desired limit. The limit may represent a percent of or a predetermined threshold of a capacity of the resource. When the total number of uses of the resource reaches the limit, the resource may deny further requests to use the resource.

The pool manager 1165 may establish the exclusive quota pool for the resource based on the limit. In various embodiments, the pool manager 1165 establishes the exclusive quota pool by applying a function to the limit. In many embodiments, the exclusive quota pool may be a predetermined percentage of the limit. In one example, the exclusive quota pool may be established as 80% of the limit. If the number of connections that may run in parallel to a service has a limit of 100, the exclusive quota pool may be 80 connections. In various embodiments, the exclusive quota pool may be established as the largest multiple of the number of cores less than a predetermined percentage of the limit. In one example, the limit is 100 connections to a service, the predetermined percentage is 80%, and the multi-core system has 7 cores. As 80 connections cannot be evenly distributed among 7 cores, the exclusive quota pool is established as 77 connections, the largest multiple of 7 that is less than 80.

The pool manager 1165 may establish the shared quota pool for the resource based on the limit. The shared quota pool may be established by subtracting the exclusive quota pool from the limit. The pool manager 1165 may implement the shared quota pool in a memory shared among the cores. In some embodiments, the pool manager 1165 may implement the shared quota pool using a data structure. The data structure may include variables associated with the limit and the function applied to the limit that establishes the exclusive quota pool. The data structure may include a variable associated with the number of uses in the shared quota pool. The data structure may include a variable associated with the available number of uses in the shared quota pool. The data structure may include variables associated with the identity of one or more packet processing engines 548 borrowing uses from the shared quota pool. The data structure may include variables associated with the number of uses being used by each of the identified packet processing engines.

The pool manager 1165 may establish the batch number of uses to be provided from the shared quota pool. The batch number of uses may be the number of uses a packet processing engine borrows whenever the packet processing engine accesses the shared quota pool. The pool manager 1165 may establish the batch number by applying a formula to the shared quota pool. In one embodiment, the batch number of uses may be 10% of the shared quota pool. If the shared quota pool is, for example, 20 connections to a service, the batch number is 2 connections. In another embodiment, the batch number of uses may be 20% of the shared quota pool, thereby resulting in a batch number of 4 for a shared quota pool of 20 connections. In various embodiments, if the application of the formula to the size of the shared quota pool results in a batch number less than 1, the batch number defaults to 1.

The pool manager 1165 may allocate an exclusive number of uses from the exclusive quota pool to each packet processing engine 548. The exclusive number of uses may be the number of times a packet processing engine 548 may use the resource without further restrictions. If the packet processing engine 548 wishes to use the resource beyond its exclusive number, the packet processing engine 548 must borrow a batch number of uses, if available, from the shared quota pool. The pool manager 1165 may establish the exclusive number of uses based on the exclusive quota pool. The exclusive number of uses may be established by dividing the exclusive quota pool by the number of cores. If the exclusive quota pool divided by the number of cores is less than 1, then the exclusive number of uses becomes 0. In these embodiments, all the uses of the resource will belong to the shared quota pool, and each packet processing engine 548 must borrow from the shared quota pool whenever the packet processing engine 548 wishes to use the resource.

Figure 12B:
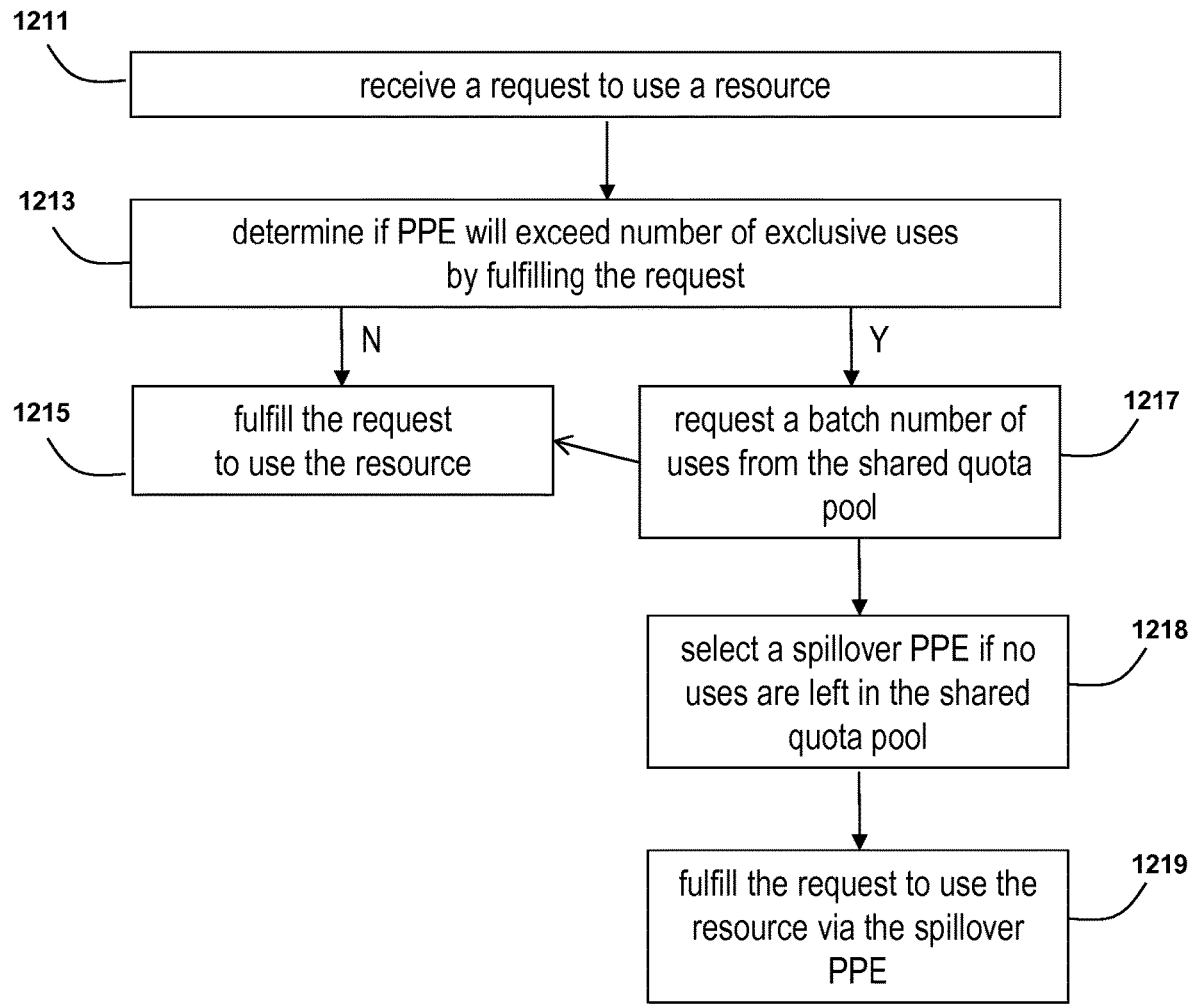
FIG. 12B is a flow diagram depicting steps of an embodiment of a method for borrowing from a shared quota pool and spilling over into another packet processing engine when such borrow is not possible.

Referring now to FIG. 12B, a flow diagram depicting steps of an embodiment of a method for borrowing from a shared quota pool is shown and described. In brief overview, the method includes receiving (step 1211) a request to use a resource. The method also includes determining (step 1213) if the packet processing engine will exceed its exclusive number of uses by fulfilling the request. If the packet processing engine will not exceed its exclusive number of uses, the method also includes fulfilling (step 1215) the request to use the resource. If the packet processing engine will exceed its exclusive number of uses, the method also includes requesting (step 1217), a batch number of uses from the shared quota pool. If the packet processing engine receives the batch number of uses, the engine fulfills the request (1215). If the pool manager determines the shared quota pool has been exhausted, the pool manager selects a packet processing engine with available exclusive uses as a spillover engine (step 1218). The spillover engine fulfills the request (step 1219).

The multi-core system 545 may receive the request to use the resource. The multi-core system 545 may assign the request to any core 505 of the plurality of cores. The multi-core system 545 may assign the request to a core 505 based on the type of request, the number of requests each core is processing, or any other basis. The request to use the resource may include a request to open a connection to a service. In any of these embodiments, the packet processing engine 548 operating on a core 505 may process the request.

The packet processing engine 548 may determine if the packet processing engine 548 will exceed its exclusive number of uses by fulfilling the request. In various embodiments, the packet processing engine 548 makes the determination by comparing its exclusive number of uses to its current number of uses. If the current number of uses+1 is less than or equal to the exclusive number of uses, the determination is negative. Otherwise, the determination is positive. In many embodiments, the packet processing engine 548 may maintain the number of its current uses in a non-shared memory. In some embodiments, the packet processing engine 548 may include a counter with the number of its current uses of the resource.

If the determination is negative, the packet processing engine 548 may fulfill the request to use the resource. If the determination is positive, the packet processing engine 548 may request a batch number of uses from the shared quota pool before fulfilling the request. In various embodiments, the packet processing engine 548 may send a request for a batch number of uses to the pool manager 1165. The pool manager 1165 may determine if the shared quota pool has an available batch number of uses. The pool manager 1165 may allocate a batch number of uses from the shared quota pool to the requesting packet processing engine 548. The pool manager 1165 may subtract a batch number of uses from the number of available uses in the shared quota pool. The pool manager 1165 may send a message to the packet processing engine 548 indicating that the request for a batch number of uses has been granted. In some embodiments, the packet processing engine 548 may acquire a lock before fulfilling the request with one of the batch number of uses borrowed from the shared quota pool. In various embodiments, the packet processing engine 548 sets a variable indicating that the packet processing engine has borrowed uses from the shared quota pool.

In other embodiments, the pool manager 1165 may determine that the shared quota pool does not have a batch number of uses available. In some embodiments, the pool manager 1165 may send a message to the packet processing engine 548 indicating that the request for a batch number of uses cannot be fulfilled. In some embodiments, the pool manager 1165 may place the request for a batch number of uses and the identity of the requesting packet processing engine 548 in a queue. In some embodiments, the request for a batch number of uses in the queue may time out after a predetermined period of time.

In various embodiments, the packet processing engine 548 may resend the request for a batch number of uses after a predetermined period of time. In some embodiments, the packet processing engine 548 may place the request to use the resource in a queue. In some embodiments, the request in the queue may time out after a predetermined period of time. In various embodiments, the packet processing engine 548 may send a message to the source of the request to use the resource indicating that the request cannot be fulfilled at that time.

If the pool manager determines the shared quota pool has been exhausted, the pool manager selects a packet processing engine with available exclusive uses as a spillover engine (step 1218). In some embodiments, the pool manager may ping each packet processing engine to determine if the engine has available exclusive uses. In other embodiments, the pool manager may retrieve from a memory the number of exclusive uses each packet processing engine is using. The pool manager may select as the spillover engine the engine using the fewest number of exclusive uses. The pool manager may select engines to serve as spillover engines in a round robin method. In some embodiments, the pool manager selects the first detected engine using less than its exclusive number of uses to be the spillover engine.

Once the spillover engine is selected, the pool manager may store the identities of the spillover engine and the engine being supported by the spillover engine. The pool manager may also store identifying information about the request to use the resource, such as a source IP address of the client and/or session identifier. Then, the pool manager forwards the request to the spillover engine for fulfillment (step 1219).

In various embodiments, the multi-core system may maintain connection or session persistence between a client 102 and the spillover packet processing engine handling requests for the client 102. In some embodiments, the multi-core system selects the spillover packet processing engine for handling a client request even though the packet processing engine that needed spillover support no longer exceeds its exclusive number of uses and/or the shared quota pool has uses to be allocated. In other embodiments, the multi-core system selects the original packet processing engine for handling a client request even though requests from other clients are directed to the spillover packet processing engine. In one embodiment, the multi-core system may select the original or spillover packet processing engine based on which engine most recently handled a request from the client 102.

Figure 12C:
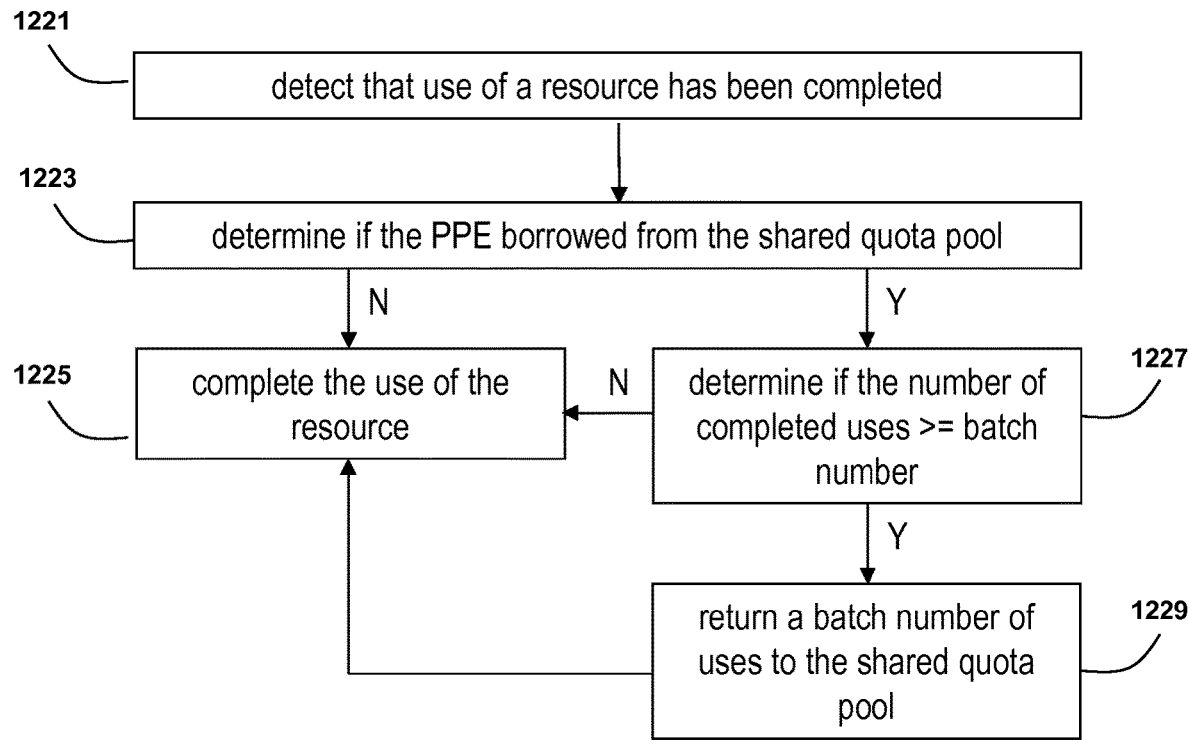
FIG. 12C is a flow diagram depicting steps of an embodiment of a method for returning quota to a shared quota pool.

Referring now to FIG. 12C, a flow diagram depicting steps of an embodiment of a method for returning quota to a shared quota pool is shown and described. In brief overview, the method includes detecting (step 1221) that use of a resource has been completed. The method also includes determining (step 1223) if the packet processing engine borrowed from the shared quota pool. The method also includes, if the determination is negative, completing (step 1225) the use of the resource. The method also includes, if the determination is positive, determining (step 1227) if the number of completed uses of the resource is greater than or equal to the batch number. If the number of completed uses is not greater than or equal to the batch number, the packet processing engine completes the use of the resource. If the number of completed uses is greater than or equal to the batch number, the method includes returning (step 1229) a batch number of uses to the shared quota pool in conjunction with completing (step 1225) the use of the resource.

In further detail, the packet processing engine 548 may detect that use of a resource has been completed. In some embodiments, the resource sends a message to the packet processing engine 548 indicating that the use has been completed. In other embodiments, the packet processing engine 548 determines that a use has been completed after a predetermined amount of time. In these embodiments, the packet processing engine 548 determines a use has been completed because the use has timed out. In some embodiments, the packet processing engine 548 may receive a message from the source of the request to use the resource indicating that the request has been aborted.

The packet processing engine 548 may determine if the packet processing engine 548 borrowed from the shared quota pool in one of many ways. In some embodiments, the packet processing engine 548 may compare the number of its current uses of the resource to its exclusive number of uses. If the number of current uses exceeds the exclusive number of uses, the packet processing engine 548 may determine that borrowing occurred. In additional embodiments, the packet processing engine 548 may evaluate a variable that the packet processing engine 548 sets upon borrowing from the shared quota pool. The packet processing engine 548 may determine that borrowing occurred based upon the value of the variable.

If the packet processing engine 548 determines that the packet processing engine did not borrow from the shared quota pool, the packet processing engine 548 may complete a use of the resource. In some embodiments, the packet processing engine 548 may place the connection to the resource in a reuse pool. The reuse pool may be exclusive to the packet processing engine 548. In these embodiments, when the packet processing engine 548 receives another request to use the resource, the packet processing engine 548 may access one of the connections to the resource in the reuse pool instead of opening a new connection to access the resource. In various embodiments, the packet processing engine 548 may close the connection to the resource.

If the packet processing engine determines 548 that the packet processing engine 548 borrowed from the shared quota pool, the packet processing engine 548 may determine if the number of completed uses of the resource is greater than or equal to the batch number. The packet processing engine 548 may make this determination by subtracting the exclusive number of uses from the current number of uses and comparing the result to the batch number. If the difference is less than the batch number, the packet processing engine 548 may complete a use of the resource and closes the connection to the resource. If the difference is equal to or greater than the batch number, the packet processing engine 548 may send a message to the pool manager 1165 indicating the return of a batch number of uses to the shared quota pool before completing the use and closing the connection. In these embodiments, the packet processing engine 548 may relinquish the lock acquired when the packet processing engine 548 borrowed from the shared quota pool. In various embodiments, upon receiving a message indicating that a batch number of uses is being returned to the shared quota pool, the pool manager 1165 may process requests for use of a resource in a queue of requests.

Although the methods of FIGS. 11 through 12C may be generally discussed in reference to a packet engine and a spillover packet engine, the systems and methods of embodiments of the present solution may be used for virtual servers running on each core as part of the packet engine or separate from a packet engine to determine spillover thresholds and spillover persistence for virtual servers, such as any of the embodiments of spillover management and spillover persistence discussed in conjunction with FIGS. 7 to 10B.

Figure 12D:
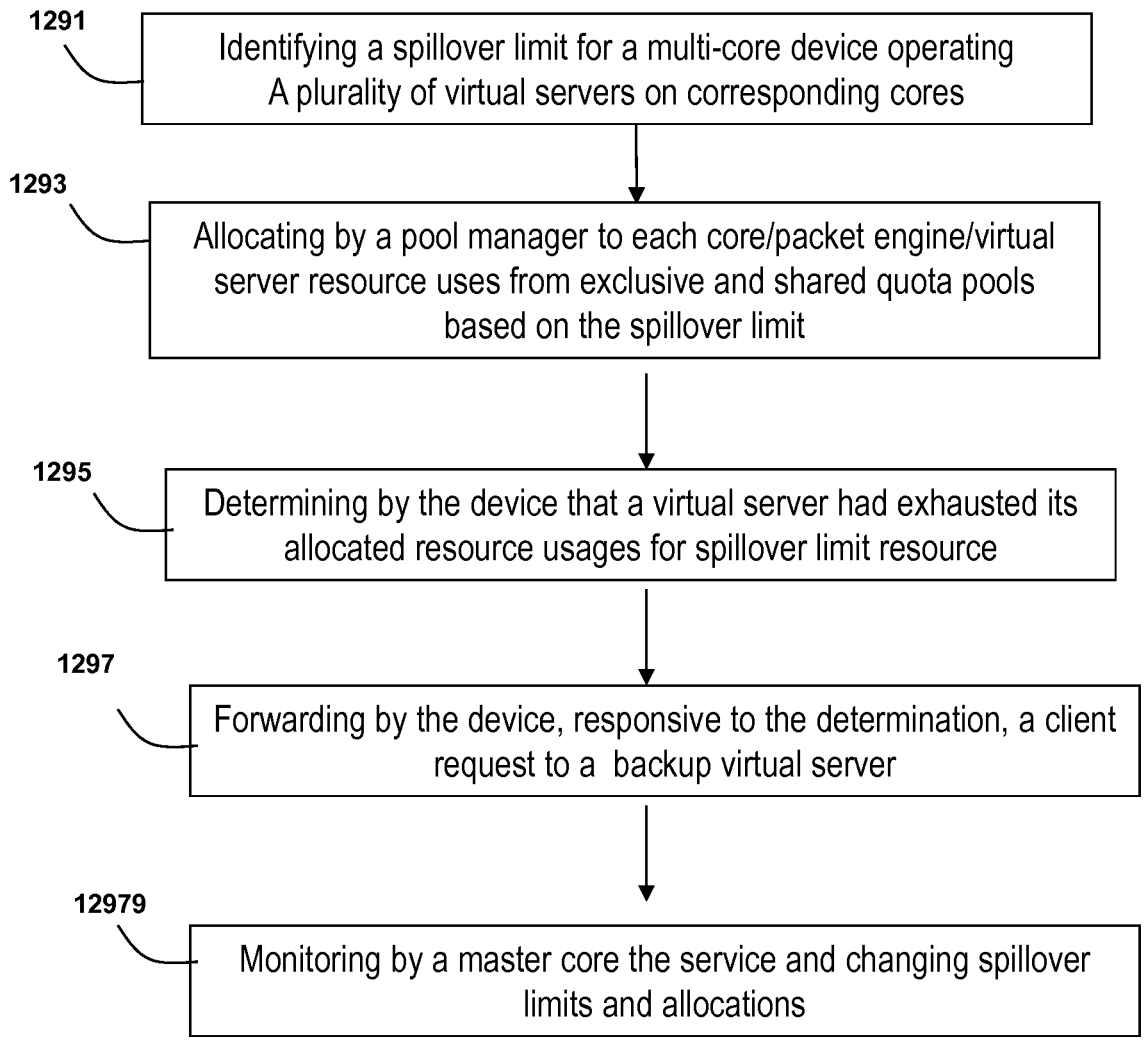
FIG. 12D is a flow diagram depicts steps of an embodiments of method of practicing spillover limits in a multi-core device using embodiments of pool management techniques.

Referring to FIG. 12D is another embodiment of steps of a method for managing spillover limits using the quota based allocation techniques described herein. In brief overview, at step 1291, a spillover limit is identified for a multi-core device intermediary to a plurality of clients and one or more servers. The multi-code device may establish a virtual server 275 on each of the cores or packet processing engines to manage the services provided by the one or more servers. One or more of the virtual servers may have a backup virtual server for handling client requests when the virtual server reaches its spillover threshold. At step 1293, based on the spillover limit, the pool manager of the device allocates a number of resources uses to each of the virtual managers. The number of resources may be allocated from an exclusive quota pool and/or a shared quota pool. At step 1295, the device determines that one of the plurality of virtual servers has reached or exhausted its allocated number of resource uses. At step 1297, responsive to the determination, the device forwards a received client request to a backup virtual server. At step 1299, the device monitors the service, the spillover limits and allocation of resource uses.

In further details, at step 1291, the multi-core device may be configured for any type of spillover limit, including but not limited to connection based spillover, dynamic connection based spillover, health based spillover and bandwidth bases spillover. The spillover limit or threshold may be configured as a maximum number of connections to a service of the one or more services. The spillover limit may be configured a dynamic connection threshold determined from a sum of a connection capacity of each of the plurality of virtual servers. The spillover limit may be configured as a bandwidth threshold.

Although the device has multiple cores and multiple virtual servers and/or packet engines operating on each core, a spillover limit may be configured or specified for the device itself. The spillover limit may identify or specify the type of resource—connection, health, bandwidth, etc. Using the pool management techniques herein, the multi-core device may allocate and manage the number of resource uses across the cores, packet engines and/or virtual servers. In some aspects, the multi-core device allocates and manages the numbers of resource uses for the spillover limit to appear as a single core device configured with a single spillover limit.

The multi-core device may be configured to operate or execute one or more virtual servers on each core of the device. Each of the virtual servers may manage one or more services executing on one or more servers. For each virtual server, one or more backup virtual servers may be configured, established or otherwise provided to handle client requests for the virtual server when the virtual server has reached its resource allocation corresponding to the spillover limit.

At step 1293, using any embodiments of the resource management techniques described herein, the pool manager allocates a number of resource uses corresponding to the spillover limit across each of the cores or virtual servers operating on each core. The pool manager may establish an exclusive quota pool and/or shared quota pool for a total number of resources uses for the resource, such as connections, health or bandwidth of the spillover limit. In some embodiments, the pool manager allocates a number of exclusive resources to each core or virtual server from an exclusive quota pool. In some embodiments, the pool manager allocates a number of non-exclusive resource uses to each core or virtual server from a shared quota pool. In some embodiments, the pool manager allocates a number of resource uses to each core or virtual server from both an exclusive quota pool and a shared quota pool. In some embodiments, the pool manager may allocate an equal number of resources uses across each core or virtual server. In some embodiments, the pool manager may allocate an unequal number of resources uses across each core or virtual server. In some embodiments, the pool manager may allocate number of resources uses across each core or virtual server based on some weight assigned to the core or virtual server.

At step 1295, the device determines that the number of resources used by a virtual server of the plurality of virtual servers has reached an allocated number of resource uses of the virtual server. In some embodiments, the virtual server determines that it has exhausted its allocated number of resource uses. In some embodiments, the virtual server requests additional resource uses from the pool manager. In some embodiments, the pool manager does not have resource uses to allocate to the virtual server. In some embodiments, the pool manager determines not to allocate any more resource uses to the virtual server. In some embodiments, the virtual server reaches its corresponding portion of the spillover limit when the virtual server has reached its allocated number of exclusive resource uses. In some embodiments, the virtual server reaches its corresponding portion of the spillover limit when the virtual server has reached its allocated number of non-exclusive resource uses. In some embodiments, the virtual server reaches its corresponding portion of the spillover limit when the virtual server has reached its allocated number of exclusive and non-exclusive resource uses. In some embodiments, the device reaches the spillover limit when each of the virtual servers has reaches its allocated number of exclusive and/or non-exclusive resources. In some embodiments, the device reaches the spillover limit when each of the virtual servers has reaches its corresponding portion of the spillover limit.

At step 1297, the device forwards, responsive to the determination of step 1295, to a backup virtual server a request of a client received by the device for the virtual server. In some embodiments, when any one virtual server of the plurality of virtual servers reaches its corresponding portion of the spillover limit or its corresponding allocation of resource users, the device redirects request to the virtual server to a corresponding backup virtual server. In some embodiments, when any all of the plurality of virtual servers reaches its corresponding portion of the spillover limit or its corresponding allocation of resource users, the device redirects requests to any of the virtual servers to a backup virtual server. In some embodiments, the connection manager determines when a spillover conditions exists and determines to forwards requests to a backup virtual server.

At step 1299, the device monitors the services and may adjust the corresponding spillover limit. In some embodiments, one core or packet engine may be designated as the master core or packet engine for monitoring the service. In some embodiments, one core or packet engine may be designated as the master core or packet engine for monitoring the spillover limit. In some embodiments, one core or packet engine may be designated as the spillover master. The master core or packet engine may monitor one or more services bound to or managed by the plurality of virtual servers. For the case of spillover limits that change responsive to a state or status of the service, the master core or packet engine may adjust the spillover limit responsive to monitoring. For example, in some embodiments of dynamic connection spillover, the master core or packet engine may increase or decrease the dynamic connection spillover limit responsive to a change in the capacity of connections. In some embodiments of bandwidth spillover, the master core or packet engine may increase or decrease the bandwidth spillover limit responsive to a change in bandwidth capacity. In some embodiments of health spillover, the master core or packet engine may increase or decrease the health spillover limit responsive to a change in health status of a service(s).

The spillover master core or packet engine may propagate the change in spillover limits to each of the other cores or packet engines. In some embodiments, the spillover master may use any type and form of inter-core communications, such as core-to-core messaging or shared memory.

In some embodiments, each of the cores, packet engines or virtual servers may adapt or changes its allocation of a number of resource uses responsive to a change to the spillover limit. Responsive to a lower spillover limit or a decrease in the spillover limit, a virtual server or packet engine may return a number of resource uses to the pool manager. In some embodiments, a virtual server or packet engine may return a number of exclusive resource uses to the exclusive quota pool. In some embodiments, a virtual server or packet engine may return a number of non-exclusive resource uses to the shared quota pool. In some embodiments, a virtual server or packet engine may return both a number of exclusive uses to the exclusive quote pool and a number of non-exclusive resource uses to the shared quota pool. Responsive to a higher spillover limit or an increase in the spillover limit, a virtual server or packet engine may request an additional number of resource uses from the pool manager. In some embodiments, a virtual server or packet engine may request an additional number of exclusive resource uses to the exclusive quota pool. In some embodiments, a virtual server or packet engine may request an additional number of non-exclusive resource uses to the shared quota pool. In some embodiments, a virtual server or packet engine may request an additional number of exclusive uses for, the exclusive quote pool and an additional number of non-exclusive resource uses from the shared quota pool. In some embodiments, responsive to changes in the spillover limit, one packet engine or virtual server may return a number of resource uses (exclusive, non-exclusive or otherwise) while another packet engine or virtual server may request an additional number of resource uses (exclusive, non-exclusive or otherwise).

In some embodiments, the pool manager responsive to changes in the spillover limit, changes the allocations of resource uses across the plurality of cores, packet engines or virtual servers. In some embodiments, the pool manager may request a virtual server or packet engine to return a number of resource uses, exclusive, non-exclusive or otherwise. In some embodiments, the pool manager may increase for a virtual server or packet engine a number of resource uses, exclusive, non-exclusive or otherwise. In some embodiments, responsive to changes in the spillover limit or responsive to monitoring, the pool manager may request one virtual server or packet engine to return a number of resource uses, exclusive, non-exclusive or otherwise while providing an increasing the number of resource uses, exclusive, non-exclusive or otherwise, for another virtual server or packet engine.

In view of changes to the spillover limit, the device may perform spillover management to backup virtual servers based on the changed spillover limits and/or reallocation of number of resource uses across the virtual servers. In some embodiments, if requests for a virtual spillover were directed to a backup virtual server and the spillover limit increased or the virtual server's allocation of number of resource uses increases, request may be sent back to the virtual server instead of the backup virtual server. In some embodiments, if requests for a virtual spillover were not directed to a backup virtual server and the spillover limit decreased or the virtual server's allocation of number of resource uses decreases, spillover management may be triggers and request directed to the virtual server are redirected to the backup virtual server.

What is claimed:

1. A method comprising:
    a) assigning, by a device intermediary to a client and a server, to each processor of a plurality of processors of a device, a predetermined number of times a resource can be used by each processor based on applying a function to a limit received via user input established for the device, the limit comprising a total number of times the resource can be used across the plurality of processors of the device, wherein the predetermined number of times of uses includes a number of times of use from an exclusive quota pool and a number of times of use from a non-exclusive quota pool;
    b) determining, by the device responsive to a first processor of the device receiving a request from the client to a service on the server that uses the resource, that the number of times the resource is used by the first processor has reached the predetermined number of times of use assigned to the first processor from the exclusive quota pool and the non-exclusive pool has been exhausted;
    c) allocating, by the device responsive to the determination, an additional number of times of use of the resource to the first processor from the total number of times the resource can be used by another processor of the plurality of processors using less than its predetermined number of times assigned from the exclusive quota pool; and d) processing, by the first processor, the request from the client responsive to allocation of the additional number of times of use of the resource to the first processor.

2. The method of claim 1, wherein (a) further comprises assigning to each processor the predetermined number of times the resource can be used by each processor, wherein the predetermined number of times comprises a result of applying the function to the limit received via user input.

3. The method of claim 1, wherein (a) further comprises allocating, by the device, the predetermined number of times of uses as exclusive uses from an exclusive quota pool.

4. The method of claim 1, wherein (a) further comprises allocating, by the device, the predetermined number of times of uses as non-exclusive uses from a non-exclusive quota pool.

5. The method of claim 1, wherein (b) further comprises determining, by the first processor, that the first processor has reached the predetermined number of times prior to use of the resource by the request.

6. The method of claim 1, wherein (c) further comprises requesting, by the first processor, the additional number of times of use from a pool manager.

7. The method of claim 1, wherein (c) further comprises allocating, by the device, the additional number of times to use of the resource as non-exclusive uses from a non-exclusive quota pool.

8. The method of claim 1, wherein (c) further comprises allocating, by the device, the additional number of times to uses of the resource as exclusive uses from an exclusive quota pool.

9. The method of claim 1, wherein (c) further comprising receiving, by the first processor, the additional number of times of use previously allocated to a second processor.

10. The method of claim 1, wherein the resource comprises one of the following a connection, bandwidth or bytes per unit of time processed by the first processor.

11. A system comprising:
a device comprising a plurality of processors and intermediary to a client and a server;
a pool manager configured to execute on one or more processors of the plurality of processors and configured to assign to each processor of the plurality of processors, a predetermined number of times a resource can be used by each processor based on applying a function to a limit received via user input established for the device the limit comprising a total number of times the resource can be used across the plurality of processors of the device;
wherein the predetermined number of times of uses includes a number of times of use from an exclusive quota pool and a number of times of use from a non-exclusive quota pool;
wherein the device is configured to determine, responsive to a first processor of the device receiving a request from the client to a service on the server that uses the resource, that the number of times the resource is used by the first processor has reached the predetermined number of times assigned to the first processor from the exclusive quota pool and the non-exclusive pool has been exhausted; and
wherein responsive to the determination, the pool manager is configured to assign an additional number of times of use of the resource to the first processor from the total number of times the resource can be used by another processor of the plurality of processors using less than its predetermined number of times assigned from the exclusive quota pool; and
responsive to allocation of the additional number of times of use of the resource to the first processor, the first processor is configured to process the request from the client.

12. The system of claim 11, wherein the device is further configured to assign to each processor the predetermined number of times the resource can be used by each processor, wherein the predetermined number of times comprises a result of applying the function to the limit received via user input based on applying a function to the limit received via user input.

13. The system of claim 11, wherein the device is further configured to allocate the predetermined number of times of uses as exclusive uses from an exclusive quota pool.

14. The system of claim 11, wherein the device is further configured to allocate the predetermined number of times of uses as non-exclusive uses from a non-exclusive quota pool.

15. The system of claim 11, wherein the device is further configured to determine that the first processor has reached the predetermined number of times prior to use of the resource by the request.

16. The system of claim 11, wherein the device is further configured to request the additional number of times of use from a pool manager.

17. The system of claim 11, wherein the device is further configured to allocate the additional number of times to use of the resource as non-exclusive uses from a non-exclusive quota pool.

18. The system of claim 11, wherein the device is further configured to allocate the additional number of times to uses of the resource as exclusive uses from an exclusive quota pool.

19. The system of claim 11, wherein the first processor is further configured to request additional number of times of use previously allocated to a second processor.

20. The system of claim 11, wherein the resource comprises one of the following a connection, bandwidth or bytes per unit of time processed by the first processor.

\* \* \* \* \*